(12) United States Patent
Zielke et al.

(10) Patent No.: US 12,495,736 B2
(45) Date of Patent: Dec. 16, 2025

(54) APPARATUS, SYSTEMS AND METHODS FOR STALK SENSING

(71) Applicant: Ag Leader Technology, Ames, IA (US)

(72) Inventors: Roger Zielke, Huxley, IA (US); Scott Eichhorn, Ames, IA (US); Alan F. Barry, Nevada, IA (US); Tony Woodcock, Ames, IA (US)

(73) Assignee: Ag Leader Technology, Ames, IA (US)

( * ) Notice: Subject to any disclaimer, the term of this patent is extended or adjusted under 35 U.S.C. 154(b) by 545 days.

(21) Appl. No.: 17/226,002

(22) Filed: Apr. 8, 2021

(65) Prior Publication Data

US 2021/0329838 A1    Oct. 28, 2021

Related U.S. Application Data

(63) Continuation-in-part of application No. 17/013,037, filed on Sep. 4, 2020.

(60) Provisional application No. 63/006,774, filed on Apr. 8, 2020, provisional application No. 62/895,676, filed on Sep. 4, 2019.

(51) Int. Cl.
*A01D 45/02* (2006.01)
*A01B 79/00* (2006.01)
*A01D 41/127* (2006.01)

(52) U.S. Cl.
CPC .......... *A01D 45/021* (2013.01); *A01B 79/005* (2013.01); *A01D 41/127* (2013.01); *A01D 41/1271* (2013.01)

(58) Field of Classification Search
CPC .................... A01D 45/021; A01D 41/1271
See application file for complete search history.

(56) References Cited

U.S. PATENT DOCUMENTS

| 2,419,061 A | 4/1947 | Emery |
| 2,813,709 A | 11/1957 | Hyman |

(Continued)

FOREIGN PATENT DOCUMENTS

| AU | 2020201559 A1 | 4/2020 |
| BE | 1023764 B1 * | 7/2017 |

(Continued)

OTHER PUBLICATIONS

Baweja et al., "StalkNet: A Deep Learning Pipeline for High-throughput Measurement of Plant Stalk Count and Stalk Width", 2017.

(Continued)

*Primary Examiner* — Adam J Behrens
*Assistant Examiner* — Ashley A Kaercher
(74) *Attorney, Agent, or Firm* — DENTONS DAVIS BROWN PC; Matthew Warner-Blankenship

(57) ABSTRACT

An apparatus, system, and method that relate to a physical stalk sensing system comprising at least one resilient member. Sensors having the resilient member or members are able to estimate the size of the stalks of row crops as they pass through a field, such as a corn field. The sensors can be mounted on a corn head and the results can be analyzed and visualized. A system for predicting crop yields in real-time or near real-time. A system for adjusting a stripper plate gap.

7 Claims, 44 Drawing Sheets

(56) References Cited

U.S. PATENT DOCUMENTS

| | | | | |
|---|---|---|---|---|
| 3,038,544 A * | | 6/1962 | Richey | A01B 69/008 180/401 |
| 3,178,873 A * | | 4/1965 | Meyer | A01D 45/16 56/DIG. 8 |
| 3,246,701 A | | 4/1966 | Horst | |
| 3,271,940 A | | 9/1966 | Robert | |
| 3,616,690 A | | 11/1971 | Harden | |
| 3,780,817 A | | 12/1973 | Videon | |
| 3,853,000 A | | 12/1974 | Barnett | |
| T934,002 I4 | | 5/1975 | Trail | |
| 3,972,381 A | | 8/1976 | Gail | |
| 3,992,933 A | | 11/1976 | Randolph | |
| 4,121,049 A | | 10/1978 | Roeber | |
| 4,126,984 A | | 11/1978 | Gail | |
| 4,166,349 A * | | 9/1979 | Coenenberg | A01D 41/1278 56/DIG. 15 |
| 4,197,690 A | | 4/1980 | Eistert | |
| 4,295,323 A | | 10/1981 | Maier et al. | |
| 4,362,218 A | | 12/1982 | Shoberg | |
| 4,418,521 A | | 12/1983 | Orlando | |
| 4,423,640 A | | 1/1984 | Jetter | |
| 4,505,094 A | | 3/1985 | Demorest | |
| 4,528,804 A | | 7/1985 | Williams | |
| 4,751,849 A | | 6/1988 | Paros | |
| 4,883,964 A * | | 11/1989 | Bohman | A01D 75/00 250/341.7 |
| 4,896,491 A | | 1/1990 | Warnsholz | |
| 4,918,441 A * | | 4/1990 | Bohman | G05D 1/0242 340/901 |
| 4,967,362 A * | | 10/1990 | Schutten | A01B 69/008 701/50 |
| 5,044,210 A * | | 9/1991 | Kuhn | A01D 75/00 73/865.3 |
| 5,216,795 A * | | 6/1993 | Hansson | B25B 23/14 29/709 |
| 5,264,709 A | | 11/1993 | Kamimura | |
| 5,343,761 A | | 9/1994 | Myers | |
| 5,369,603 A | | 11/1994 | Myers | |
| 5,463,854 A | | 11/1995 | Chmielewski, Jr | |
| 5,480,354 A * | | 1/1996 | Sadjadi | G01N 21/314 460/149 |
| 5,568,405 A * | | 10/1996 | Easton | G01B 3/12 702/170 |
| 5,598,794 A * | | 2/1997 | Harms | A01C 7/102 701/50 |
| 5,680,750 A * | | 10/1997 | Stefl | A01D 45/021 56/99 |
| 5,751,576 A | | 5/1998 | Monson | |
| 5,790,428 A * | | 8/1998 | Easton | G01B 3/12 702/158 |
| 5,847,290 A | | 12/1998 | Kim | |
| 5,878,561 A | | 3/1999 | Gunn | |
| 5,921,070 A | | 7/1999 | Chamberlain | |
| 5,927,054 A | | 7/1999 | Chamberlain | |
| 5,991,694 A * | | 11/1999 | Gudat | A01B 79/005 701/50 |
| 6,041,583 A | | 3/2000 | Goering | |
| 6,073,427 A * | | 6/2000 | Nichols | A01D 41/1271 460/7 |
| 6,085,846 A * | | 7/2000 | Buchl | A01B 63/114 172/4 |
| 6,119,442 A * | | 9/2000 | Hale | A01D 41/127 56/10.2 H |
| 6,202,395 B1 | | 3/2001 | Gramm | |
| 6,216,795 B1 | | 4/2001 | Buchl | |
| 6,272,819 B1 | | 8/2001 | Wendte | |
| 6,431,981 B1 * | | 8/2002 | Shinners | A01D 41/1271 460/6 |
| 6,530,197 B1 | | 3/2003 | Christensen | |
| 6,584,390 B2 * | | 6/2003 | Beck | A01D 41/127 56/10.2 D |
| 6,615,570 B2 | | 9/2003 | Beck | |
| 6,668,223 B2 * | | 12/2003 | Blackmore | A01D 41/127 701/50 |
| 6,774,320 B2 | | 8/2004 | Simons | |
| 6,983,582 B1 * | | 1/2006 | Muckler | A01D 75/00 56/1 |
| 7,354,341 B1 * | | 4/2008 | Smith | A01D 41/127 460/4 |
| 7,357,036 B2 | | 4/2008 | Steprath | |
| 7,401,506 B2 | | 7/2008 | Kunow | |
| 7,401,528 B2 * | | 7/2008 | Deppermann | G01N 3/20 56/12.9 |
| 7,647,753 B2 | | 1/2010 | Schlipf | |
| 7,716,905 B2 * | | 5/2010 | Wilcox | A01D 41/1278 56/10.2 E |
| 7,739,861 B2 | | 6/2010 | Mackin | |
| 7,790,991 B2 | | 9/2010 | Verhaeghe | |
| 7,916,898 B2 * | | 3/2011 | Anderson | G01C 3/08 382/104 |
| 8,006,472 B1 | | 8/2011 | Schreiner | |
| 8,010,261 B2 * | | 8/2011 | Brubaker | A01D 41/1278 701/1 |
| 8,196,380 B2 * | | 6/2012 | Carboni | A01D 45/021 56/62 |
| 8,201,388 B1 | | 6/2012 | Vandeven | |
| 8,215,191 B2 * | | 7/2012 | Tragesser | A01D 43/085 73/862.627 |
| 8,220,235 B2 * | | 7/2012 | Kowalchuk | A01D 45/021 56/62 |
| 8,224,534 B2 * | | 7/2012 | Kowalchuk | A01D 45/021 56/106 |
| 8,418,636 B2 * | | 4/2013 | Liu | A01C 7/105 111/900 |
| 8,820,039 B2 * | | 9/2014 | Werning | A01D 41/1273 56/62 |
| 8,987,615 B2 | | 3/2015 | Khatavkar | |
| 9,030,549 B2 * | | 5/2015 | Redden | G06V 20/188 348/89 |
| 9,064,173 B2 * | | 6/2015 | Redden | G06V 10/255 |
| 9,066,463 B2 * | | 6/2015 | Lange | A01D 41/1278 |
| 9,213,905 B2 | | 12/2015 | Lange | |
| 9,232,693 B2 * | | 1/2016 | Hendrickson | A01D 45/023 |
| 9,282,693 B2 * | | 3/2016 | Anderson | A01B 79/005 |
| 9,310,329 B2 * | | 4/2016 | Acheson | A01D 41/1277 |
| 9,320,196 B2 * | | 4/2016 | Dybro | G01N 33/0098 |
| 9,322,629 B2 * | | 4/2016 | Sauder | A01B 79/005 |
| 9,360,383 B2 | | 6/2016 | Coleman | |
| 9,372,109 B2 * | | 6/2016 | Acheson | G01G 21/23 |
| 9,410,840 B2 * | | 8/2016 | Acheson | G01G 19/12 |
| 9,423,249 B2 | | 8/2016 | Deppermann et al. | |
| 9,485,914 B2 * | | 11/2016 | Schleicher | A01D 75/00 |
| 9,565,802 B2 * | | 2/2017 | Schleicher | A01D 41/1278 |
| 9,578,804 B2 | | 2/2017 | Gessel | |
| 9,578,808 B2 * | | 2/2017 | Dybro | A01D 75/00 |
| 9,609,806 B2 | | 4/2017 | Schlipf | |
| 9,645,006 B2 * | | 5/2017 | Phelan | G01F 25/10 |
| 9,658,201 B2 * | | 5/2017 | Redden | G01B 11/24 |
| 9,668,412 B2 | | 6/2017 | Ritter | |
| 9,668,420 B2 | | 6/2017 | Anderson | |
| 9,693,496 B2 * | | 7/2017 | Tevs | A01C 5/064 |
| 9,693,503 B2 * | | 7/2017 | Dybro | G01L 1/00 |
| 9,696,162 B2 | | 7/2017 | Anderson | |
| 9,717,171 B2 * | | 8/2017 | Redden | A01M 21/02 |
| 9,756,771 B2 * | | 9/2017 | Redden | A01B 41/06 |
| 9,804,097 B1 * | | 10/2017 | Tang | G01N 21/84 |
| 9,826,673 B1 | | 11/2017 | Ray | |
| 9,832,928 B2 * | | 12/2017 | Dybro | A01D 45/021 |
| 9,867,334 B2 * | | 1/2018 | Jongmans | A01D 41/1273 |
| 9,867,335 B1 * | | 1/2018 | Obbink | A01D 45/021 |
| 9,894,835 B2 * | | 2/2018 | Sauder | A01D 41/127 |
| 9,921,064 B2 * | | 3/2018 | Schleicher | G01C 21/10 |
| 9,927,242 B2 * | | 3/2018 | Schleicher | G01C 21/10 |
| 9,936,631 B1 * | | 4/2018 | Hubner | A01C 7/205 |
| 9,936,637 B2 * | | 4/2018 | Anderson | A01D 41/1271 |
| 9,972,058 B2 * | | 5/2018 | Romier | A01B 79/005 |
| 9,974,233 B2 * | | 5/2018 | Ueda | A01F 12/60 |
| 10,034,424 B2 * | | 7/2018 | Anderson | A01D 45/025 |
| 10,039,228 B2 | | 8/2018 | Walker | |
| 10,039,231 B2 * | | 8/2018 | Anderson | G01B 21/08 |

(56) References Cited

U.S. PATENT DOCUMENTS

| | | |
|---|---|---|
| 10,130,035 B2 | 11/2018 | Crow |
| 10,178,828 B2 | 1/2019 | Hendrickson et al. |
| 10,188,037 B2 | 1/2019 | Sauder |
| 10,255,670 B1 | 4/2019 | Wu |
| 10,295,703 B2 | 5/2019 | Dybro |
| 10,299,422 B2 | 5/2019 | Schleicher |
| 10,473,592 B2 | 11/2019 | Kramer et al. |
| 10,537,060 B2 * | 1/2020 | Sauder .................. G01S 19/42 |
| 10,582,662 B2 | 3/2020 | Ricketts |
| 10,713,768 B2 | 7/2020 | Berghoefer |
| 10,820,508 B2 * | 11/2020 | Dix ...................... G05D 1/0278 |
| 10,859,479 B2 * | 12/2020 | Brune ................ G01N 33/4833 |
| 11,048,938 B2 | 6/2021 | Hundley et al. |
| 11,064,653 B2 * | 7/2021 | Zielke ..................... H04Q 9/02 |
| 11,079,725 B2 * | 8/2021 | Palla .................. G05B 13/048 |
| 11,129,333 B2 | 9/2021 | Derscheid |
| 11,234,366 B2 | 2/2022 | Darr |
| 11,275,941 B2 | 3/2022 | Papanikolopoulos et al. |
| 11,297,768 B2 * | 4/2022 | Schildroth ........... A01D 45/023 |
| 11,432,464 B2 | 9/2022 | Hayashi |
| 11,678,607 B2 | 6/2023 | Zielke |
| 11,704,810 B2 | 7/2023 | Sneyders |
| 11,758,845 B2 * | 9/2023 | Zielke ..................... H04Q 9/02 |
| | | 340/425.1 |
| 11,758,848 B2 | 9/2023 | Eichhorn |
| 2002/0091458 A1 | 7/2002 | Moore |
| 2002/0173893 A1 | 11/2002 | Blackmore et al. |
| 2003/0019196 A1 | 1/2003 | Coers |
| 2004/0050138 A1 | 3/2004 | Beck |
| 2004/0194442 A1 | 10/2004 | Maertens |
| 2007/0044445 A1 | 3/2007 | Spicer et al. |
| 2007/0228707 A1 | 10/2007 | Curtis |
| 2007/0289281 A1 | 12/2007 | Altepost |
| 2008/0046154 A1 | 2/2008 | Bares |
| 2009/0192734 A1 | 7/2009 | Mackin |
| 2010/0089178 A1 | 4/2010 | Tragresser |
| 2011/0173942 A1 | 7/2011 | Kowalchuk |
| 2012/0029757 A1 | 2/2012 | Kowalchuk |
| 2012/0042618 A1 | 2/2012 | Lohrentz |
| 2012/0042619 A1 * | 2/2012 | Lohrentz ............. A01D 45/025 |
| | | 56/62 |
| 2012/0055131 A1 | 3/2012 | Zegota |
| 2012/0055133 A1 | 3/2012 | Lohrentz |
| 2012/0204528 A1 * | 8/2012 | Regier ................. A01D 45/021 |
| | | 56/62 |
| 2012/0253611 A1 | 10/2012 | Zielke |
| 2013/0125800 A1 * | 5/2013 | Landphair ........... A01B 79/005 |
| | | 701/32.4 |
| 2013/0152535 A1 | 6/2013 | Roberge |
| 2014/0020354 A1 | 1/2014 | Tilly |
| 2014/0116077 A1 | 5/2014 | Pierce |
| 2014/0230391 A1 * | 8/2014 | Hendrickson ...... G01N 33/0098 |
| | | 702/2 |
| 2014/0230580 A1 * | 8/2014 | Dybro ..................... G01L 1/00 |
| | | 56/103 |
| 2014/0236381 A1 * | 8/2014 | Anderson .............. A01D 75/00 |
| | | 701/1 |
| 2014/0294247 A1 | 10/2014 | Sirault |
| 2014/0311113 A1 | 10/2014 | Bonefas |
| 2014/0331631 A1 * | 11/2014 | Sauder .................... G01B 5/10 |
| | | 56/10.2 R |
| 2015/0082760 A1 | 3/2015 | Zentner |
| 2015/0082780 A1 * | 3/2015 | Dueckinghaus ........ A01F 29/14 |
| | | 60/327 |
| 2015/0257337 A1 | 9/2015 | Schrattenecker |
| 2015/0289438 A1 * | 10/2015 | Sauder .................... A01C 7/203 |
| | | 172/430 |
| 2015/0293029 A1 | 10/2015 | Acheson |
| 2015/0293068 A1 * | 10/2015 | Acheson ............... A01D 41/127 |
| | | 702/170 |
| 2015/0302305 A1 | 10/2015 | Rupp |
| 2015/0319929 A1 | 11/2015 | Hendrickson |
| 2015/0327440 A1 * | 11/2015 | Dybro .................... A01D 75/00 |
| | | 73/862.541 |
| 2015/0334920 A1 | 11/2015 | Schleicher |
| 2016/0037709 A1 * | 2/2016 | Sauder .................... A01C 21/00 |
| | | 700/275 |
| 2016/0041803 A1 | 2/2016 | Markov |
| 2016/0084813 A1 * | 3/2016 | Anderson ............. G01N 33/025 |
| | | 702/5 |
| 2016/0084987 A1 * | 3/2016 | Dybro .................... G01V 99/00 |
| | | 702/5 |
| 2016/0120129 A1 | 5/2016 | Verhaeghe |
| 2016/0174465 A1 | 6/2016 | Kohls |
| 2016/0338267 A1 | 11/2016 | Anderson |
| 2016/0345485 A1 | 12/2016 | Acheson |
| 2017/0061211 A1 | 3/2017 | Hundley et al. |
| 2017/0089742 A1 | 3/2017 | Bruns |
| 2017/0199528 A1 | 7/2017 | Detweiler |
| 2017/0228118 A1 | 8/2017 | Sugumarn et al. |
| 2017/0251600 A1 * | 9/2017 | Anderson ........... A01D 41/1272 |
| 2017/0332551 A1 * | 11/2017 | Todd .................. A01D 41/1272 |
| 2017/0339827 A1 * | 11/2017 | Anderson ........... A01D 41/1273 |
| 2018/0017965 A1 | 1/2018 | Kosa |
| 2018/0084275 A1 | 3/2018 | Ostermeier |
| 2018/0092303 A1 | 4/2018 | Goering |
| 2018/0121725 A1 | 5/2018 | Redden |
| 2018/0164471 A1 | 6/2018 | Dybro |
| 2018/0199509 A1 | 7/2018 | Ricketts |
| 2018/0228086 A1 * | 8/2018 | Cook .................... A01D 34/243 |
| 2018/0338423 A1 | 11/2018 | Lucca |
| 2018/0368321 A1 | 12/2018 | Noonan |
| 2018/0373259 A1 | 12/2018 | Aberle |
| 2019/0000007 A1 | 1/2019 | Schleicher |
| 2019/0059223 A1 | 2/2019 | Seiders |
| 2019/0110394 A1 * | 4/2019 | VanNahmen ........ A01D 34/006 |
| 2019/0150357 A1 | 5/2019 | Wu |
| 2019/0174667 A1 | 6/2019 | Gresch |
| 2019/0195762 A1 | 6/2019 | Brune |
| 2019/0258859 A1 | 8/2019 | Baynes |
| 2019/0261561 A1 | 8/2019 | Heitmann |
| 2020/0000034 A1 | 1/2020 | Schlipf |
| 2020/0008351 A1 * | 1/2020 | Zielke .................. A01D 45/021 |
| 2020/0053961 A1 * | 2/2020 | Dix ..................... A01D 41/127 |
| 2020/0060056 A1 | 2/2020 | Koch |
| 2020/0068803 A1 * | 3/2020 | Sauder .................... A01D 43/00 |
| 2020/0326674 A1 * | 10/2020 | Palla .................... A01D 41/141 |
| 2020/0394580 A1 * | 12/2020 | Bull ....................... G06Q 10/06 |
| 2021/0051849 A1 | 2/2021 | Asebedo |
| 2021/0059114 A1 * | 3/2021 | Eichhorn ............. G01B 5/0035 |
| 2021/0076569 A1 | 3/2021 | Blank |
| 2021/0132618 A1 | 5/2021 | Van Roekel |
| 2021/0168991 A1 | 6/2021 | Dix |
| 2021/0195824 A1 | 7/2021 | Van Roekel |
| 2021/0315160 A1 | 10/2021 | Zielke |
| 2021/0318118 A1 * | 10/2021 | Eichhorn ............... G08B 21/182 |
| 2021/0321567 A1 * | 10/2021 | Sidon .................... A01B 76/00 |
| 2021/0329837 A1 | 10/2021 | Schnaider |
| 2021/0329838 A1 * | 10/2021 | Zielke ................... G01B 17/00 |
| 2021/0352847 A1 | 11/2021 | Hunt |
| 2022/0000024 A1 * | 1/2022 | Zielke ................ A01D 41/1278 |
| 2022/0071093 A1 * | 3/2022 | Risius .................. A01D 45/021 |
| 2022/0078975 A1 | 3/2022 | Slichter |
| 2022/0132737 A1 * | 5/2022 | Anderson ............... G06V 10/44 |
| | | 56/10.2 E |
| 2022/0225569 A1 | 7/2022 | Zielke |
| 2022/0232759 A1 | 7/2022 | Sauder |
| 2022/0317688 A1 | 10/2022 | Li |
| 2022/0386527 A1 | 12/2022 | Schleicher |
| 2023/0000015 A1 * | 1/2023 | Herrmann ............ A01D 41/141 |
| 2023/0073551 A1 | 3/2023 | Holoubek |
| 2023/0139169 A1 | 5/2023 | Cleodolphi |
| 2023/0189690 A1 | 6/2023 | Friedlein |
| 2023/0229163 A1 | 7/2023 | Rust |
| 2023/0240185 A1 | 8/2023 | Zielke |
| 2023/0243693 A1 | 8/2023 | McClelland |
| 2023/0292664 A1 | 9/2023 | Zielke |
| 2023/0389473 A1 | 12/2023 | Reed |
| 2023/0401703 A1 | 12/2023 | Friedlein |
| 2024/0023482 A1 | 1/2024 | Zielke |
| 2024/0065156 A1 | 2/2024 | Woodcock |
| 2024/0081171 A1 | 3/2024 | Schwartz |
| 2024/0090379 A1 | 3/2024 | Eichhorn |

(56) References Cited

U.S. PATENT DOCUMENTS

| | | | |
|---|---|---|---|
| 2024/0373785 A1 | 11/2024 | Risius | |
| 2024/0389494 A1 | 11/2024 | Vorobiev | |
| 2025/0185540 A1 | 6/2025 | Eichhorn | |
| 2025/0194459 A1 | 6/2025 | Roe | |

FOREIGN PATENT DOCUMENTS

| | | | | |
|---|---|---|---|---|
| BR | 102017018379 A2 | * | 5/2018 | ............ A01D 46/08 |
| CA | 2313376 | | 7/2000 | |
| CA | 2313376 A1 | * | 1/2001 | ......... A01B 63/1115 |
| DE | 1928065 A1 | | 5/1970 | |
| DE | 112014000906 T5 | * | 11/2015 | ........... A01B 79/005 |
| EP | 2191439 B1 | | 2/2009 | |
| EP | 2047738 A2 | | 4/2009 | |
| EP | 3146831 A1 | * | 3/2017 | ........... A01D 34/003 |
| EP | 2944179 B1 | | 11/2017 | |
| EP | 3245859 A1 | | 4/2019 | |
| EP | 3095313 B1 | | 5/2019 | |
| EP | 3972381 A1 | | 3/2022 | |
| JP | 6216795 B2 | * | 10/2017 | ............ B01D 3/143 |
| WO | 2013078328 A2 | | 5/2013 | |

OTHER PUBLICATIONS

Birrell et al., "Corn Population Sensor for Precision Farming", American Society of Agricultural Engineers. Annual Meeting, 1995, vol. 95, No. 1334, Publisher: ASAE.

"Harvest Study Reveals most corn heads leaving yield in the field.", 2020 Special Report, 2020, Row by Row.

Farm Show, "Easton Goers, Inc. Space Wheel Checks Seed Placement In Field—Space Cadet", 1996, Publisher: Farm Show.

D. Easton, "Corn Population and Plant Spacing Variability: The Next Mapping Layer", 1996, pp. 723-727, Publisher: ASA-CSSA-SSSA, Published in: Madison, WI.

Hummel et al., "Sensing Corn Population—Another Variable in the Yield Equation", 2001.

Jonathan P. Kelly, "By-Plant Prediction of Corn Grain Yield Using Height and Stalk Diameter", 2009, Publisher: Faculty of the Graduate College of the Oklahoma State University.

Haizhou Li, "Design and Evaluation of a Non-Intrusive Corn Population Sensor", Trace: Tennessee Research and Creative Exchange, Doctoral Dissertations, Graduate School, Aug. 2007, Publisher: University of Tennessee, Knoxville.

Luck et al., "Sensor Ranging Technique for Determining Corn Plant Population", Faculty Papers and Publications in Animal Science—Animal Science Department, 2008, vol. 920, Publisher: University of Nebraska—Lincoln.

Plattner et al., "Corn Plant Population Sensor for Precision Agriculture", 1996.

"AutoTrac RowSense", Precision AG, , Page(s) https://www.deere.com/sub-saharan/en/technology-products/precision-ag/autotrac-rowsense/, Publisher: John Deere SSA.

Reichhardt Electronic Innovations, "Psr Sensor Guidance", , Page(s) www.reichhardt.com/us_products_autosteer-system_autoguidance-tac.html, Publisher: Reichhardt Electronic Innovations.

Headsight, Inc., Row Guidance for Corn, Jan. 2021, Page(s) https://headsight.com/row-guidance-corn, Publisher: Headsight, Inc.

Yeyin Shi, "Corn Plant Location, Spacing and Stalk Diameter Measurements Using Optical Sensing Technologies", May 2014, Publisher: Faculty of the Graduate College of the Oklahoma State University.

Shrestha et al., "Automatic Corn Plant Population Measurement Using Machine Vision", Transactions of the ASAE, 2003, pp. 559-565, vol. 46(2), Publisher: American Society of Agricultural Engineers.

Sudduth et al., "Field Evaluation of a Corn Population Sensor", 2000.

Yu et al., "Outlier Elimination for Robust Ellipse and Ellipsoid Fitting", Oct. 24, 2009.

Contributions to Wikimedia projects (Feb. 20, 2020), Numerical integration. Wikipedia. Https://web.archive.org/web/20200325094046/https://en.wikipedia.org/wiki/numerical_integration (Year: 2020).

Area of a circle (Mar. 10, 2020). Wikipedia. Https://web.archive.org/web/20200325064526/https://en.wikipedia.org/wiki/Area_of_acircle (year 2020).

Gore, L. M. 1996. Report: Stalk counter for VRT study fall of 1995. Deere & Co. Moline, IL.

Miller et al (Nov. 16, 2016). The Plant Journal. https://onlinelibrary.wiley.com/doi/pdf/10.1111/tpj. 13320.

of GIS Ag Maps (here in as GIS), "Yield Monitor Data Post-Calibration (Linear and Non-Linear) Examples", Jan. 20, 2022, 8 pages + 1 SS page (9 pgs total).

Li, Dawei, et al. "An overlapping-free leaf segmentation method for plant point clouds." IEEE Access 7 (2019): 129054-129070 (Year: 2019).

* cited by examiner

APPARATUS, SYSTEMS AND METHODS FOR STALK SENSING

CROSS-REFERENCE TO RELATED APPLICATION(S)

This application claims priority under 35 U.S.C. § 119(e) and/or § 120 to U.S. Provisional Application 63/006,774, filed Apr. 8, 2020, and entitled "Agricultural Devices, Systems, and Methods," which in incorporated by reference herein for all purposes.

This application is a continuation in part of U.S. application Ser. No. 17/013,037, filed Sep. 4, 2020, entitled "Apparatus, Systems and Methods for Stalk Sensing," which claims the benefit of U.S. Application 62/895,676, filed Sep. 4, 2019 and entitled "Apparatus, Systems And Methods for Stalk Sensing," each of which is hereby incorporated herein by reference in their entirety for all purposes.

TECHNICAL FIELD

This disclosure relates generally to agricultural implements, more particularly agricultural implements and sensors for detecting, measuring, and displaying information about plant stalks during harvest.

BACKGROUND

The prior art discloses using moveable stripper (deck) plates to measure the diameter of stalks moving between the plates. This has the disadvantage of multiple stalks being present between the plates simultaneously. This, in turn, may prevent detection or measurement of smaller stalks while larger stalks are also present between the plates. Other prior art discloses a method to measure a single stalk passing between members disposed to move laterally or rotationally when a stalk passes by. The drawback of this method arises when a stalk 2 passes along the extreme edges of the measurement fixture, contacting only one of the sensing members 4 and making a correct diameter (d) measurement impossible, shown for example in FIG. 1.

The prior art also teaches a sensing method comprising overlapping, rotating, sensing members 4 that contact the stalk 2 as it passes by, shown for example in FIG. 2. This method reduces the diameter (d) measurement errors present in the horizontally moveable sensing method for single stalk measurement discussed above. Yet, these methods are subject to sensor tip wear over time.

These known methods have an issue with physical wear of the sensing members 4. Over 5 million corn stalks could be reasonably expected to pass through each sensing mechanism each season. An example of this physical wear including sensor tip wear is shown in FIG. 3. These worn sensing members 4 will no longer accurately measure stalk diameter (d).

Additionally, another disadvantage of the prior art is that with 5 million cycles anticipated each season noticeable wear is expected on any dynamic seal. Additionally, there is significant dust generated during the harvest operation that can accelerate wear of any dynamic seal or bearing.

Further, normal field operations may also be expected to cause periodic plugging or jamming of the corn head with plant material or soil, potentially causing permanent misalignment of the sensing members 4. Corn head gathering chains may be operated in reverse to expel stalks and other debris that may periodically jam in the stalk rollers and gathering chains. The prior art methods do not teach any method to that would prevent damage to the sensing members 4 when stalks 2 or debris must pass through the corn head in the opposite direction.

Finally, while the sensing members 4 need an adequate force to return them to a neutral position quickly enough to distinguish between individual stalks 2 passing by, the rigid nature of these known sensing members 4 can easily rebound off of a target and cause measurement oscillations that make distinguishing individual stalks 2 difficult.

There is a need in the art for devices, systems, and methods for sensing corn stalks and various parameters thereof during harvest.

BRIEF SUMMARY

Disclosed are stalk sensing devices, systems, and methods that address the various shortcomings noted above. In various implementations, the flexible, resilient sensing member(s) or wand(s) eliminates the need for any kind of dynamic seal. The disclosed implementations may also eliminate any gap between the sensing members when a stalk is not present. Further, in some implementations, sensing member(s) are kept in contact by the force of the resilient member(s) themselves.

Disclosed herein are various harvesters, more specifically corn heads and associated sensors and data visualization systems for use in conjunction with combine harvesters. Various sensors mounted on a corn head may count and measure corn stalks as they pass through the corn head during harvest. Various processing components and display units may be used to calculate and display information about the measured stalks to provide the user with information about yield including on a row-by-row and plant-by-plant level, as would be appreciated.

In Example 1, a stalk measuring system comprising a row unit, at least one resilient sensing member engaged with the row unit, a distance sensor within a housing on the row unit, and a sensor target on the at least one resilient sensing member, wherein the distance sensor is constructed and arrange to measure the deflection of the sensor target as the resilient sensing member flexes in response to harvest operations.

In Example 2, the system of Example 1, wherein the amount of deflection corresponds to stalk perimeter.

In Example 3, the system of Example 1, wherein deflection corresponds to a stalk count.

In Example 4, the system of Example 1, wherein the at least one resilient sensing member is comprised of at least one of elastic, viscoelastic, nitrile, ethylene propylene diene terpolymer (EPCM), neoprene, natural rubber, silicone, fluoro-elastomer, and spring steel.

In Example 5, the system of Example 1, wherein the at least one resilient member is comprised of a composite material, wherein the composite material comprises at least one of cellulose, aramid, nylon, glass, and carbon fiber.

In Example 6, the system of Example 1, wherein the at least one resilient member further comprises a contact surface and an additional material disposed on the contact surface.

In Example 7, the system of Example 6, wherein the additional material is at least one of acetal, resin, nylon resin, thermoplastic polyester elastomer, liquid crystal polymer resin, and metal.

In Example 8, a stalk sensor comprising a first wand operationally engaged with a first side of a row unit at an attachment point, a first distance sensor disposed on the row unit in proximity to the first wand, and a first sensor target embedded within the first wand, wherein the stalk sensor is constructed and arranged to measure the deflection of the first wand in response to passage of a stalk through the stalk sensor, and wherein the amount of deflection corresponds to the perimeter of the stalk.

In Example 9, the stalk sensor of Example 8, wherein the first sensor target is a magnet.

In Example 10, the stalk sensor of Example 9, wherein the first distance sensor is a magnetic field sensor.

In Example 11, the stalk sensor of Example 8, further comprising a second distance sensor disposed on the row unit and a second sensor target embedded within the second wand.

In Example 12, the stalk sensor of Example 8, further comprising a second wand operationally engaged with a second side of the row unit, a second distance sensor disposed on the row unit in proximity to the second wand, and a second sensor target disposed within the second wand, wherein the stalk sensor is constructed and arranged to measure the amount of deflection of the first wand and the second wand in response to passage of a stalk through the stalk sensor, and wherein the cumulative amount of deflection of the first wand and the second wand corresponds to the perimeter of the stalk.

In Example 13, the stalk sensor of Example 12, wherein the first distance sensor and second distance sensor are magnetic field sensors and the first sensor target and second sensor target are magnets.

In Example 14, the stalk sensor of Example 13, wherein the first wand and second wand are arranged to span across an entirely of a stripper plate gap of the row unit.

In Example 15, a stalk sensing system comprising a row unit, a first wand comprising a first magnet, the first wand disposed a first side of the row unit, and a second wand comprising a second magnet, the second wand disposed on a second side of the row unit, a first magnetic field sensor disposed on the first side of the row unit, the first magnetic field sensor constructed and arranged to measure a deflection distance of the first wand, a second magnetic field sensor disposed on the second side of the row unit, the second magnetic field sensor constructed and arranged to measure a deflection distance of the second wand, wherein the sum of the deflection distance of the first wand and the deflection distance of the second wand correspond to a stalk perimeter.

In Example 16, the system of Example 15, wherein the first wand and the second wand are arranged to be substantially opposite each other on the row unit and located on the same horizontal plane.

In Example 17, the system of Example 15, wherein the first wand and the second wand are arranged to be substantially opposite each other on the row unit and located on the different horizontal planes.

In Example 18, the system of Example 15, wherein the first wand and the second wand are arranged in sequence on the row unit.

In Example 19, the system of Example 15, wherein the first wand and the second wand are arranged such that a first end of the first wand overlaps with a first end of a second wand at the center of the row unit.

In Example 20, the system of Example 15, wherein the first wand and the second wand are mounted below a set of stripper plates on the row unit.

Example 21 relates to a yield reporting system, comprising a sensor assembly configured to measure one or more yield data inputs and an operations system. The operations system comprising a communications component configured for receiving yield data inputs from the sensor assembly and a central processing unit configured for processing data and executing one or more predictive yield data processing techniques to predict yield values in real-time or near real-time, the central processing unit in communication with the communications component.

In Example 22, the system of Example 21, further comprising a display in communication with or housing the operations system, wherein the display is configured to display predicted yield values to an operator.

In Example 23, the system of Example 21, wherein the central processing unit is further configured for generating and storing a yield map in a storage device.

In Example 24, the system of Example 21, wherein the yield data inputs comprise one or more of stalk number, stalk size, sensor deflection distance, and sensor deflection time.

In Example 25, the system of Example 21, wherein the yield data inputs further comprise one or more of historical yield data, field parameters, weather data, and seed or plant parameters.

In Example 26, the system of Example 21, further comprising a historical yield database in communication with the operations system and the central processing unit.

In Example 27, the system of Example 21, further comprising a yield monitor configured to measure actual yield values during harvest operations, wherein the actual yield values are received by the communications component.

Example 28 relates to a method for predicting yield values, comprising inputting one or more yield data inputs; executing one or more predictive yield data processing techniques on the one or more yield data inputs; and predicting one or more yield values in real time.

In Example 29, the method of Example 28, wherein the one or more yield data inputs comprise one or more of stalk count, stalk size, weather data, historical yield data, seed/plant parameters or field parameters.

In Example 30, the method of Example 28, wherein the predictive yield data processing techniques comprises utilizing one or more of a Kalman filter, machine learning, a look up table, or filtering outliers.

In Example 31, the method of Example 28, wherein the yield data inputs comprise one or more stalk values, and wherein the one or more stalk values comprise one or more of stalk number, stalk size, sensor deflection distance, and sensor deflection time.

In Example 32, the method of Example 28, wherein the yield data inputs comprise historical yield data.

In Example 33, the method of Example 28, further comprising displaying the one or more yield values to an operator.

Example 34 relates to a method of monitoring stripper plate position, comprising: inputting one or more stalk measurement inputs; inputting a threshold range for the one or more stalk measurement inputs; and determining if the one or more stalk measurement inputs are within the threshold range for the one or more stalk measurement inputs, wherein the threshold range is a range of values for the one or more stalk measurement inputs when a row unit is operating properly.

In Example 35, the method of Example 34, further comprising emitting an alarm when the one or more stalk measurement inputs are outside the threshold range for the one or more stalk measurement inputs.

In Example 36, the method of Example 34, further comprising adjusting a width between a pair of stripper plates on a row unit when the one or more stalk measurement inputs are outside the threshold range for the one or more stalk measurement inputs.

In Example 37, the method of Example 34, wherein the one or more stalk measurement inputs comprise one or more of stalk diameter, stalk width, stalk cross-sectional area, deflection time, and deflection distance.

In Example 38, the method of Example 34, further comprising executing statistical filtering techniques for removing outliers within the one or more stalk measurement inputs.

In Example 39, the method of Example 34, further comprising detecting a plugged row unit via the one or more stalk measurement inputs, and further adjusting a width between a pair of stripper plates on the row unit a plugged row unit is detected.

In Example 40, the method of Example 34, further comprising logging a width between a pair of stripper plates on the row unit over time.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various implementations disclosed or contemplated herein relate to various devices, systems and methods for the sensing of plants as they pass through a sensing system. That is, the various implementations include one or more sensing members mounted to a harvester row unit to engage with stalks as they enter the row unit. The various sensing members are used in conjunction with various processing components to measure stalk perimeter, count stalks, detect missing and late emerged plants, and estimate and/or predict yield, among other functions that would be appreciated by those of skill in the art.

It would be understood the various sensor systems can be used with various agricultural systems including guidance, navigation, mapping, and yield monitoring systems. The various sensor systems disclosed herein can be incorporated into, used in conjunction with, or used as part of any other known agricultural system. For example, the various implementations disclosed herein may be incorporated into or used with any of the agricultural system disclosed in U.S. Pat. No. 10,684,305 issued Jun. 16, 2020, entitled "Apparatus, Systems and Methods for Cross Track Error Calculation From Active Sensors," U.S. patent application Ser. No. 16/445,161, filed Jun. 18, 2019, entitled "Agricultural Systems Having Stalk Sensors and/or Data Visualization Systems and Related Devices and Methods," U.S. patent application Ser. No. 16/800,469, filed Feb. 28, 2020, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 16/918,300, filed Jul. 1, 2020, entitled "Apparatus, systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. Patent Application 63/048,797, filed Jul. 7, 2020, entitled "Apparatus, Systems, and Methods for Grain Cart-Grain Truck Alignment and Control Using GNSS and/or Distance Sensors," U.S. Patent Application 63/074,737, filed Sep. 4, 2020, entitled "Apparatus, Systems and Methods for an Electric Corn Head," U.S. Patent Application 63/137,946, filed Jan. 15, 2021, entitled "Apparatus, Systems, and Methods for Row Crop Headers," and U.S. patent application Ser. No. 17/225,586, filed Apr. 8, 2021, and entitled "Devices, Systems, and Methods for Corn Headers," and U.S. patent application Ser. No. 17/225,740, filed Apr. 8, 2021, and entitled "Devices, Systems, and Methods for Sensing the Cross-Sectional Area of Stalks," each of which are incorporated herein by reference.

Figure 1:
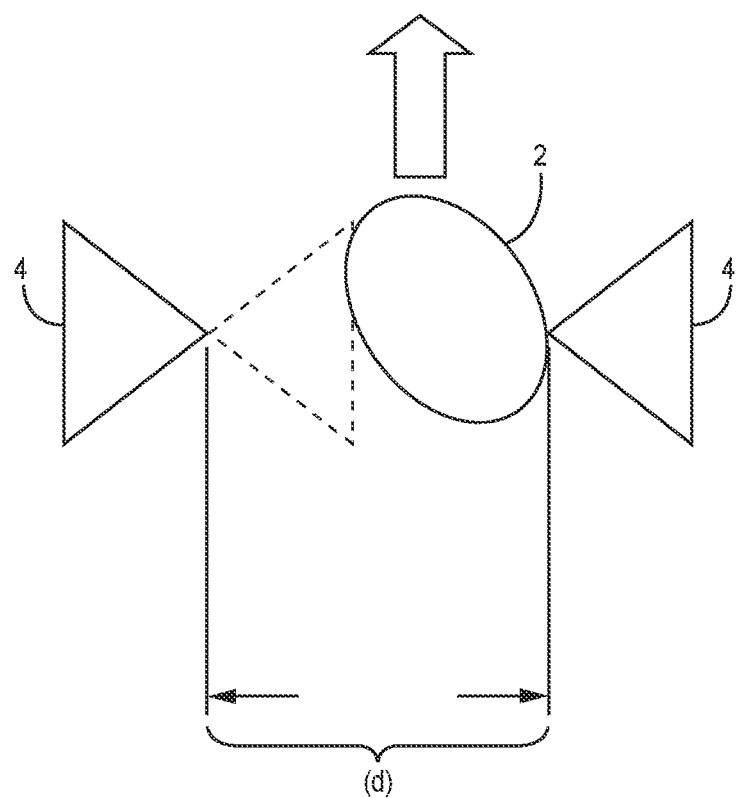
FIG. 1 shows a prior art implementation of a stalk sensor.
Figure 2:
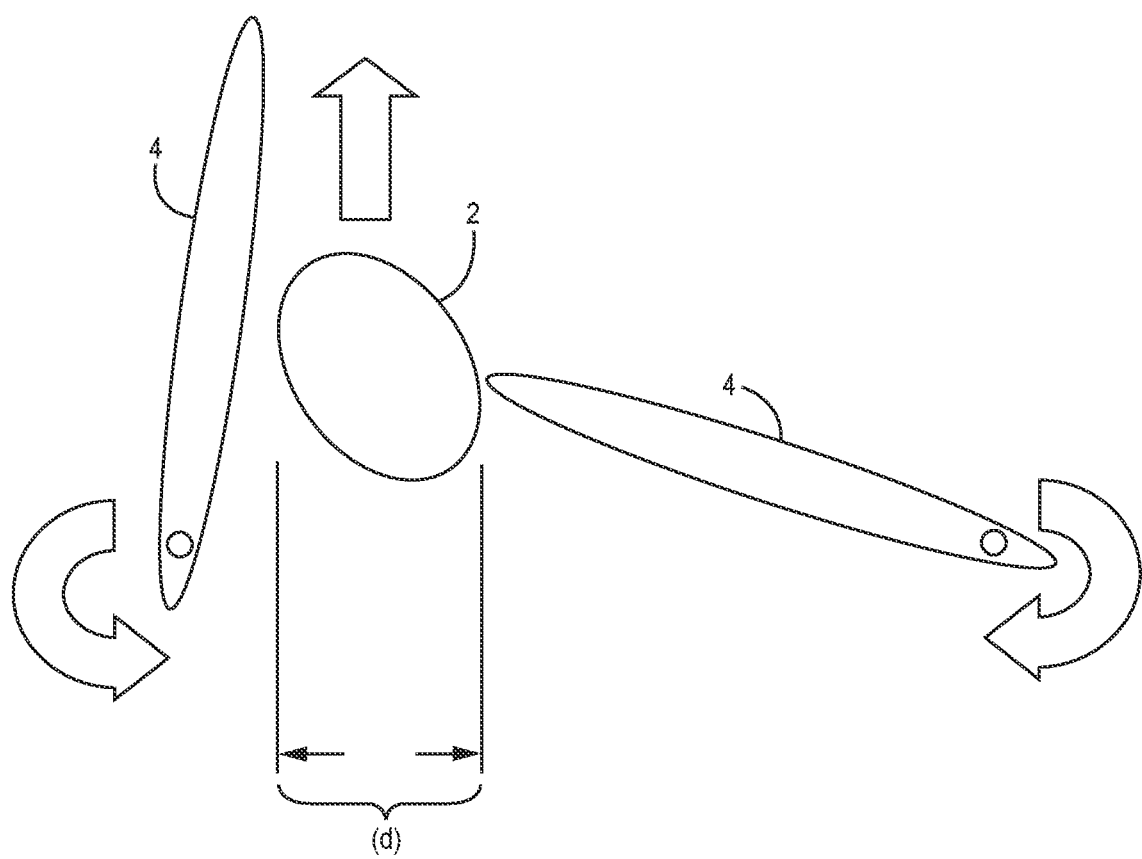
FIG. 2 shows another prior art implementation of stalk sensor.
Figure 3:
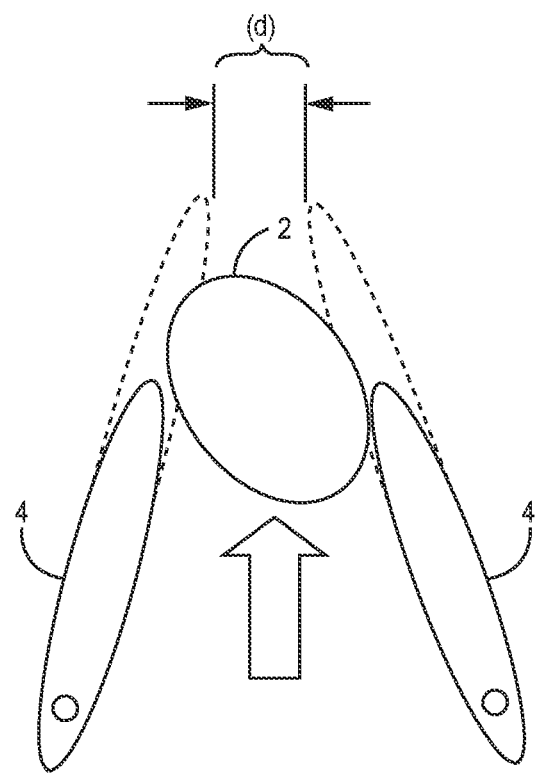
FIG. 3 shows sensor tip wear of a prior art stalk sensor.
Figure 4:
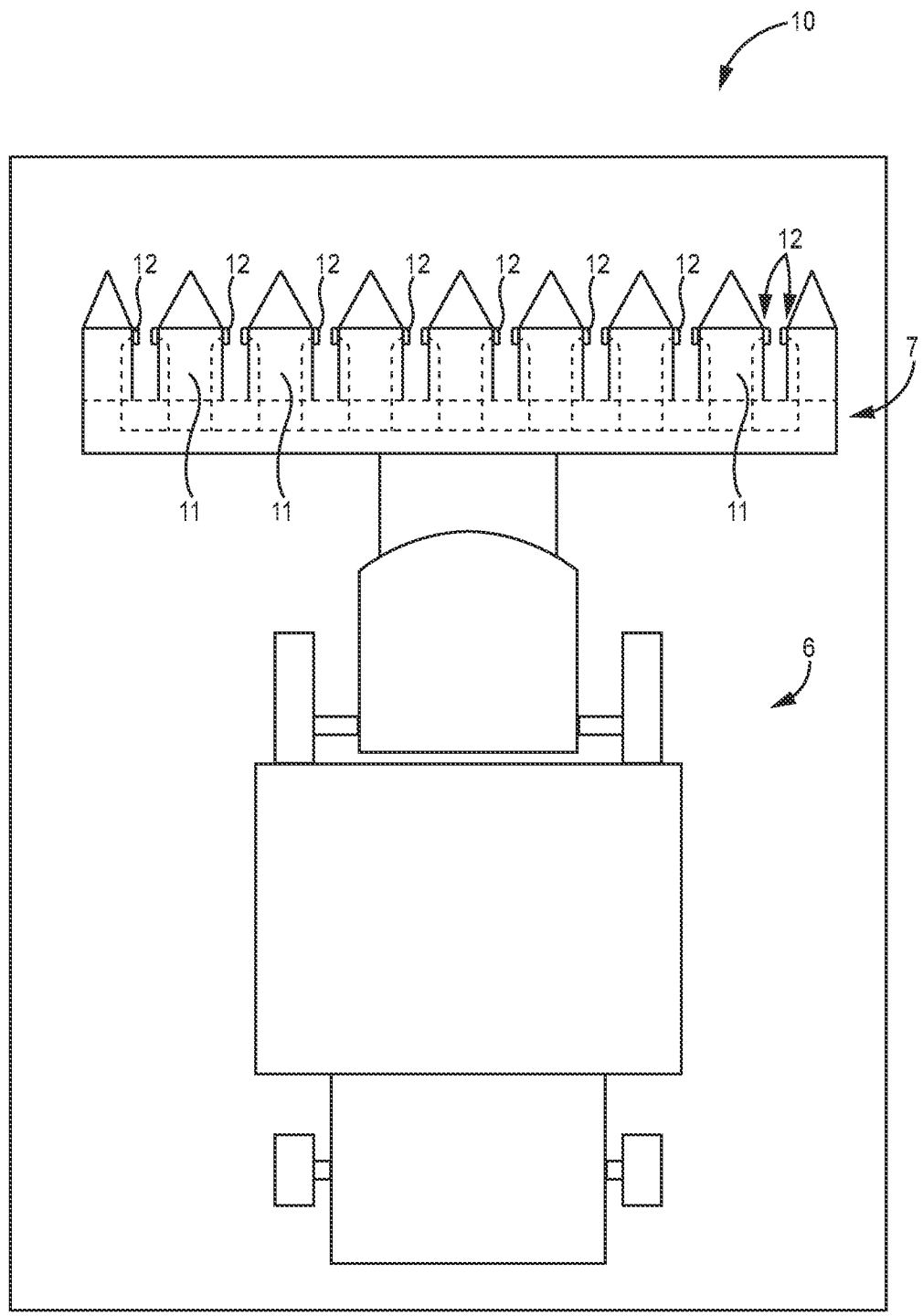
FIG. 4 is a top view of a harvester and corn head, according to one implementation.

Continuing with the figures, FIG. 4 shows a schematic drawing of a stalk sensing system 10. In various implementations, the stalk sensing system 10 is used in conjunction with a harvester 6, such as a combine 6, with a corn head 7. As would be appreciated, in various implementations, a corn head 7 is made up of a plurality of row units 11. Typically, each row unit 11 is substantially identical on a single corn head 7, however, certain variations in configuration are possible and readily understood. In certain implementations, each row unit 11 includes one or more sensing members 12.

FIGS. 5-28 show various implementations of a stalk sensing system 10 having resilient sensing members 12 utilized for detecting, evaluating and counting the presence of row crop stalks. These various implementations of the stalk sensing system 10 can be used to establish various characteristics about the row crop such as the number of plants, the size of the plants and other factors, and can be used by the operator in various useful estimates in combination with other technologies, such as processing and visualization technologies, as is described in detail herein.

I. Resilient Member Stalk Diameter Measurement

Continuing with FIGS. 4-28, the advantages of using one or more resilient member(s) 12 include improved wear performance over designs using bearing or dynamic seals, member 12 flexibility that allows stalks 2 moving in the opposite direction to pass by without causing damage, significant reduction in signal oscillation due to member 12 rebound, and resistance to damage from foreign objects entering the corn head 7. Further advantages will be apparent to those of skill in the art from the present disclosure.

Figure 5:
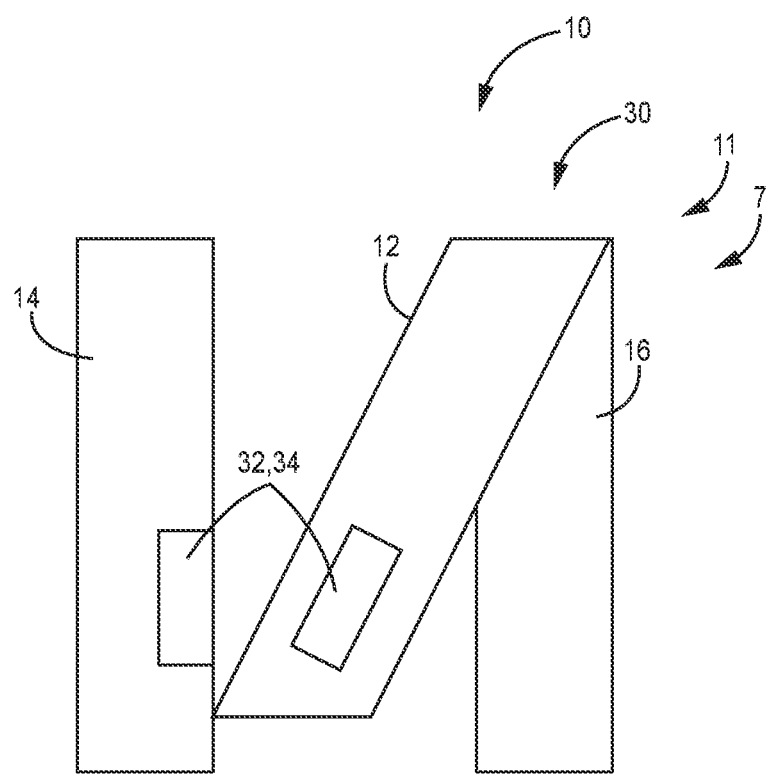
FIG. 5 is a top view of a single wand sensor, according to one implementation.

In various implementations of the stalk sensing system 10, shown for example in FIG. 5, the resilient member 12 is connected to a member attachment 16 in connection with a row unit 11. Further, in certain implementations, the system 10 includes a fence 14 disposed on the row unit 11 opposite of the member attachment 16 that is constructed and arranged to act as a stop for the wand(s) 12 and optionally a guide for various stalks 2 as they enter the row unit 11. It is appreciated that the wand(s) 12 are then able to return to starting position(s) prior to a subsequent stalk 2 entering the corn head 7, as described herein.

FIG. 5 depicts one such implementation of a stalk sensing system 10 having one or more wands 12 of resilient, elastic material (also referred to as resilient members). The wands 12 are constructed and arranged to be deflected by passing stalks 2 during harvest operations. In some implementations, the stalk sensing system 10 is a single member sensor 30 (shown for example in FIGS. 5-11B, 14-15, 18-21, 26, and 28) or a dual member sensor 40 (shown for example in FIGS. 12A-B, 16, 17, 22-25 and 32A-33B). In these implementations, the various wands 12 may contain sensors 32 or sensor targets 34 that allow the deflection of the wands 12 to be measured. In various implementations, the sensors 32 may be electromagnetic sensors, non-contact inductive position sensors, inductance sensors, capacitive sensors, optical sensors, flexible resistance sensors, load cells, ultrasonic distance sensors, or other sensor type as would be appreciated by those of skill in the art.

Figure 6A:
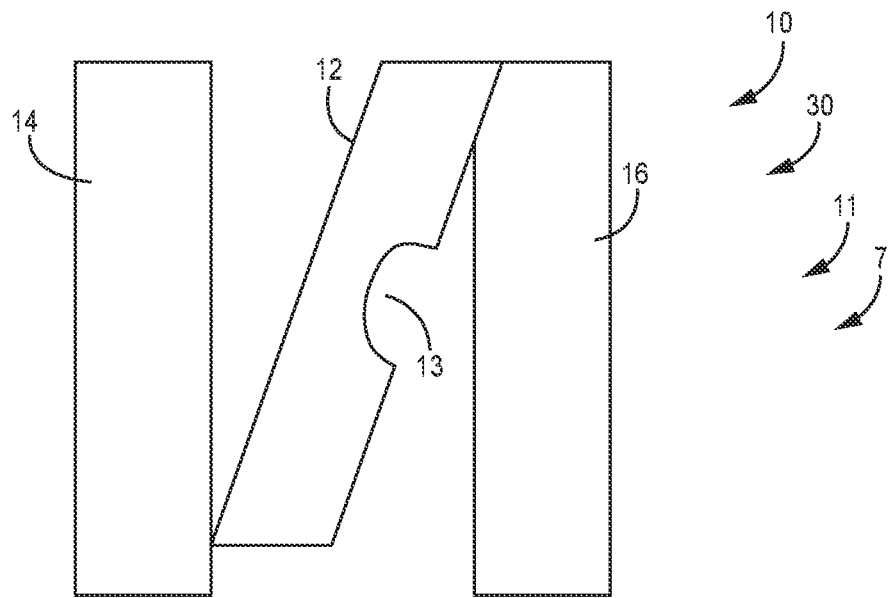
FIG. 6A is a top view of a single wand sensor with varying thickness, according to one implementation.
Figure 6B:
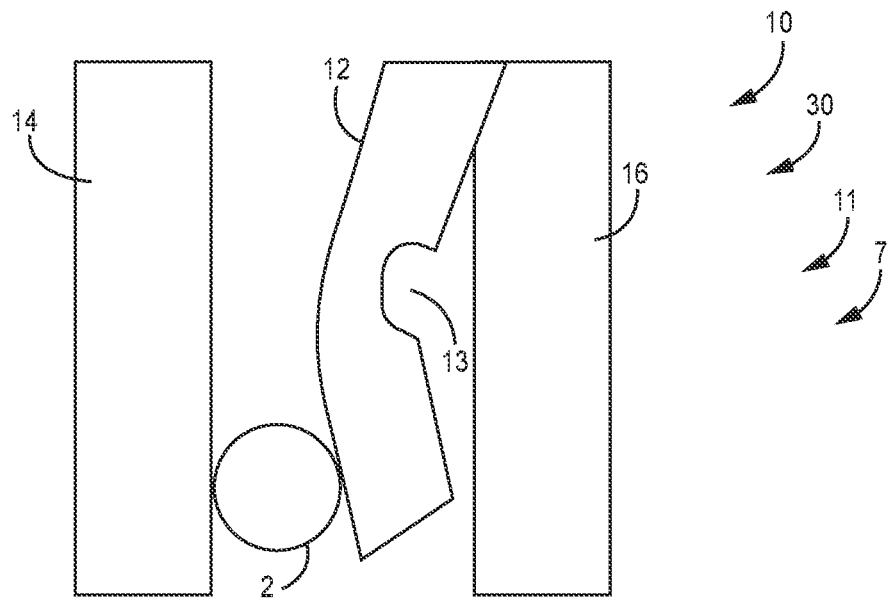
FIG. 6B shows the single wand sensor of FIG. 6A with a stalk passing through the sensor, according to one implementation.

In certain implementations, the resilient member wand 12 may include a portion that is thinner than the surrounding material, causing the wand 12 to preferentially bend or flex preferentially in this tapered portion 13 when the stalks 2 pass through the sensor 30, as shown in FIGS. 6A and 6B. Further implementations are of course possible.

In certain implementations, the resilient member wands 12 are made of polyurethane rubber, but could also be constructed of other elastic, viscoelastic, or even metal materials. Examples include, but are not limited to, nitrile, ethylene propylene diene terpolymer (EPDM), neoprene, natural rubber, silicone, fluoro-elastomer, and spring steel. Further elastic or viscoelastic materials are of course contemplated.

In various additional implementations, the resilient member(s) 12 may be composite, that is, they may comprise several materials including those that alter the physical properties of the resulting composite material, as would be familiar to those skilled in the art. Examples include, but are not limited to, inclusion of cellulose, aramid, nylon, glass, or carbon fibers. That is, in certain implementations of the system 10 disclosed herein, the member 12 or members 12 comprise more than one of the disclosed materials or material types as a composite, alloy, polymer or the like.

Figure 7A:
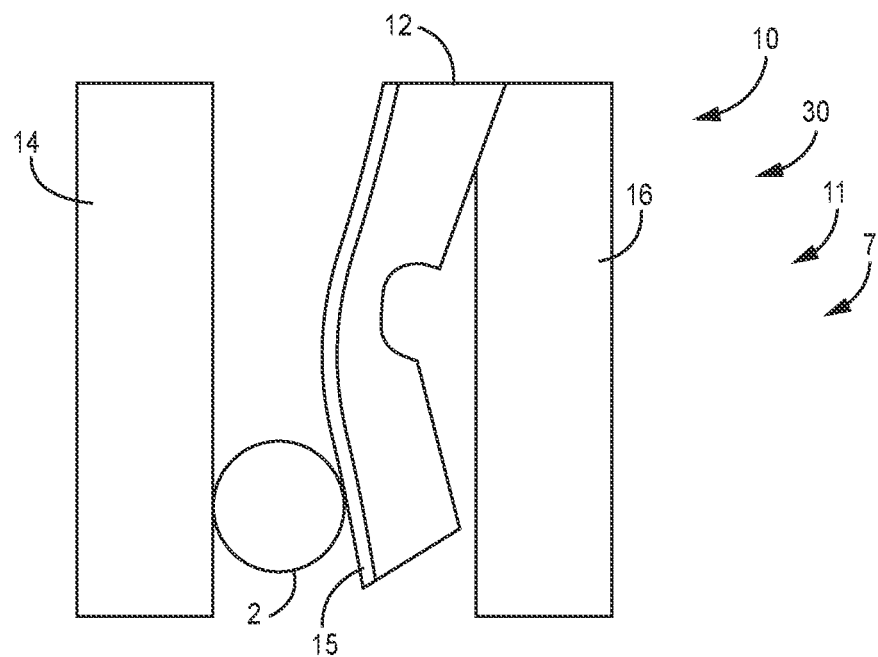
FIG. 7A is a top view of a single wand sensor with additional material along the length of the wand, according to one implementation.
Figure 7B:
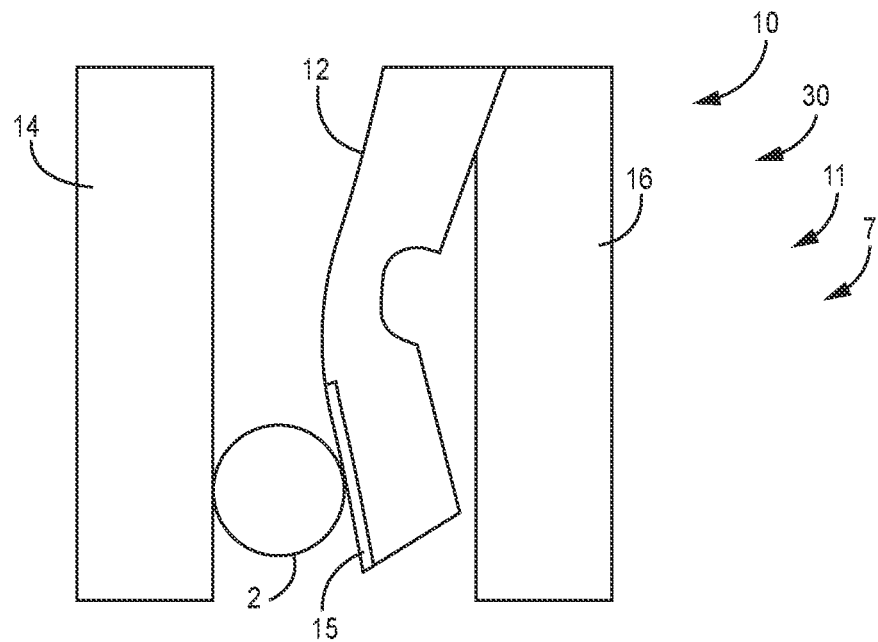
FIG. 7B is a top view of a single wand sensor with additional material at the lip of the wand, according to one implementation.
Figure 8:
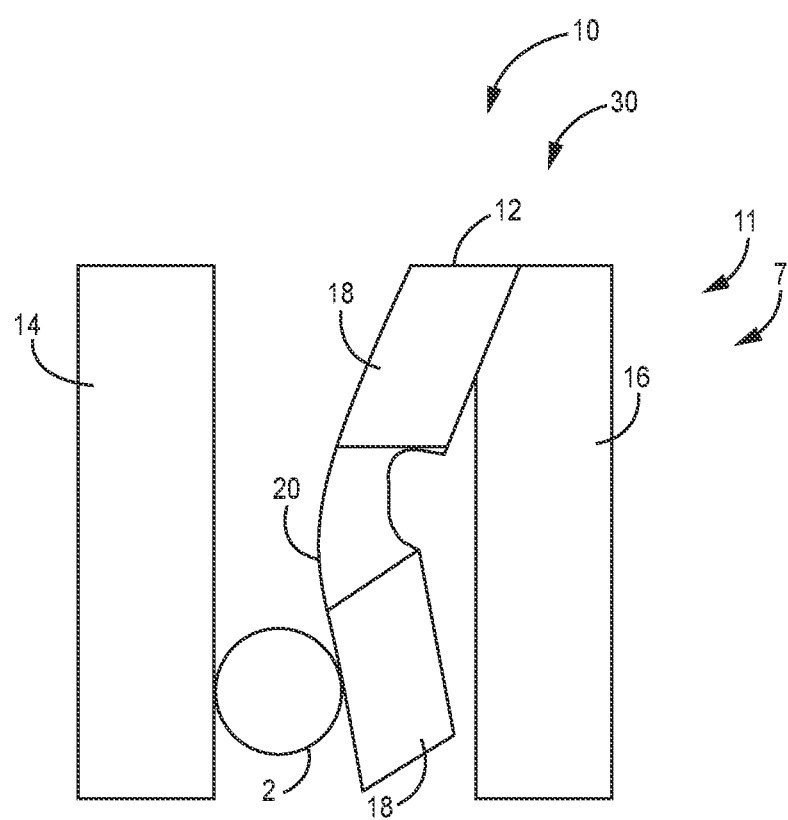
FIG. 8 is a top view of a single wand sensor having both rigid and resilient portions, according to one implementation.
Figure 9A:
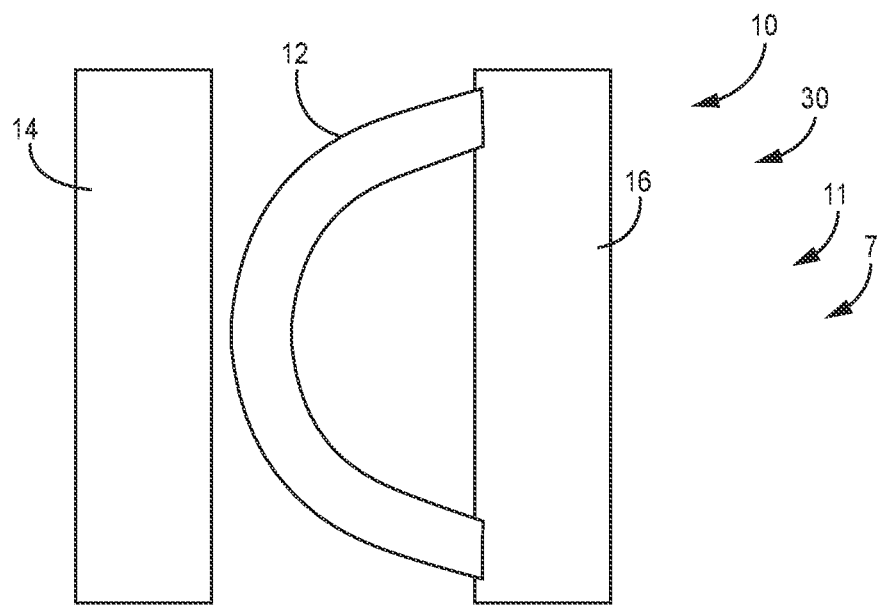
FIG. 9A is a top view of a single wand sensor having two attachment points, according to one implementation.
Figure 9B:
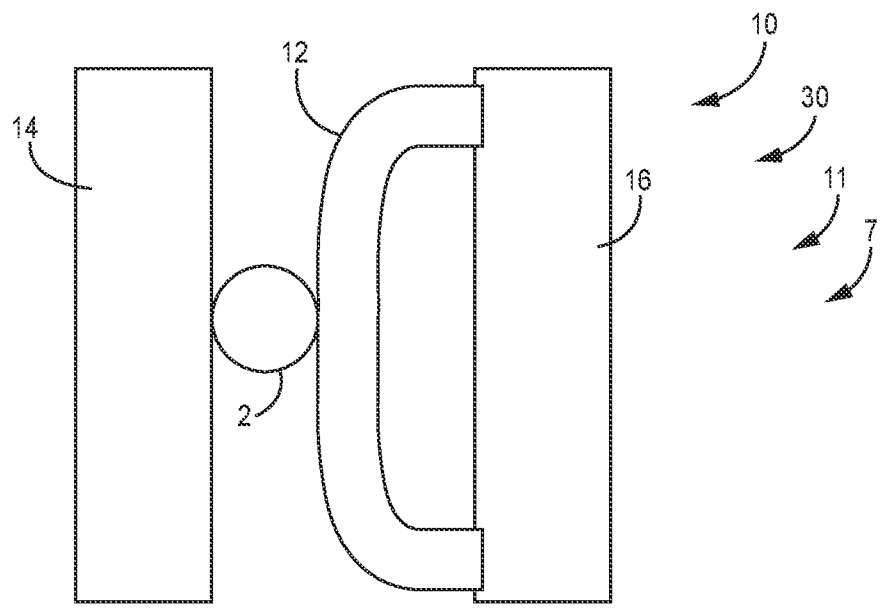
FIG. 9B shows the single wand sensor of FIG. 9A with a stalk passing through the sensor, according to one implementation.

As would be understood, corn leaves and stalks 2 are mildly abrasive and therefore could cause wear over time on resilient members 12 made from certain materials that would otherwise be suited to this type of use. In various of these instances an optional additional material 15 could be added to the resilient member 12. In some implementations, the additional material 15 may extend along the entire length of the contact portion of the resilient member 12, as shown in FIG. 7A. In various alternative implementations, the additional material 15 may be present only on the tip/distal end of the contact side of the resilient member 12, as shown in FIG. 7B. This additional material 15 may exhibit a range of flexibilities such as to be similar to the resilient member 12 or in various other implementations the additional material 15 may be very rigid. Examples for this additional material 15 include, but are not limited to, acetal resin, nylon resin, thermoplastic polyester elastomer, liquid crystal polymer resin, or a wide range of metals.

The geometry and stiffness of the resilient member(s) 12 and their material composition are designed to provide an adequate, but not excessive, restoring force to the neutral position. Insufficient restoring force may result in a sluggish return of the resilient member or members to their neutral position. But, excessive restoring force may increase the likelihood of the resilient member 12 or members 12 not flexing in response to an incoming stalk 2 but instead pushing over the incoming stalks 2 and/or causing stalks 2 to bunch and potentially plug the corn head 7. That is, proper restoring force will not impede crop flow, yet is still capable of detecting closely spaced corn stalks 2, as would be readily appreciated. Accordingly, in certain implementations the resilient member(s) 12 are configured to have between about 1 to about 4 pounds of restoring force urging them back into the neutral position. It is appreciated that certain implementations have a total of about 2 pounds of restoring force applied by the resilient member(s) 12.

In one example, stalks 2 may be spaced about one (1) inch apart and a harvester traveling at six miles per hour; in this example the system 10 has about 0.01 seconds to differentiate between stalks 2. While the resilient member or members 12 do not need to return to the fully neutral position in this time, the member(s) 12 must return far enough to distinguish each individual stalk 2. If the resilient member 12 were not to return to a neutral position or substantially so, the two stalks 2 may appear the same as a corn ear, a mass of vegetation, or other anomaly.

In another implementation, the resilient member 12 or members 12 comprise a combination of rigid portions 18 and elastic, resilient portions 20. In various implementations, more rigid portions 18 are located where the member contacts the corn stalk 2 and the elastic, resilient portions 20 are located where flexibility is desired to allow the member(s) 12 to deflect, shown for example in FIG. 8. Of course alternative configurations are possible, as would be appreciated.

Implementations of sensing system 10 may include various geometries and configurations of one or more resilient members 12, fences 14, and member attachments 16. In various implementations, a resilient member 12 or members 12 have one connection to the member attachment(s) 16, as shown for example in FIGS. 4-8. In various alternative implementations, the resilient member 12 or members 12 have two connections to the member attachment(s) 16, shown for example in FIGS. 9A and 9B.

Figure 10A:
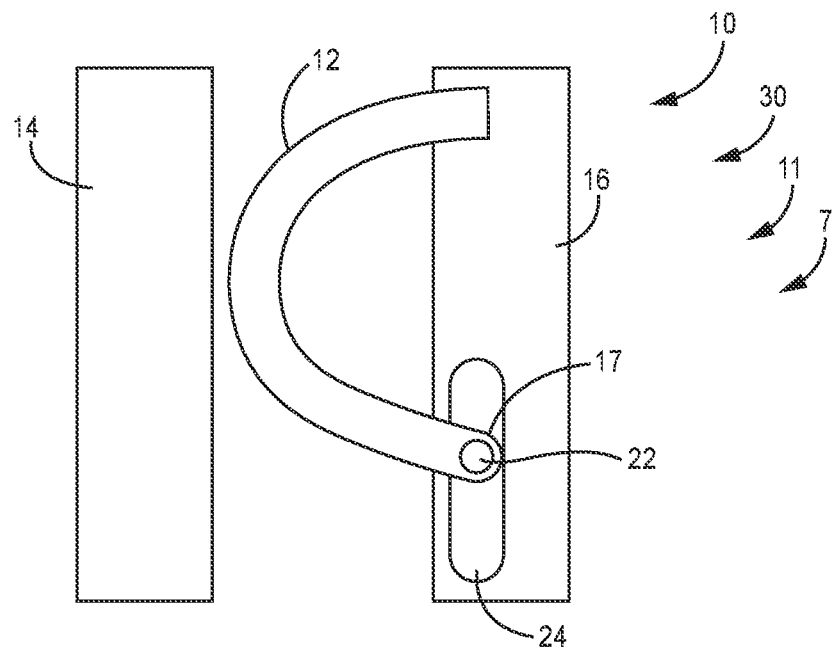
FIG. 10A is a top view of a single wand sensor with a sliding joint, according to one implementation.
Figure 10B:
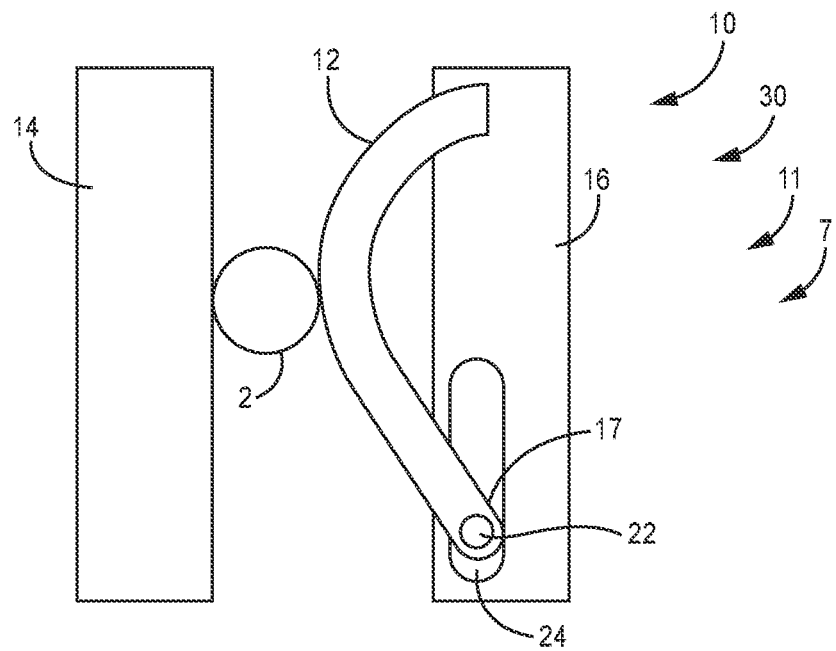
FIG. 10B shows the single wand sensor of FIG. 10A with a stalk passing through the sensor, according to one implementation.

In certain implementations, the resilient member 12 or members 12 have one fixed connection to the member attachment(s) 16 and one sliding joint attachment 17, shown for example in FIGS. 10A and 10B. In these implementations, the resilient member 12 or members 12 are fixedly attached at one end to the member attachment 16 and are slidingly attached to the member attachment 16 at a second end via a sliding joint 22 or pin 22. The sliding joint 22 is then constructed and arranged to slide within a slot 24 within the member attachment 16 in response to a stalk 2 passing through the sensing system 10.

Figure 11A:
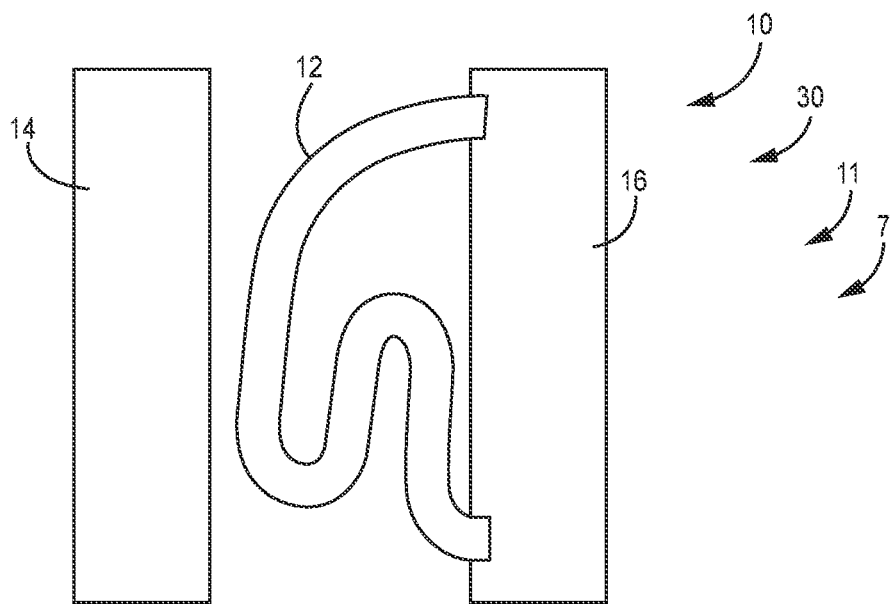
FIG. 11A a top view of a single wand sensor having a convoluted section, according to one implementation.
Figure 11B:
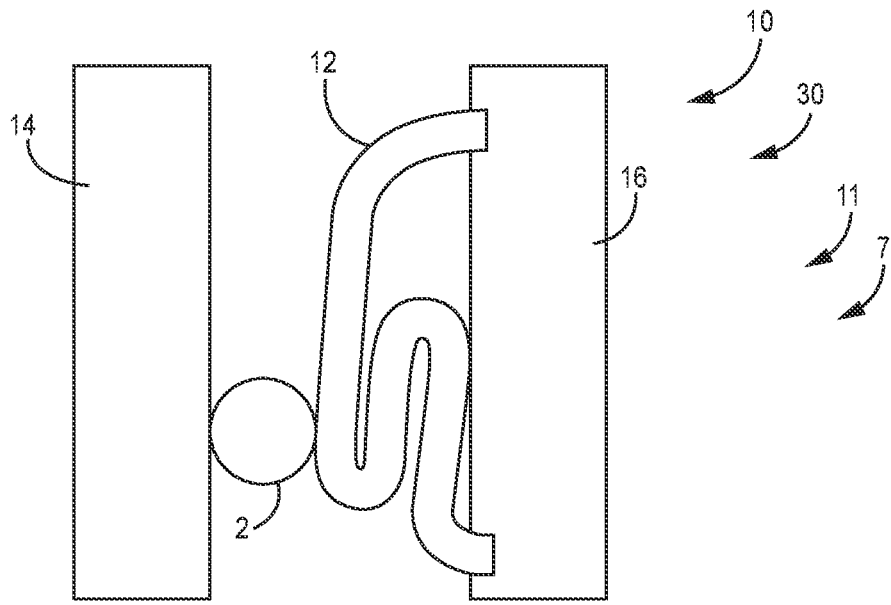
FIG. 11B shows the single wand sensor of FIG. 11A with a stalk passing through the sensor, according to one implementation.

In another alternative implementation, shown in FIGS. 11A and 11B, the resilient member 12 has two fixed connections to the member attachment 16 and includes a thinner or convoluted section that causes the member 12 to preferentially buckle at that location when a stalk 2 passes by the resilient member 12.

Figure 12A:
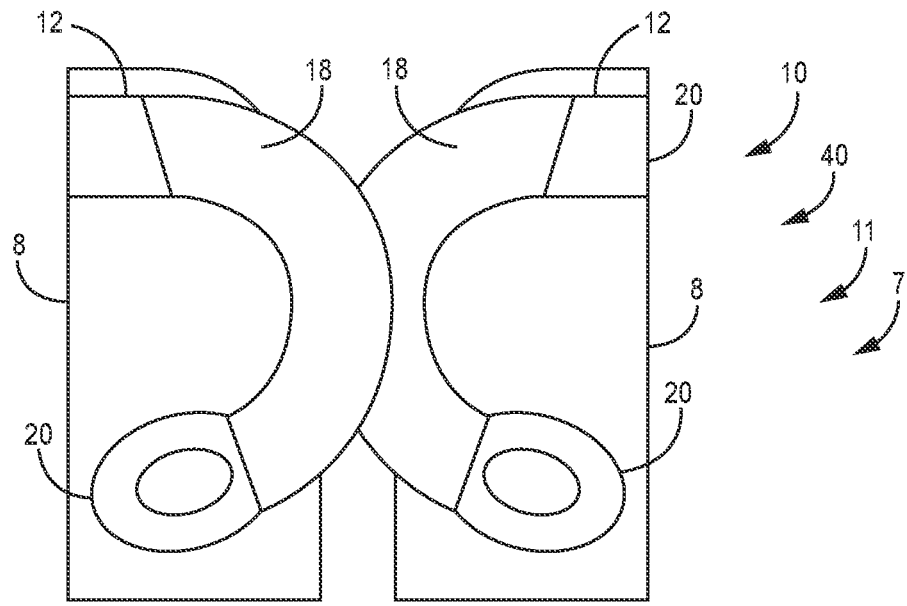
FIG. 12A is a top view of a dual wand sensor where each wand has two attachment points and both rigid and resilient section, according to one implementation.
Figure 12B:
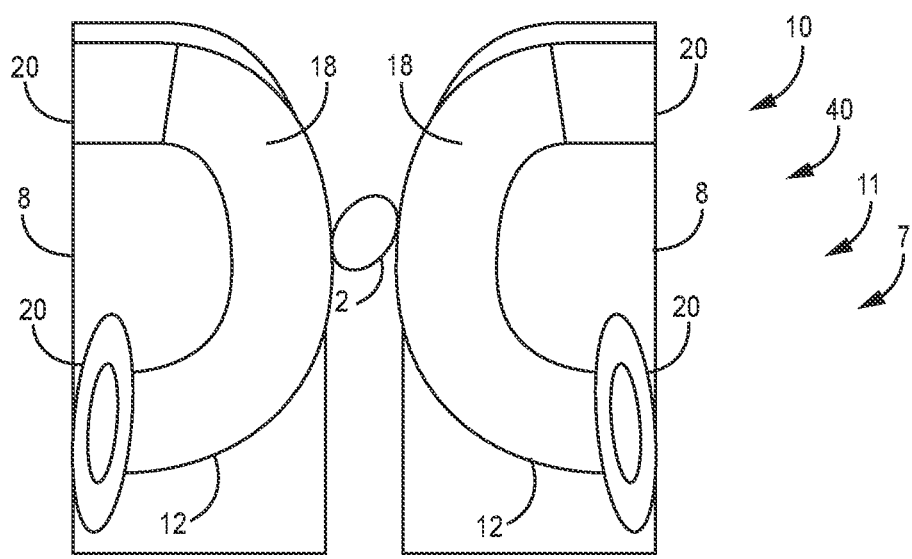
FIG. 12B shows the dual wand sensor of FIG. 12A with a stalk passing through the sensor, according to one implementation.

In still further implementations, as shown for example in FIGS. 12A and 12B, the sensing system 10 includes two resilient members 12—a dual wand system 40. In these and other implementations, the resilient members 12 include both rigid portions 18 and flexible portions 20. In certain alternative implementations, the resilient members 12 include a rigid portion 18 along the central portion of the member 12 and are attached to the deck plate 8 or member attachment 16 via resilient/elastic portions 20. Alternative configurations are of course possible.

Figure 13:
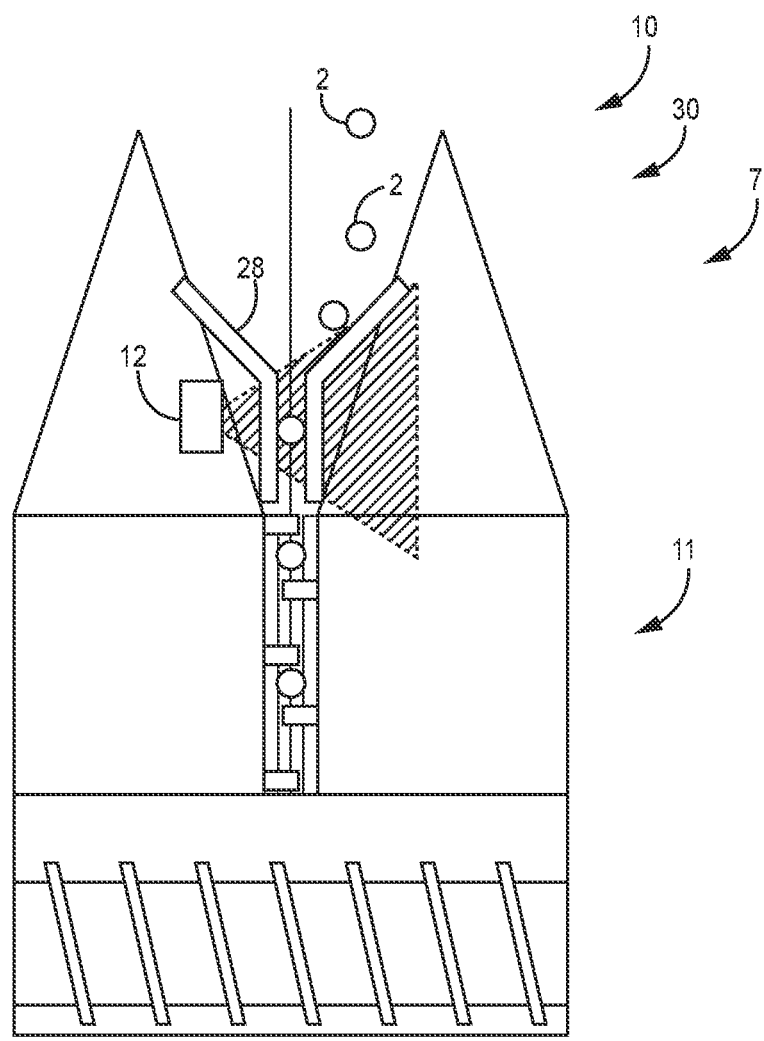
FIG. 13 is a top view a row unit with a guide, according to one implementation.

Turning to FIG. 13, in various circumstances stalks 2 that are poorly centered or aligned or angled with respect to the row unit may cause measurement errors during harvest operations. In various implementations, the system 10 may employ a mechanism 28, such as a guide 28 or shield 28, that constrains the stalks 2 to a centered and/or more vertical position during measurement. These guides 28, shields, and other related methods and devices have been disclosed as part of U.S. Provisional Application 62/810,231, filed Feb. 25, 2019, and U.S. patent application Ser. No. 16/800,469, filed Feb. 28, 2020, which are incorporated by reference herein. In various of these previously disclosed implementations, a system includes a camera as a sensing member in place of the resilient member(s) 12 disclosed herein. In light of this disclosure those of skill in the art would recognize and be able to substitute the resilient member(s) 12 disclosed herein in place of the previously disclosed camera and vision type systems. In various of these implementations, the resilient member(s) 12 contact stalks 2, while the alignment guide 28 maintains stalks 2 in a largely centered, upright, vertical orientation as the stalks 2 enter the row unit 11. This alignment guide 28 may be mounted above or below the corn head 7 stripper plates.

II. Single Member (Wand) Sensor Systems

Figure 14:
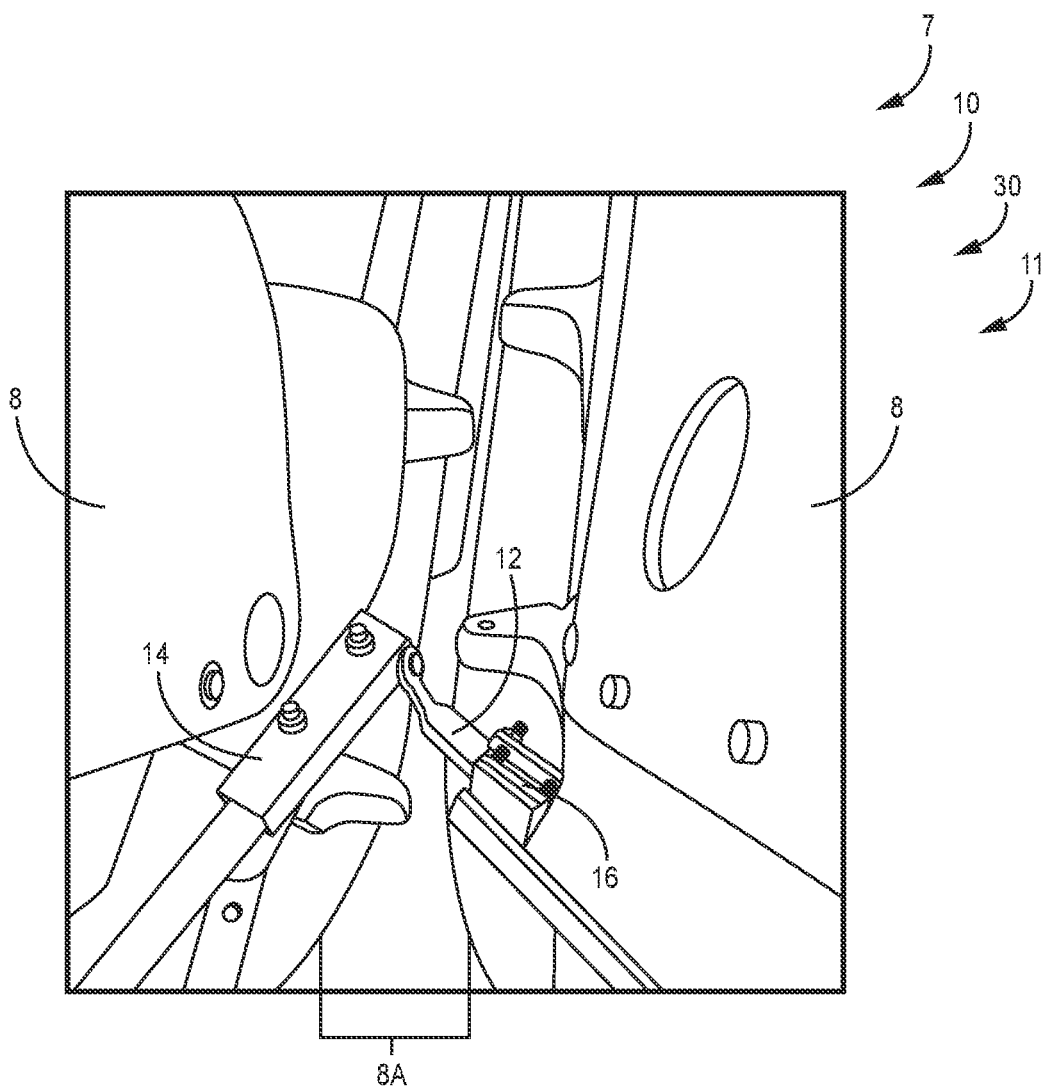
FIG. 14 is a top perspective view of a single wand sensor installed on a row unit, according to one implementation.
Figure 15:
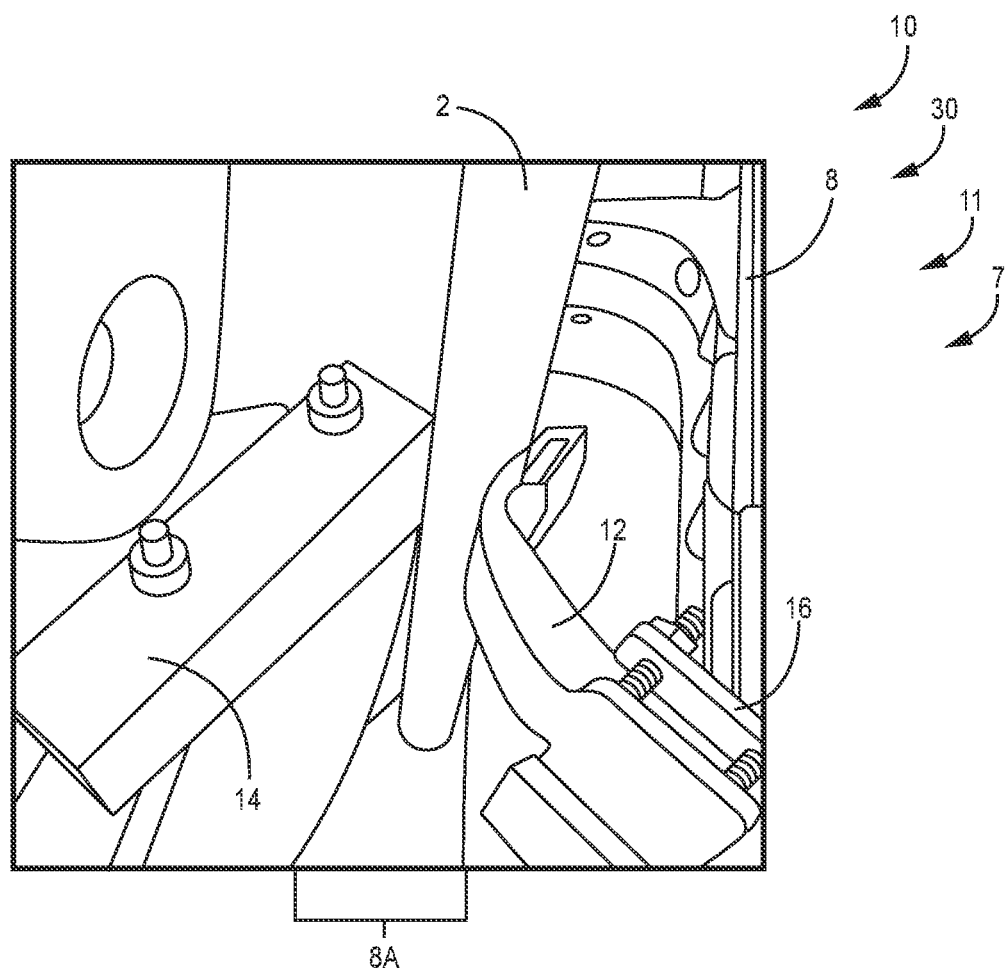
FIG. 15 is a close up view of a stalk passing through the single wand sensor of FIG. 14, according to one implementation.

Turning now to FIGS. 14-15 that depict various single wand sensors 30, various of these implementations have one resilient wand 12 that spans the entire stripper plate gap 8A. The distal end or tip of the wand 12 may rest against a fence 14 on the other side of the stripper plate gap 8A from the member attachment 16 when in the neutral position. In use, each time a stalk 2 passes through the single wand sensor 30, the wand 12 flexes and is displaced from the fence 14 in proportion to the stalk 2 size. In these implementations, the resilient properties of the wand 12, as noted above, rapidly urge the return of, or snap, the wand 12 back to its neutral or resting position or substantially so after each stalk 2 passage.

In certain implementations, the system 10 includes a stalk counting algorithm that counts stalks 2 according to wand 12 flex readings. In further implementations, the system 10 includes a stalk sizing algorithm to determine stalk 2 size according to wand 12 flex readings. In further implementations, the stalk sizing algorithm may segregate stalks 2 into two or more categories including for example productive stalks and late emerged stalks (thin unproductive stalks). Methods, systems, and devices for measuring wand 12 flex/displacement will be discussed further below.

In certain implementations, the wand 12 spans across the stripper plate gap 8A to the fence 14 to ensure thin stalks 2 riding along the fence 14 will contact and therefore flex the wand 12 and produce a measurable displacement from the fence 14. A gap between the wand 12 end and fence 14 may allow thin stalks 2 to pass without flexing the wand 12, resulting in an unmeasured stalk 2.

In various implementations, the fence 14 is a rigid fence 14. In various alternative implementations, the fence 14 is a moveable/flexible fence 14. Examples of moveable fences 14 are spring biased rigid fences 14 or resilient fences 14, various other implementations would be recognized by those of skill in the art.

In some implementations, the fence 14 will be flush with the edge of the stripper plate 8. For example, a rigid fence 14 protruding past the stripper plate 8 edge into the stripper plate gap 8A may impede crop flow through the corn head and this may cause stalks 2 to bunch or plug the row unit 11. A rigid fence set 14 back from the stripper plate 8 edge could result in incorrectly measured stalk 2 sizes due to stalks 2 riding against the stripper plate 8 edge instead of the fence 14.

As would be appreciated, many corn heads 7 have laterally adjustable stripper plates 8 and in certain instances only one of the two stripper plates 8 is adjustable. In implementations where only one stripper plate 8 is adjustable, the fence 14 may be mounted on the nonadjustable stripper plate 8 side to ensure the fence 14 remains flush with the stripper plate 8 edge. Moveable fences 14 may be used to keep the fence flush 14 in configurations where both stripper plates 8 are adjustable.

Various implementations of single wand sensors 30 are effective at counting harvested and missing stalks 2 and detecting a plugged row condition. In certain implementations, as discussed herein single wand sensors 30 may be used to measure stalk 2 size, such as be measuring the perimeter of a stalk 2.

Figure 16:
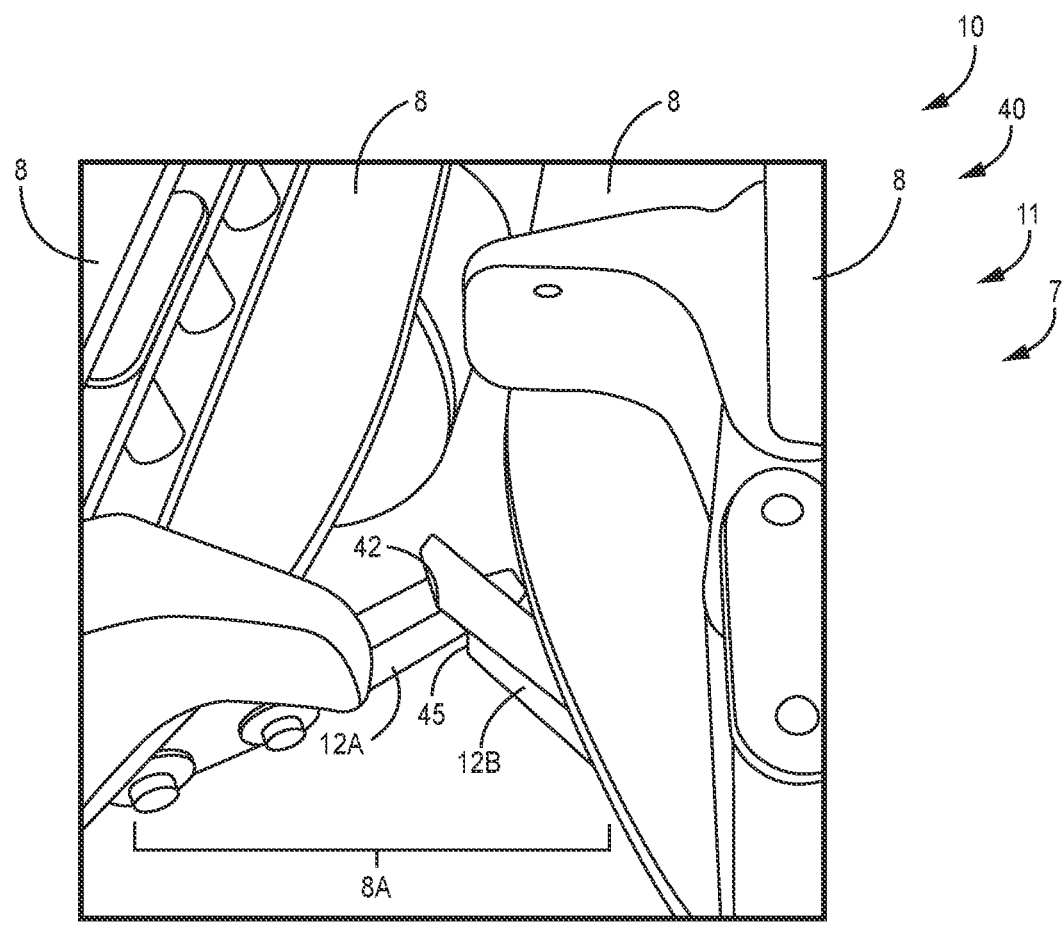
FIG. 16 is a top perspective view of a dual wand sensor installed on a row unit, according to one implementation.
Figure 17:
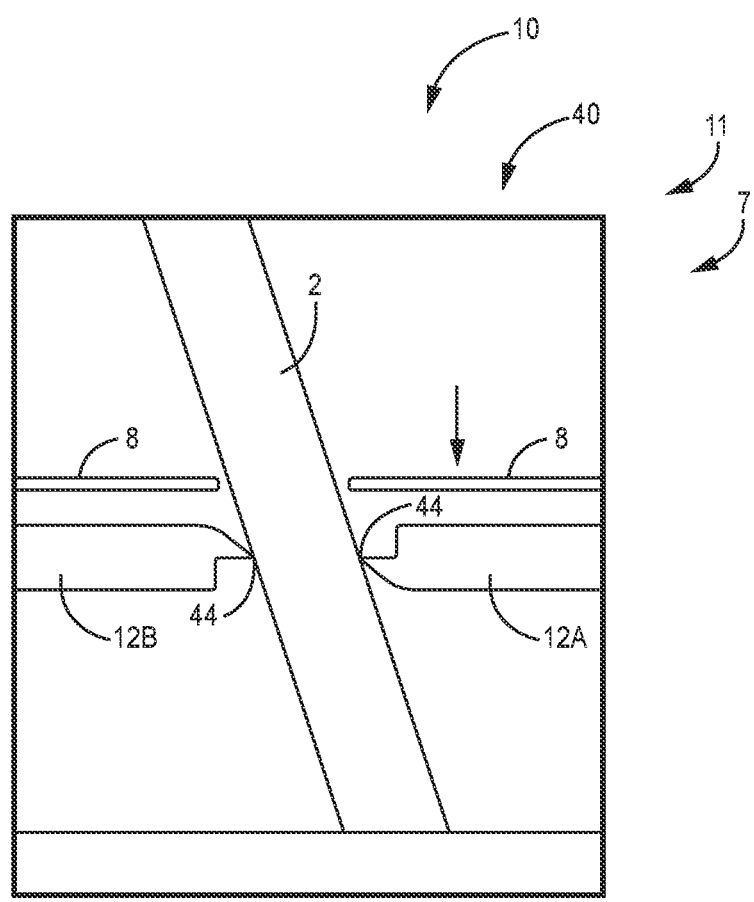
FIG. 17 is a front view of a stalk passing through a dual wand sensor, according to one implementation.

Turning now to FIGS. 16-17, these figures depict a dual member or dual wand sensor 40. In an exemplary implementation, the dual member sensor 40 comprises two resilient wands 12A, 12B; one wand 12A protruding across the stripper plate gap 8A from one stripper plate 8, and a second wand 12B protruding across the stripper plate gap 8A from the other stripper plate 8. In various implementations, both wands 12A, 12B span the entire stripper plate gap 8A such that both wands 12A, 12B will flex or be displaced each time a stalk 2 passes through the dual wand sensor 40. Such a configuration may be able to accurately measure thin stalks 2 riding along either stripper plate 8.

In various implementations, and as discussed above, the resilient properties of the wands 12A, 12B may rapidly snap the wands 12A, 12B back to a neutral or resting position, or substantially so, after each stalk 2 passage through the dual member sensor 40. In certain implementations, a stalk counting algorithm counts stalks 2 according to wand flex readings of both wands 12A, 12B. In further implementations, the system 10 includes a stalk sizing algorithm to determine stalk 2 size according to wand flex readings. In still further implementations, the stalk sizing algorithm may segregate stalks 2 into two or more categories including, for example, productive stalks and late emerged stalks (thin unproductive stalks). As noted above various methods, systems, and devices for measuring wand 12A, 12B flex and/or displacement will be discussed further below.

In some implementations, both wands 12A, 12B are in the same fore/aft position so that they will overlap when in their neutral or resting position. That is, the wands 12A, 12B are substantially opposite each other on the row unit 11. The various of these implementations, each wand 12A, 12B may include a notch 42 that serves as a return cradle stop for the other wand 12A, 12B. The notch 42 may act to dampen the returning wand 12A, 12B and thereby minimize sensor ringing.

In certain implementations, the stalk 2 contacting points of each wand 12A, 12B are on the same or substantially the same horizontal plane across the stalk 2. As would be understood stalks 2 may enter the row unit 11 at a non-vertical angle, such as due to steering errors which may cause the stripper plate gap 8A to misalign with the incoming stalk 2 row. By contacting stalks 2 on the same horizontal plane the dual wand sensor 40 is able to accurately measure stalks 2 that enter the stripper plate gap 8A at a non-vertical angle, as shown for example in FIG. 17.

FIG. 17 shows a stalk 2 passing through at a non-vertical angle. In this specific implementation, the stalk 2 contact point 44 for each wand 12A, 12B is on the same horizontal plane across the stalk 2. In various implementations, each wand 12A, 12B has a notch or opening defined at the contact point 44 for the stalk 2. FIG. 17 depicts one of many various wand 12A, 12B shapes with a knife edge contact point 44, other shapes and configurations would be known and appreciated by those of skill in the art.

In various implementations, the senor system 10, including both the single member sensor 30 and dual member sensor 40, may be mounted under the stripper plates 8 as shown in FIGS. 16 and 17. Alternate implementations allow for the mounting of the sensor system 10 above the stripper plates 8, as would be readily appreciated by those of skill in the art.

Further, a sensor system 10 mounted under the stripper plates 8 may be positioned close to the stripper plates 8 and therefore be able to accurately measure stalks entering the sensor at non-vertical angles. As would be appreciated, sensing close to the stripper plates 8 may be advantageous because the stripper plates 8 may act similar to the guide 28 discussed above and restrict the stalk 2 angle as stalks 2 enter the row unit 11. That is, angled stalks 2 entering stripper plates 8 tend to be somewhat "stood up" or urged into a more vertical orientation at the point of stripper plate 8 contact.

III. Detection and Measurement

Turning now to FIGS. 18-31, the various implementations of sensors and sensing methodologies detailed below may be implemented for both single wand sensors 30 and the dual wand sensors 40. In certain implementations, the stalk sensor system 10 utilize magnets 52 embedded in the wand(s) 12A, 12B and magnetic field strength sensors 54 to detect and measure stalks 2, as shown for example in FIGS. 18-27. In these implementations, measuring magnetic field is possible because magnetic fields can penetrate through (are not affected by) nonferrous materials such as leaves, corn stalks 2, dust, and the like present during harvest operations. Further, magnetic fields can also penetrate nonferrous metals, which allows for the use of various durable nonferrous metals in wands 12 and other elements of the system 10.

As would be appreciated, the corn harvester corn head 7 is a very harsh environment in which to implement a corn stalk sensing system 10. The use of magnets 52 and magnetic field strength sensors 54 allows for the creation of a durable sensor apparatuses 50 that can survive this harsh environment. In certain implementations, the only moving parts of the sensor apparatus 50 is the resilient wand 12 or wands 12A, 12B. By reducing the number of moving components the durability and longevity of the sensor system 10 can be extended.

In various implementations, the resilient wand 12 or wands 12A, 12B completely envelope the magnet 52 that creates the magnetic field to be sensed. That is, the magnet 52 may be embedded within the resilient member 12 or members/wands 12A, 12B. Additionally, magnetic field strength sensors 54 and magnets 52 can be relatively small and low cost, allowing for the creation of a sensor apparatus 50 that can be easily integrated into a corn harvest head 7, as either part of an entirely new corn head 7 or as part of a retrofit of an existing corn head 7.

Figure 18:
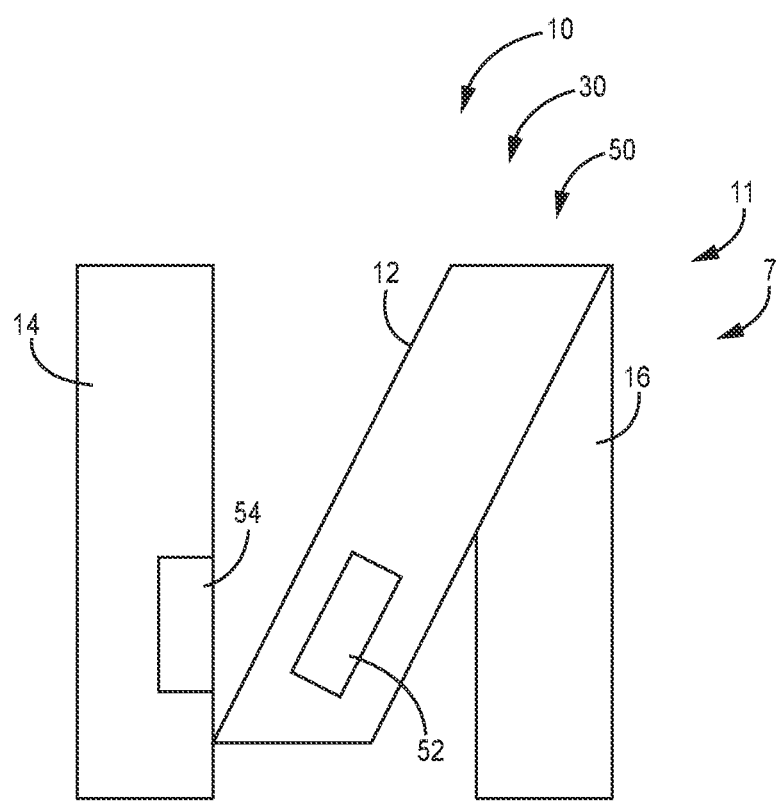
FIG. 18 is a top view of a single wand sensor, according to one implementation.
Figure 19:
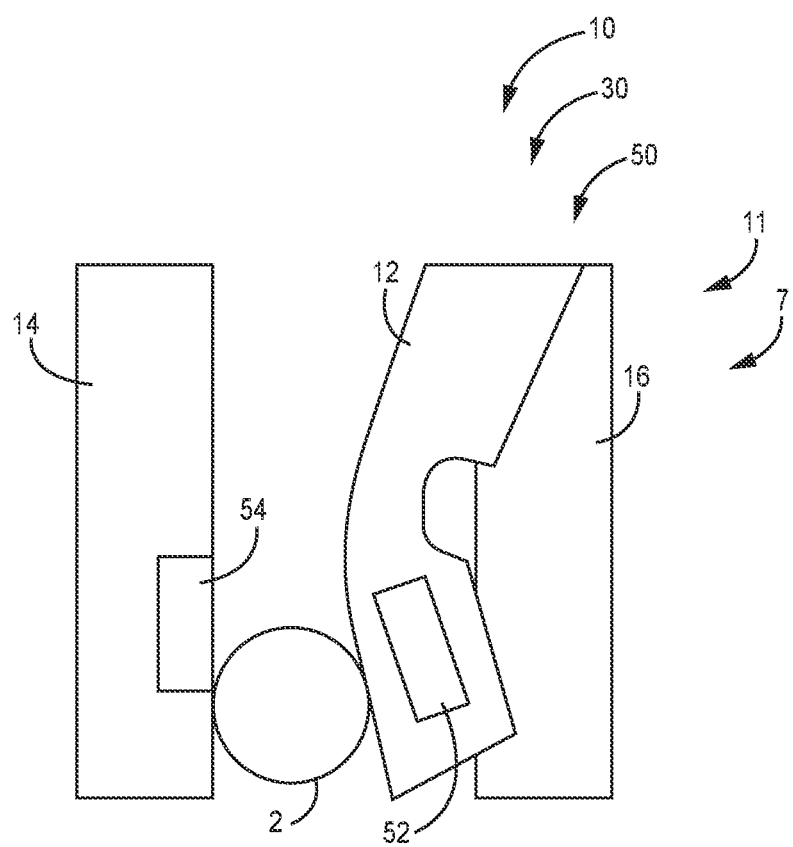
FIG. 19 is a top view of a stalk passing through a single wand sensor, according to one implementation.

Single wand sensors 30. Turning to FIGS. 18 and 19, in implementations using a single resilient member 12, a magnet 52 may be embedded in or attached to the wand 12 such that one of the poles of the magnet 52 is oriented outward to the contact surface of the wand 12. In these implementations, a magnetic distance sensor 54 is placed in a fixed element such as a fence 14 opposite the wand 12 and magnet 52. As discussed above, the fence 14 may be oriented such that the wand 12 contacts the fence 14 when there is no corn stalk 2 in the sensor apparatus 50.

In certain implementations, a magnetic distance sensor 54 measures the strength of the magnetic field created by the magnet 52. Based on the strength of the magnetic field measured and considering the magnetic strength and orientation of the magnet 52, a distance can be calculated from the sensor 54 to the magnet 52. This, in turn, allows the amount deflection of the resilient wand 12 in response to a corn stalk 2 passing through the sensor apparatus 50 to be measured. In certain implementations, the sensor 54 measures the decrease in the magnetic field strength as the deflection of the wand 12 increases, increasing distance between the magnet 52 and the magnetic sensor 54.

In an alternate implementation, the permanent magnet 52 may be embedded in the fence 14 and the magnetic sensor 54 located in or on the wand 12. The methodology of measuring the distance between the magnet 52 and the sensor 54 remains the same where increasing deflection of the wand 12 results in decreasing magnetic field strength.

Figure 20:
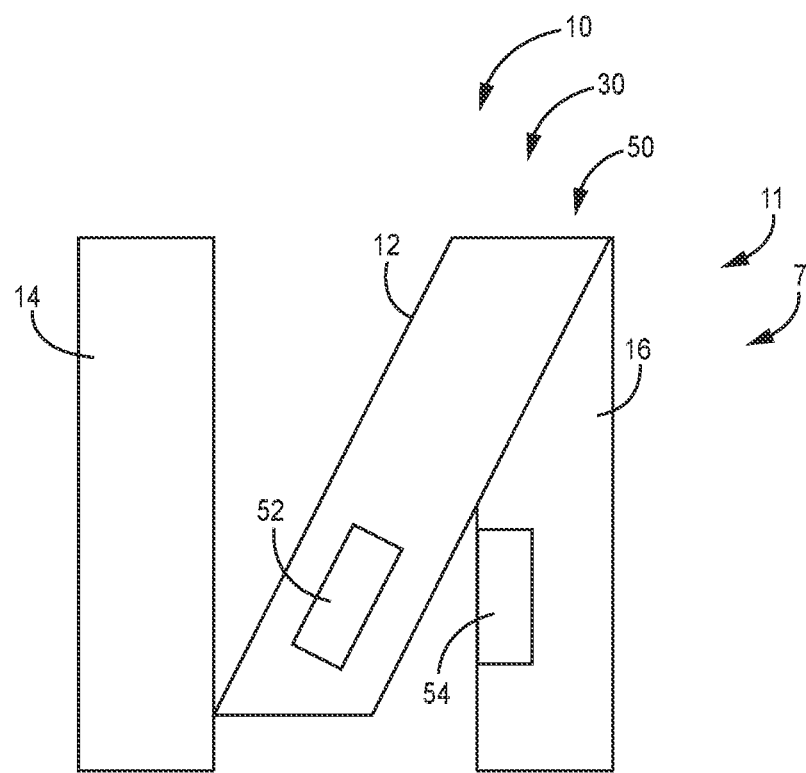
FIG. 20 is a top view of a single wand sensor, according to one implementation.

In another implementation, shown in FIG. 20, the system 10 includes a single resilient wand 12 with a permanent magnet 52 embedded in or otherwise attached to the wand 12 such that at least one of the poles of the magnet 52 is oriented outward to the surface of the wand 12. Similar to previously discussed implementations, a fence 14, or other fixed element, is located opposite to the wand 12 such that the wand 12 contacts the fence 14 when there is not a plant stalk 2 in the apparatus 50.

In these and other implementations, a magnetic distance sensor 54 is placed in a fixed housing 16 adjacent to the wand 12 and magnet 52. That is the magnetic distance sensor 54 is located on the same side of the row unit 11 that the wand 12 is attached to. The fixed housing 16 for the magnetic distance sensor 54 may also be the attachment element 16 for mounting the wand 12, described above, although other fixed housings 16 are possible and would be recognized by those of skill in the art.

As stated above, the magnetic distance sensor 54 measures the strength of the magnetic field generated by the magnet 52. Based on the strength of the magnetic field measured and considering the magnetic strength and orientation of the permanent magnet 52, a distance can be calculated from the sensor 54 to the magnet 52. In these implementations, the sensor 54 measures increased magnetic field strength as the deflection of the wand 12 increases and distance between the magnet 52 and magnetic sensor 54 decreases.

In a further implementation, the permanent magnet 52 is embedded into the fixed element 16 on the same side of the row unit 11 as the wand 12 and the magnetic sensor 54 is embedded in the wand 12. The methodology of measuring the distance remains the same where increasing deflection of the wand 12 results in increasing magnetic field.

Figure 21:
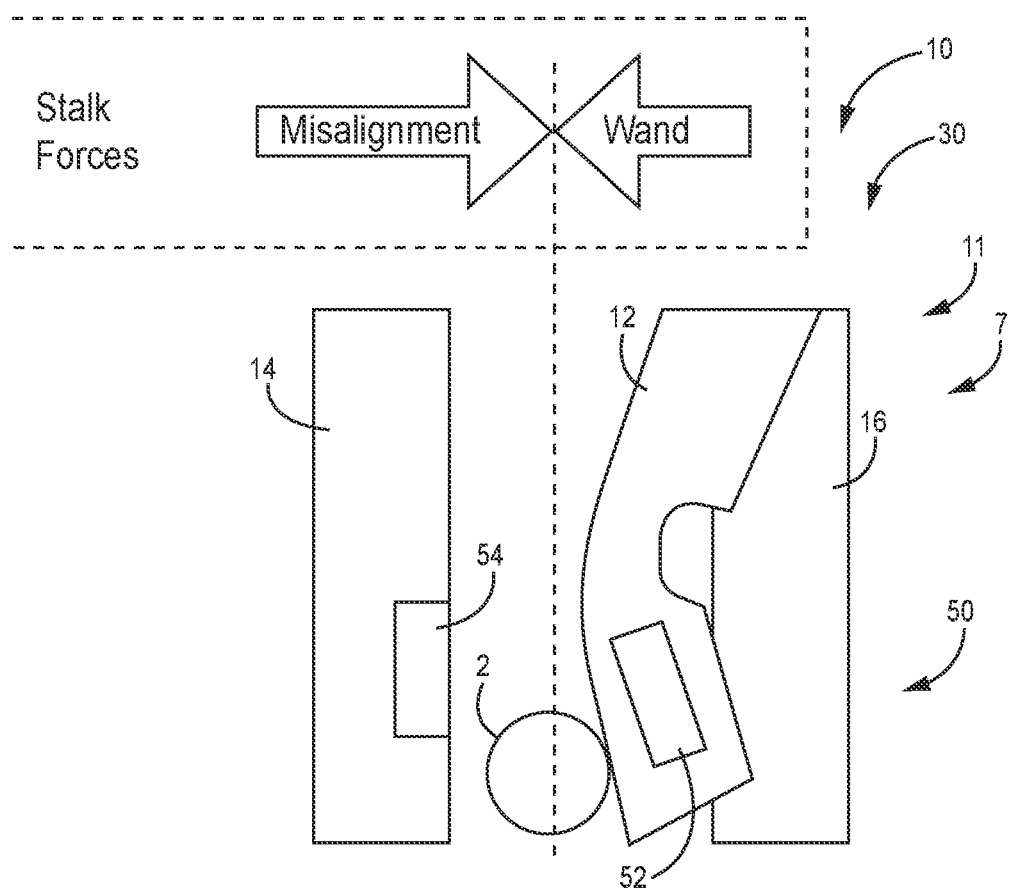
FIG. 21 is a top view of a misaligned stalk passing through a single wand sensor, according to one implementation.

FIG. 21 depicts an exemplary situation in which an entering stalk 2 is misaligned with the sensor apparatus 50. Misalignment can occur when the center of the row harvesting unit 11, where the corn stalks 2 are fed in, is not directly above the point at which the corn stalks 2 attach to the ground. In these situations, as the stalk 2 is fed into the row unit 11 misaligned stalks 2 can be pushed up against one side of the stripper plates 8. The force created by stalk 2 misalignment may overcome the restoring force of the wand 12 that pushes the stalk 2 against the opposing fixed element 14 or fence 14 as it is passing through the sensor apparatus 50. This type of misalignment may causes the wand 12 to be deflected to a greater extent than the size of the stalk 2. In these implementations, the sensor system 10 may measure the stalk 2 as larger than its actual size, as is illustrated in FIG. 21.

Dual wand sensor systems 40. In various implementations, depicted in FIGS. 22 and 23, the dual wand sensor 40 includes two resilient wands 12A, 12B and permanent magnets 52A, 52B embedded in or attached to each wand 12A, 12B such that one of the poles of the magnet 52A, 52B is oriented outward to the surface of the wand 12A, 12B. In various implementations, magnetic distance sensors 54A, 54B are placed in each of the fixed elements 16A, 16B adjacent to the wands 12A, 12B and magnets 52A, 52B. The fixed elements 16A, 16B may also be used as mounting point for the wands 12A, 12B. As would be appreciated the magnetic sensors 54A, 54B may be located in the wands 12A, 12B while the magnets 52A, 52B are located in the fixed elements 16A, 16B, corresponding changes to the operation of the sensor apparatus 50 would be appreciated.

In these and other implementations, the magnetic sensors 54A, 54B on both sides of the sensor apparatus 50 measure the strength of the magnetic field produced by the corresponding magnet 52A, 52B in the corresponding wand 12A, 12B. Based on the strength of the magnetic field measured and considering the magnetic strength and orientation of the magnet 52A, 52B, a distance can be calculated from the sensor 54A, 54B to the magnet 52A, 52B. In similar fashion to that described in relation to the single wand sensor 30 implementations discussed herein.

In various dual wand systems 40, the deflection distances measured by each sensor 54A, 54B are combined to produce a total deflection distance produced by a corn stalk 2 passing through the sensor apparatus 50. This total deflection distance may be correlated to the size of the stalk 2 and/or the perimeter of the stalk 2.

In these implementations, the wands 12A, 12B may be mounted at the same level and contact each other at the center of the measurement area when in a neutral or resting position. This center point or neutral position is considered the zero distance. In certain situations, when only one wand 12A, 12B is deflected, the other wand 12A, 12B may extend beyond its zero distance, increasing the detected distance from the magnet 52A, 52B to the sensor 54A, 54B on that side. That is, in these implementations, the system 10 allows for deflection measurement beyond the neutral position.

In various implementations, the wands 12A, 12B are sized so that the minimum-detectable corn stalk 2 size will produce wand-to-wand deflection over the entire measurement range which typically corresponds to the stripper plate gap 8A between the stripper plates 8.

Figure 24:
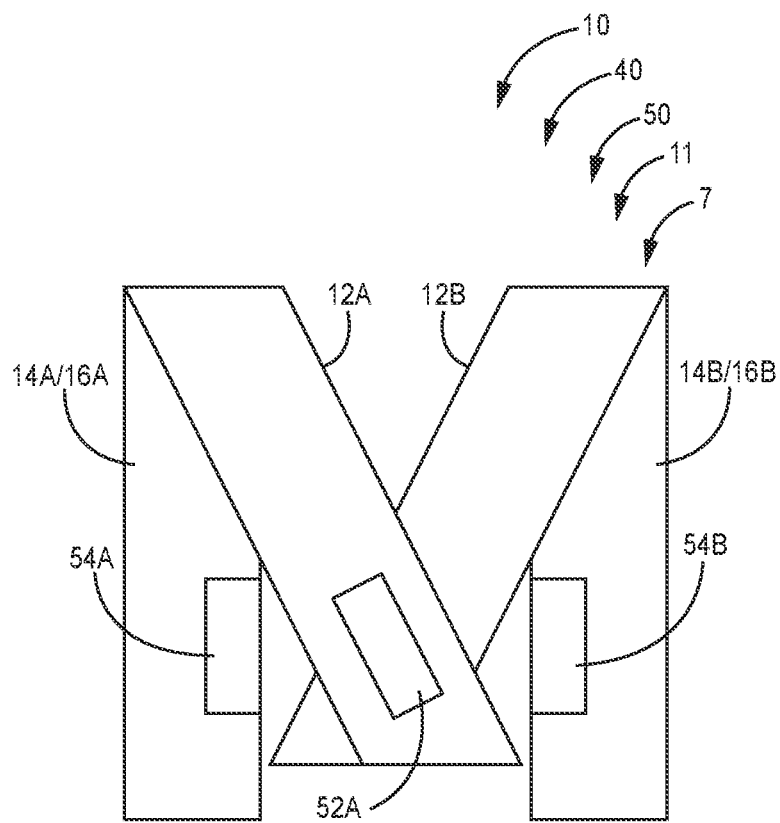
FIG. 24 is a top view of a dual wand sensor where the wands are arranged to be vertically stacked, according to one implementation.

An alternative dual wand sensor 40 implementation, includes the wands 12A, 12B and corresponding sensors 54A, 54B at different levels, as shown in FIG. 24. These implementations, may include two single wands 12A, 12B stacked vertically. In these and other implementations, magnet 52A, 52B orientation, multi-axis sensors 54A, 54B, and signal processing algorithms may be used to reduce the effect of cross-talk between the magnets 52A, 52B and the sensors 54A, 54B and thereby improve performance.

Figure 25:
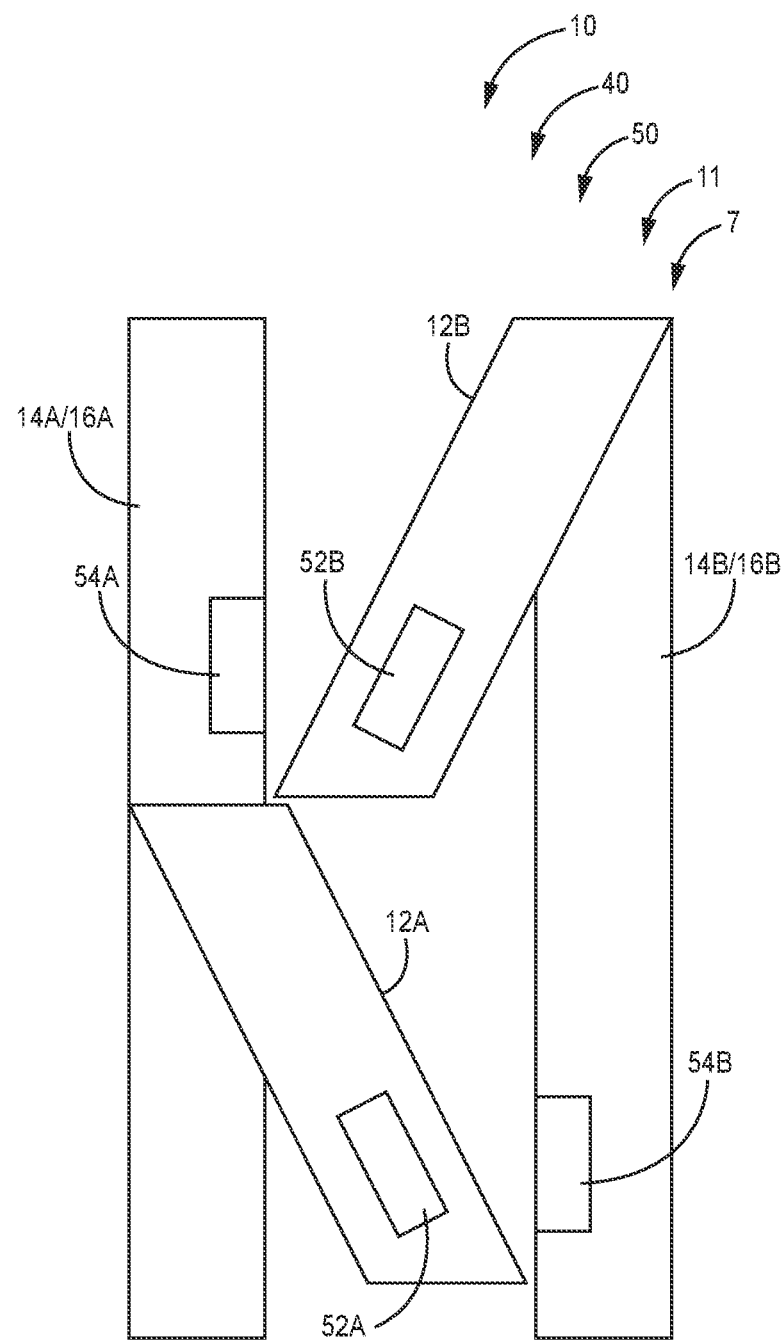
FIG. 25 is a top view of dual wand sensor where the wand are arranged in sequence, according to one implementation.

Another dual wand sensor 40 implementation includes wands 12A, 12B and sensors 54A, 54B arranged sequentially as shown in FIG. 25. In these implementations, the wands 12A, 12B are arranged one after the other, such that a stalk 2 will contact a first wand 12B then the second wand 12A as the stalk 2 travels through the sensor apparatus 50. These implementations may more accurately measure stalks 2 that pass through the sensor apparatus 50 along the sides of the fences 14A, 14B and/or fixed elements 16A/16B. In these implementations, the magnets 52A, 52B are further separated such that interference between the magnets 52A, 52B can be reduced, minimized or eliminated. These implementations may further include a stalk differentiation algorithm to differentiate between different stalks 2 being measured/contacting the wands 12A, 12B at or near the same time.

Electromagnet. For any of the above implementations, an electromagnet 52 could be used in place of any other magnet 52 type to create the magnetic field to be measured by the sensor 54. The use of an electromagnet 52 allows a varying magnetic field to be created. In various implementations, varying the magnetic field may be used to improve performance of the sensor apparatus 50, as would be readily appreciated.

Figure 26:
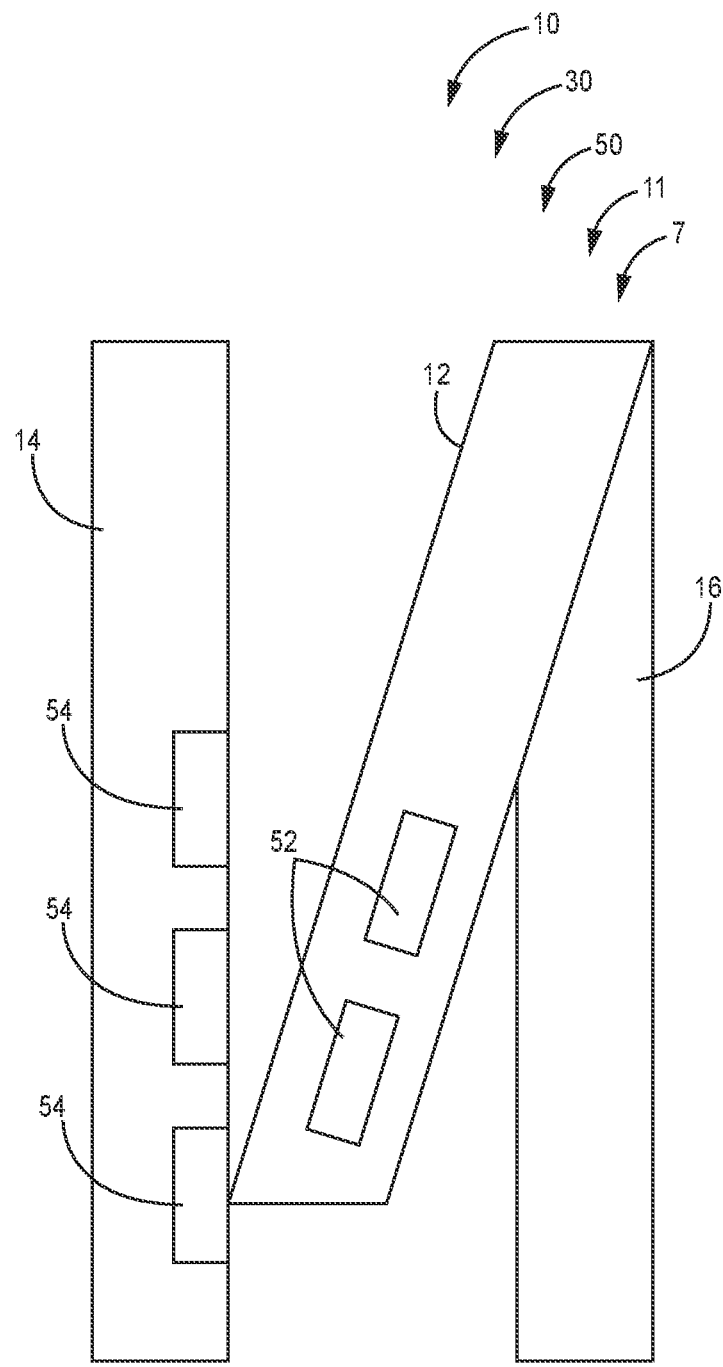
FIG. 26 is a top view of single wand sensor have multiple sensors and sensor targets, according to one implementation.

Multiple sensors and/or magnets. In any of the above sensor implementations, additional implementations are conceived that have multiple magnetic sensors 54 and or magnets 52 in a single wand 12, fence 14 and/or fixed element 16. An exemplary implementation using multiple sensors 54 and magnets 52 is shown in FIG. 26. As would be understood, the magnetic field of the magnet 52 embedded in the resilient wand 12 can vary greatly depending on the orientation of the magnet 52. In these implementations, because the wand 12 itself is flexible and bends in response to stalks 2 and other material passing through the sensor apparatus 50, the orientation of the magnet 52 can vary in relation to the magnetic sensor 54. The use of multiple magnetic sensors 54—optionally in different orientations—may allow the detection of the variations in magnetic field produced by the magnet 52 and its orientation thus allowing the sensor signal processor to compensate for the variation in magnetic field.

Further, FIG. 26 also depicts the use of multiple magnets 52. The movement of the resilient wand 12 and its embedded magnet 52 may not be optimal for sensing the magnetic field and measuring the corresponding distance. Multiple permanent magnets 52 may be used to increase the strength and/or breadth of the magnetic field for improving sensor performance and distance measurement.

Use of both multiple magnets 52 and multiple sensors 54 at the same time is not required. A system 10 and apparatus 50 may have single or multiple magnets 52 and/or single or multiple magnetic sensors 54 in any combination or configuration, as would be readily appreciated.

Figure 27:
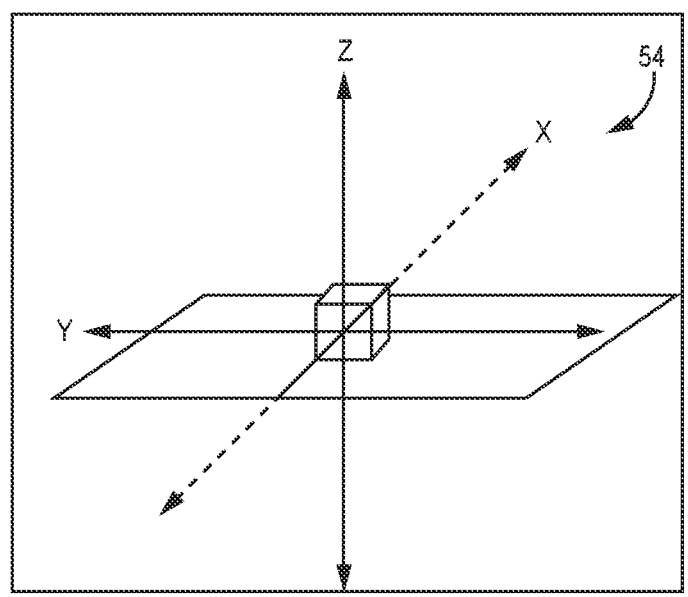
FIG. 27 show the X, Y, and Z axes of a magnet, according to one implementation.

Multi-axis magnetic sensors. Distance magnetic sensors 54 (i.e. field strength measurement sensors) may detect up to three (3) axes of measurement where the measurement axes are typically orthogonal, as shown in FIG. 27. In various implementations, the magnetic sensors 54 are multi-axis sensors 54. The use of sensors 54 with multiple axes in measuring the magnetic field from the embedded magnet 52 can be used to detect the orientation of the magnet 52 in addition to the strength of the magnetic field. The additional data regarding the orientation of the magnet may be used, in certain implementations, to improve the distance measurement from the magnet 52 to the sensor 54.

FIG. 27 shows the axis orientation for 3-axis magnetic sensor 54, according to one implementation. For the 3-axis sensor 54 shown, a magnet 52 within detection distance of the sensor 54 will produce detection values for the X, Y, and Z axes that depend on the distance and orientation of the magnet 52. For the stalk sensor 54, the individual measurements from each axis are processed to produce a distance and orientation of the magnet 52 embedded in the wand 12 with respect to the sensor 54. As an example, if there is movement of the wand 12 in any direction, a multiple axis sensor 54 can detect that movement and be able to compensate for such movement in determining the deflection distance, as would be readily appreciated.

Magnet orientation. In various implementations, the magnets 52 are disk magnets 52 that are embedded in the wand 12 with the poles of the magnet 52 perpendicular to the front and back (vertical) faces of the wand 12. In certain implementations, the orientation of the magnet 52 and its magnetic field within the wand 12 may be adjustable. Likewise, the orientation of the distance magnetic sensors 54 may be adjusted to optimize the sensors 54 ability to detect the magnetic field and provide a consistent distance measurement over the deflection range of the wand(s) 12.

Non-resilient wands. In various implementations, the wands 12 are not made of resilient material but rather are substantially rigid. In various implementations, a magnet 52 or magnetic sensor 54 can be embedded in a non-resilient wand 12. The magnet 52 or sensor 54 according to certain implementations comprises non-ferrous material and is configured to be used to count and measure stalk size by detecting wand 12 displacement as described herein. In these and other implementations, an element 58 at the wand attachment point, or elsewhere along the wand 12 would apply a restoring force to return the wand 12 to a zero (or neutral) point when there is no corn stalk 2 passing through the apparatus 50.

Non-contact angle sensor. Various further implementations may implement a non-contact inductive position sensor to measure the deflection of the wand 12. As would be appreciated, a non-contact inductive position sensor uses transmit and receive coils to measure the position of a conductive target that is either sliding or rotating. In these implementations, current is modulated through the transmit coils to create an electromagnetic field that is influenced by the conducting target at close proximity. The measurement of the received electromagnetic field in the receive coils can be used to determine the position of the target based on the design of the receive coils. In various implementations, the non-contact angle sensor can be incorporated into the mounting (i.e. hinge point) of the wand 12. As the wand 12 is deflected by the passing corn stalk 2, the wand 12 moves the conductive target of the sensor. The measured angle of deflection would use a conversion function to produce a wand 12 deflection distance which then correlates to stalk 2 size and/or stalk 2 perimeter.

Inductance sensor. As would be understood, an inductive sensor is a sensor technology usually used to measure the distance (or proximity) of metal targets at close range. In various implementations, the system 10 and sensor apparatus 50 may use an inductive distance sensor and a metal target in place of or in addition to the various magnetic sensors 54 and magnets 52, respectively, as would be appreciated. As would be understood by those of skill in the art, an inductive sensor works by oscillating a current through a coil of wire called the sensing coil. This oscillating current produces an electromagnetic field near the surface of the sensor. When the metal target enters the electromagnetic field, eddy currents are produced which reduce the amplitude of the electromagnetic field. In these implementations, the system 10 may be calibrated to allow the sensed amplitude of the generated electromagnetic field to correlate to the distance from the metal target, which gives a measured deflection distance of the wand 12.

Capacitive sensor. As would be understood, a capacitive sensor is a sensor technology for measuring distance or proximity at close range. In these implementations, both metal and non-metal targets can be used. In various implementations, the sensor apparatus may include a capacitive distance sensor and a metal target, in place of or in addition to the magnetic sensor 54 and magnet 52, respectively. Those of skill in the art would readily appreciate that a capacitive sensor creates a varying electric field that is altered by the position of the embedded target in the wand 12. The change in electric field corresponds to a change in the current needed to drive the varying voltage to the sensor. In these implementations, the system 10 can be calibrated to allow the sensor to correlate the measured electrical field (such as the current) to the distance from the target, thus producing a measurement of the deflection distance of the wand 12.

Optical sensor. In various implementations, the system 10 and sensor apparatus 50 may include an optical distance sensor for detecting the deflection distance of the wand 12. In these implementations, the system 10 may use triangulation or time-of-flight to measure distance. In optical distance sensor implementations, the optical element is placed in or behind the fixed element near the wand 12 (shown for example in FIG. 20). The sensor transmits a beam of light or laser which reflects off the wand 12 and returns to a receiver element, which may be adjacent to the transmitter. A reflective material may be placed on the wand 12 to aid in reflection of the transmitted light back toward the sensor.

F/ex sensor (flexible resistance). As would be readily understood, a flex sensor is a flexible device whose resistance increases as the device is bent or flexed. Various implementations, of the wand 12 or wands 12A, 12B of the stalk sensor apparatus 50 are made, at least in part, of flexible material that bends or flexes as corn stalks 2 pass through the apparatus 50. In one implementation of the apparatus 50, a flex sensor is integrated into the flexible wand 12. In these implementations, the resistance of the flex sensor is used to measure the deflection of the wand 12, corresponding to the size of the stalk 2 passing through the apparatus 50. The flex sensor could also be added to other implementations to aid in the corn stalk 2 detection and measurement process.

Figure 28:
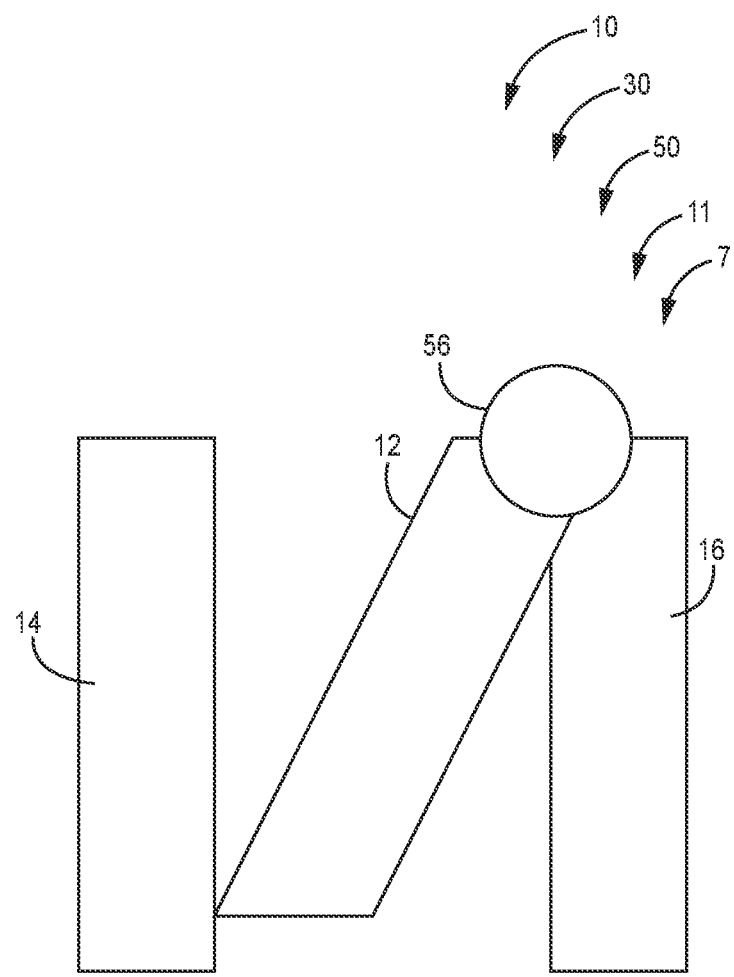
FIG. 28 is a top view of a single wand sensor having a load cell, according to one implementation.

Load cell. FIG. 28 shows a torsion load cell 56, according to one implementation. That is, FIG. 28 illustrates a single wand sensor system 30 where a torsion load cell 56 is located at the wand 12 attachment point. In these implementations, the load cell 56 measures the force applied to the wand 12 when it is displaced from the stop or its neutral position. The displacement distance of the wand 12 will be proportional to the force applied to the load cell 56. Signal processing of the measured force of the load cell 56 will produce a calculated wand 12 displacement which will be used to detect and measure corn stalks 2. In addition to the stand-alone implementation described here, a load cell 56 may be added to other implementations as an additional sensor for the purpose of aiding in the detection and/or displacement measurement performance of the sensor apparatus 50. Various modifications may be made to incorporate a load cell configured into a dual wand sensor 40.

Ultrasonic distance sensor. In an alternative implementation—similar to that shown in FIG. 20—the sensor 54 may be a short-range, high-speed ultrasonic sensor. In various so these implementations, an ultrasonic sensor is positioned so that it transmits high frequency sound waves that are reflected off the wand 12, or vice versa. The flight time of the sound waves from transmission to receipt may correspond to the deflection distance of the wand 12. As would be understood, reflection ultrasonic sensors usually have a minimum dead band distance required, as such the sensor would have to be positioned away from the wand 12 so that the minimum dead band is met when the wand 12 is at full deflection.

In various alternative implementations, the transmission point and receiver of an ultrasonic sensor may be separated. In these implementations, the transmitter may be placed in the wand 12 and the receiver may be placed in the attachment element 16, or vice versa. Such a sensor may reduce or eliminate the required dead band distance.

Various combinations and configurations of multiple sensor 54 and sensor target 52 types are contemplated. That is, the system 10 and sensor apparatus 50 may combine for than one type of sensor 54 and sensor target 52. Further, the system 10 and sensor apparatus 50 may combine multiple of the same type of sensor 54 and/or sensor target 52 in a single embodiment.

Signal processing. In various implementations, signal processing to measure wand 12 deflection and produce wand 12 displacement measurements may include sampling the magnetic sensor 54, or other sensor, at a high rate relative to the speed and frequency of the corn stalks 2 passing through the sensor apparatus 50. In one specific example, the sample rate may be about 1000 Hz, although other sample rates may be used as would be understood, such as between about 200 Hz and about 2000 Hz or more.

Figure 29:
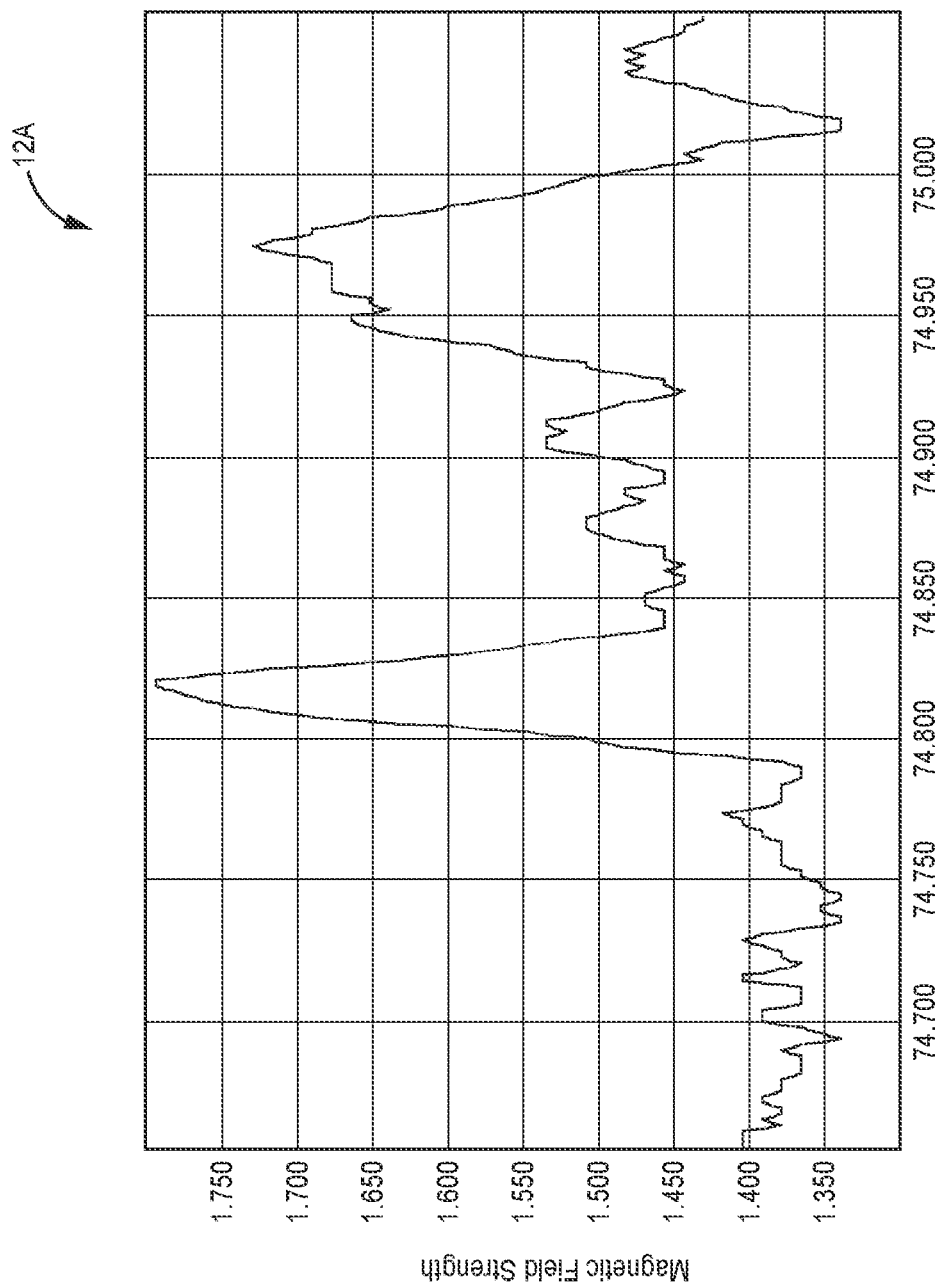
FIG. 29 shows a graph of detected magnetic field strength over time, according to one implementation.
Figure 30:
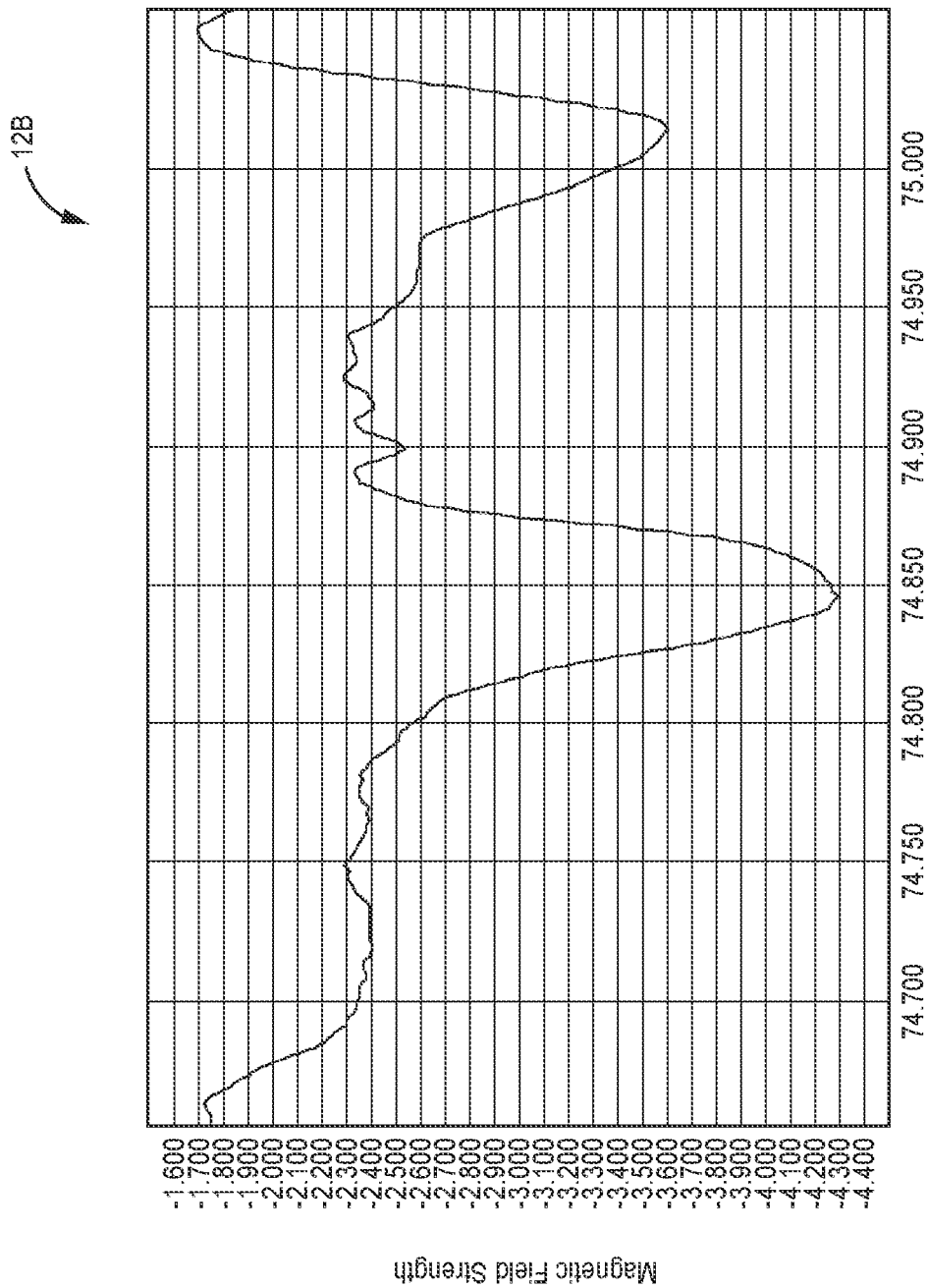
FIG. 30 shows a graph of detected magnetic field strength over time, according to one implementation.
Figure 31:
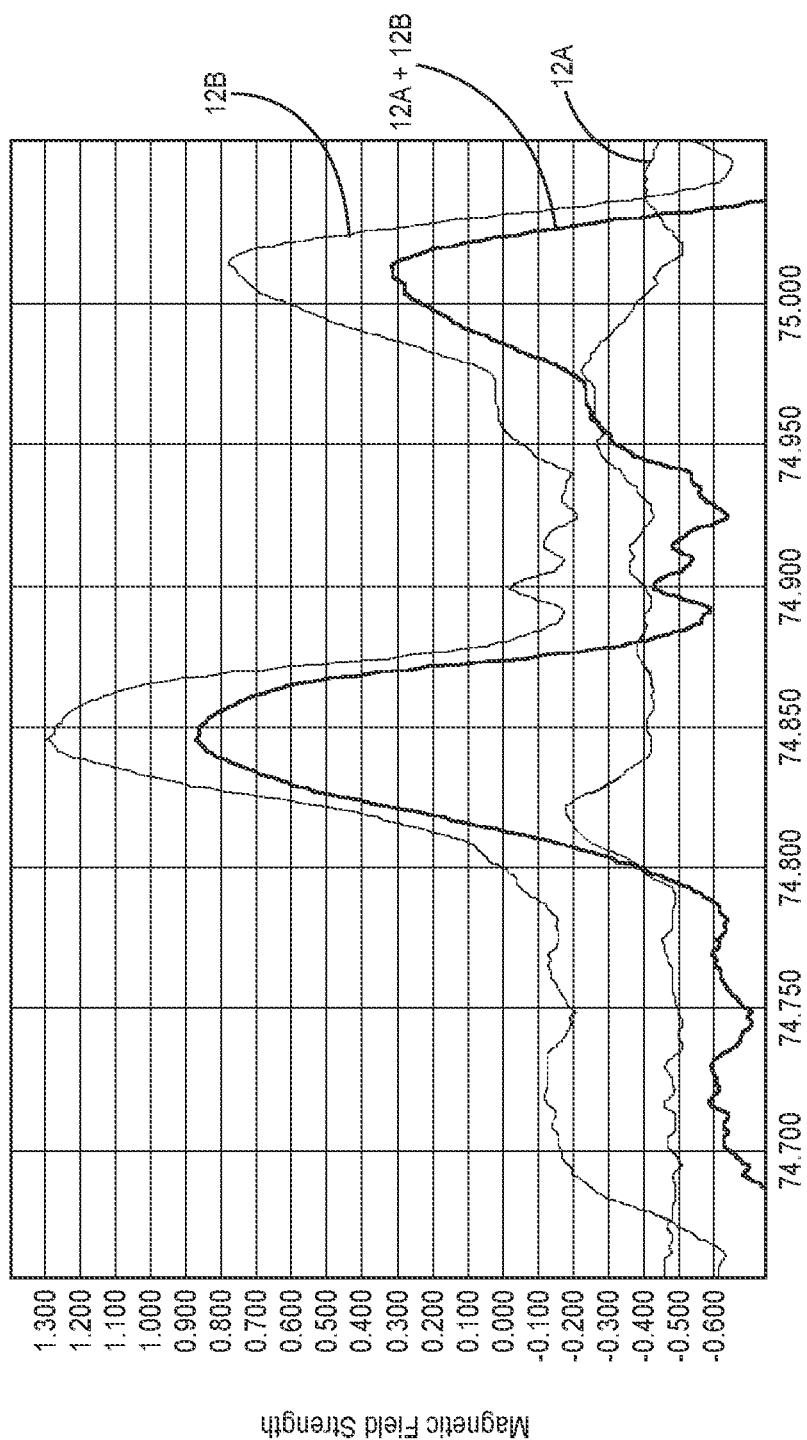
FIG. 31 shows a graph of wand displacement calculated from the detected magnetic field strength over time, according to one implementation.
Figure 32A:
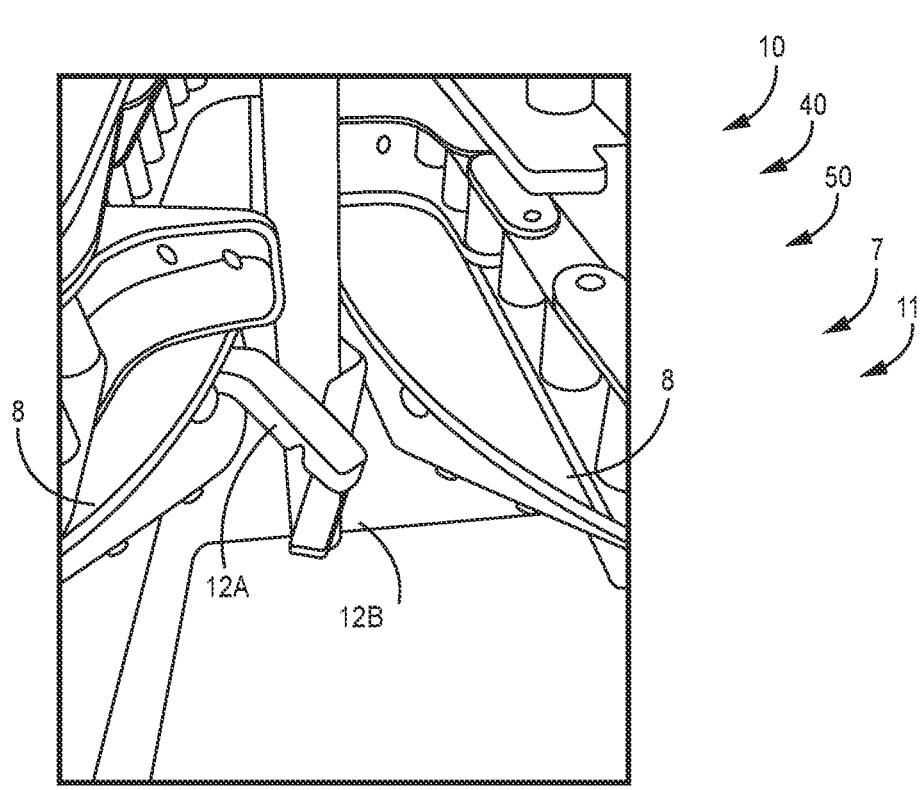
FIG. 32A shows a stalk passing through a dual wand sensor in the reverse direction, according to one implementation.
Figure 32B:
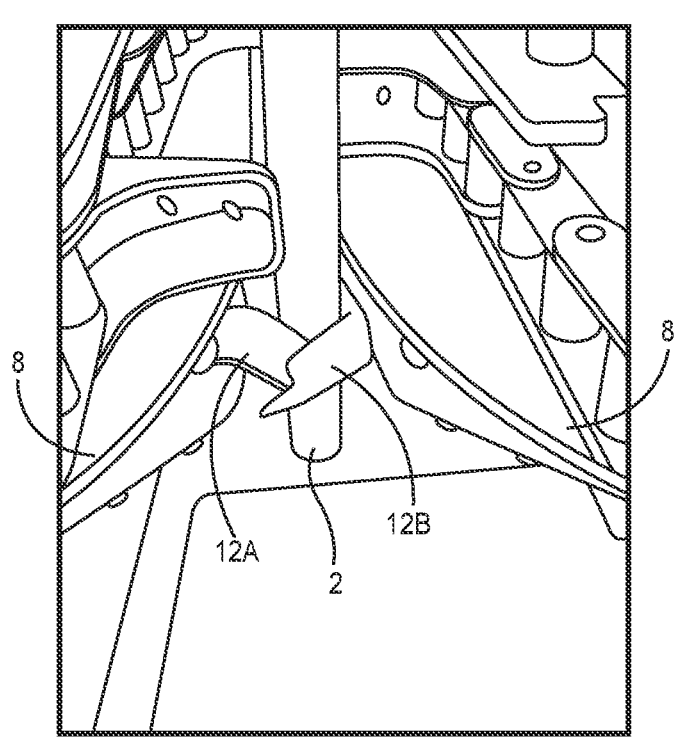
FIG. 32B shows a stalk passing through a dual wand sensor in the reverse direction, according to one implementation.
Figure 33A:
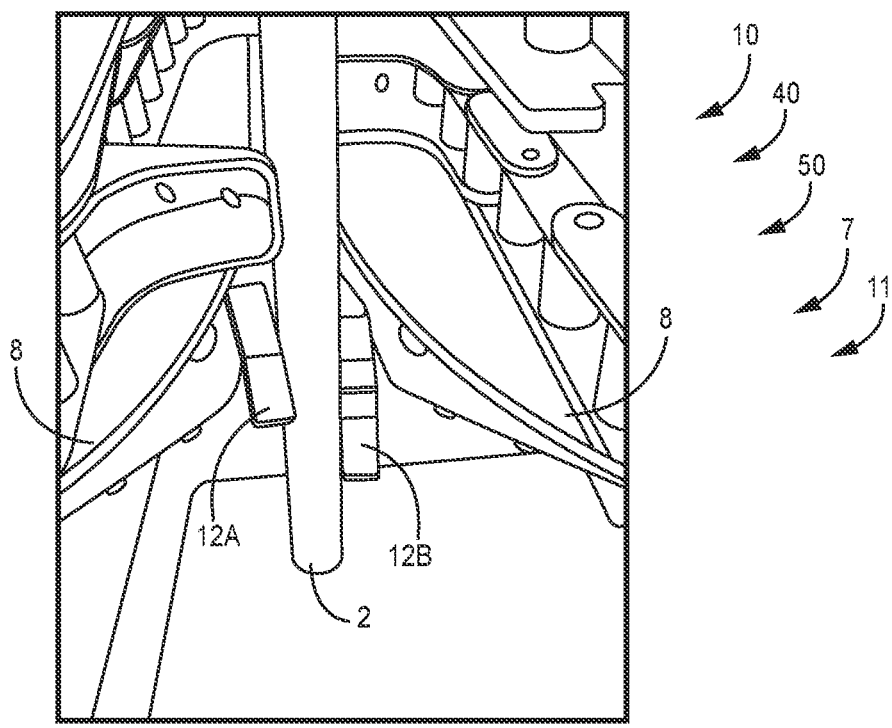
FIG. 33A shows a stalk passing through a dual wand sensor in the reverse direction, according to one implementation.
Figure 33B:
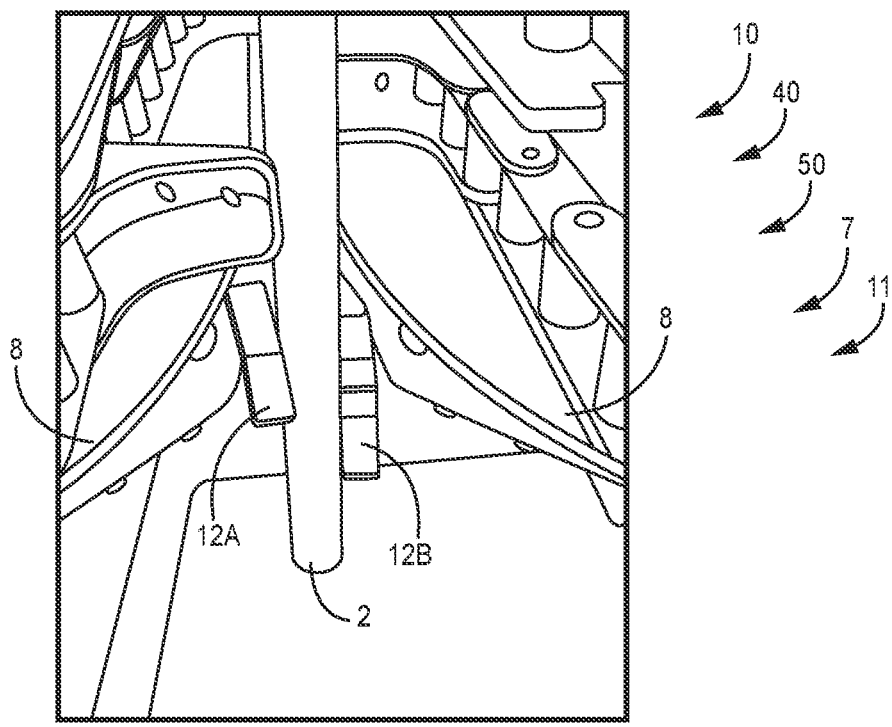
FIG. 33B shows a stalk passing through a dual wand sensor in the reverse direction, according to one implementation.

FIGS. 29-31 depict exemplary sensor 54 signals corresponding to a 400 millisecond sample period in which two corn stalks 2 passed through a sensor apparatus 50—specifically the dual wand sensor 40 shown in FIG. 16. FIG. 29 shows the sampled magnetic field strength for a first wand 12A and FIG. 30 shows the sampled magnetic field strength for the right wand 12B. In this implementation, the deflection signals were filtered over 10 samples to reduce sensor 54 noise and produce a smoother signal.

In certain implementations, a calibration procedure (described below) may optionally be performed for each wand 12A, 12B to calculate a formula that produces a measured displacement distance based on measured magnetic field strength.

FIG. 31 shows the resulting displacement distance for the left wand 12A and right wand 12B (measured in inches), as well as the combined displacement for both wands 12A+12B that represents the displacement produced by the corn stalk 2 passing through the sensor apparatus 50.

IV. Calibration

In various implementations, the system 10 may be calibrated by deflecting each wand 12A, 12B using a set of boards, or other devices, of known thickness through the wand 12 deflection range. At each known deflection (or thickness), the measured value of the magnetic field strength is recorded. The recorded values for magnetic field strength may then be graphed against their corresponding deflection and a deflection equation determined for each wand 12A, 12B. In implementations having a double wand sensor 40, the measured deflection distances from each wand 12A, 12B are added together to produce the total deflection, which corresponds to the displacement produced by the corn stalk 2 passing through the sensor assembly 50.

V. Reverse Operation

FIGS. 32A-33B depict implementations of the system 10 directed to reverse operation, such as to clear the corn head 7 in the case of a plug or other reason, as would be appreciated.

In various implementations, under normal operating conditions the wands 12A, 12B form a "V" shape that is open to the flow of stalks 2 as the combine 6 moves forward through the field during harvest operations. Standing stalks 2 pass through the counter wands 12A, 12B and into the combine 6 head 7 mechanism where the ear is stripped off by the stalk rolls. As would be appreciated, occasionally the row unit 11 on the corn head 7 may plug with stalks 2, weeds, or other material. When this happens the combine 6 operator can reverse the operating direction of the corn head 7 to push the plugged material forward out of the corn head 7 to clear the blockage. In various implementations, the stalk counter wands 12, 12A, 12B are designed to allow this type of reverse operation to happen without impeding the reverse direction flow and then reset to normal operation without any direct input or effort by the operator or others.

In various implementations, the resilient wands 12, 12A, 12B are constructed and arranged so that they can buckle over to allow the stalks to flow through a reverse "V" shape as shown in FIGS. 32A-B and 33A-B. In various implementations, the wands 12, 12A, 12B are then free to disengage with either each other or with a fence 14 and the crop is free to flow through the wand 12 or wands 12A, 12B.

After the crop has cleared the wand 12 or wands 12A, 12B, the wand 12 or wands 12A, 12B flex towards their neutral or resting position. New crop subsequently entering the head 7 will return the wand 12 or wands 12A, 12B to their normal operating position.

VI. Data Visualization and Yield Prediction

Turning now to FIGS. 34-37, various implementations of the system 10 comprise a yield report system 100 for predicting crop yields using stalk size, stalk count, historical data, seed/plant data, field data, weather data, and other data, as would be readily appreciated by those of skill in the art. The yield report system 100 may be implemented or used in conjunction with a variety of known harvester systems disclosed above and incorporated herein, including but not limited to the systems, methods, and devices disclosed in U.S. application Ser. No. 16/445,161, filed Jun. 18, 2019 and entitled "Agricultural Systems Having Stalk Sensors and/or Data Visualization Systems And Related Devices and Methods," which is incorporated herein by reference in its entirety for all purposes.

The disclosed yield report system 100 and associated methods and devices relate to the real-time or near real-time use of collected data to provide information to the operator and allow for the prediction and analysis of yield data. While various implementations of the disclosed yield report system 100 are disclosed herein it would be understood by those of skill in the art that the disclosed yield report system 100 consists of one or more steps and/or components each of which is optional or may be omitted entirely. Further, the various steps may be performed in any order or not at all, and the order of presentation of various steps and sub-steps does not imply that they may only be performed in any certain order.

As is appreciated in the art, current methods of tracking yield are not real-time. Rather, at best, the prior art systems have a delay—such as a delay of about 8 to 10 seconds—as the harvester passes through the field or row, and is processed through a threshing or other system.

As one illustrative example, as a given combine passes through a waterway—where the ground truth yield is 0 Bu/acre—the displayed yield at that moment is not 0 Bu/acre, but instead what the estimated yield was for some point in the field 8-10 seconds behind the harvester. That is, as one illustrative example, at 88 ft/min per mph with a 4 mph travel speed and a 10 second delay the distance traveled is: (88 ft/min*4 mph*10 seconds)/1 minute=58.7 feet back from the current location. Such discrepancy/time delay is appreciably suboptimal for the user experience, as would be readily understood. Additionally, the delay in yield measurement can cause yield map errors. This delay and errors caused by the delays may be particularly pronounced in high-speed harvest situations.

Further, and as would be readily appreciated, harvesters do not clear all of the crop inside the threshing unit instantly, and as such, the yield may be attributed by prior art systems into areas of where there was no crop, or to an incorrect area causing an area to appear to have a higher or lower yield than was actually present. Known techniques to cure these errors include the use of techniques such as GPS mapping and head lift switches.

Turning back to the yield report system 100 are configured to produce high resolution yield maps and/or readings with row-by-row resolution of projected yield based on recorded inputs such as stalk size, stalk count, and/or total yield per area. In certain implementations, the yield report system 100 makes use of the sensor system 10 implementations discussed in relation to FIGS. 1-33 to predict the yield in real-time or near-real time. In various of these implementations, the yield report system 100 comprises a variety of processing steps executed via hardware and software components to generate displayed yield information. Each step is optional and may be performed in any order or not at all.

Figure 22:
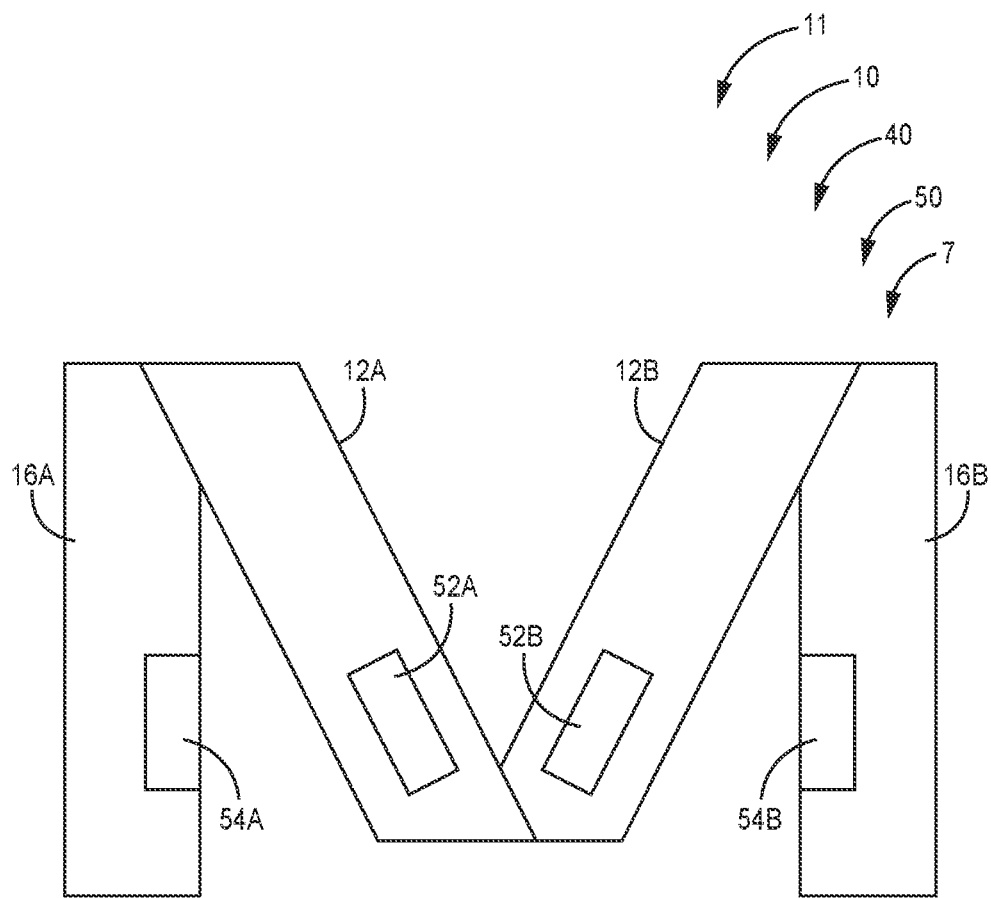
FIG. 22 is a top view of a dual wand sensor, according to one implementation.
Figure 23:
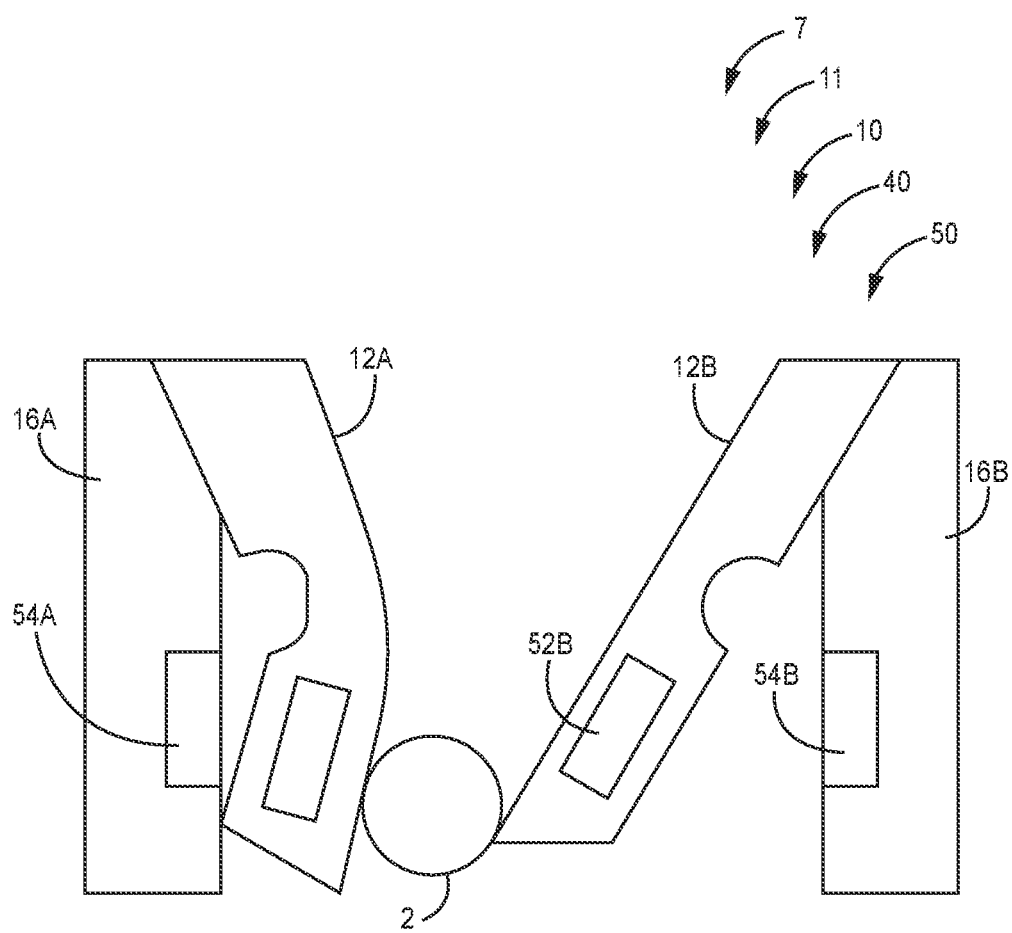
FIG. 23 is a top view of a stalk passing through a dual wand sensor, according to one implementation.
Figure 34:
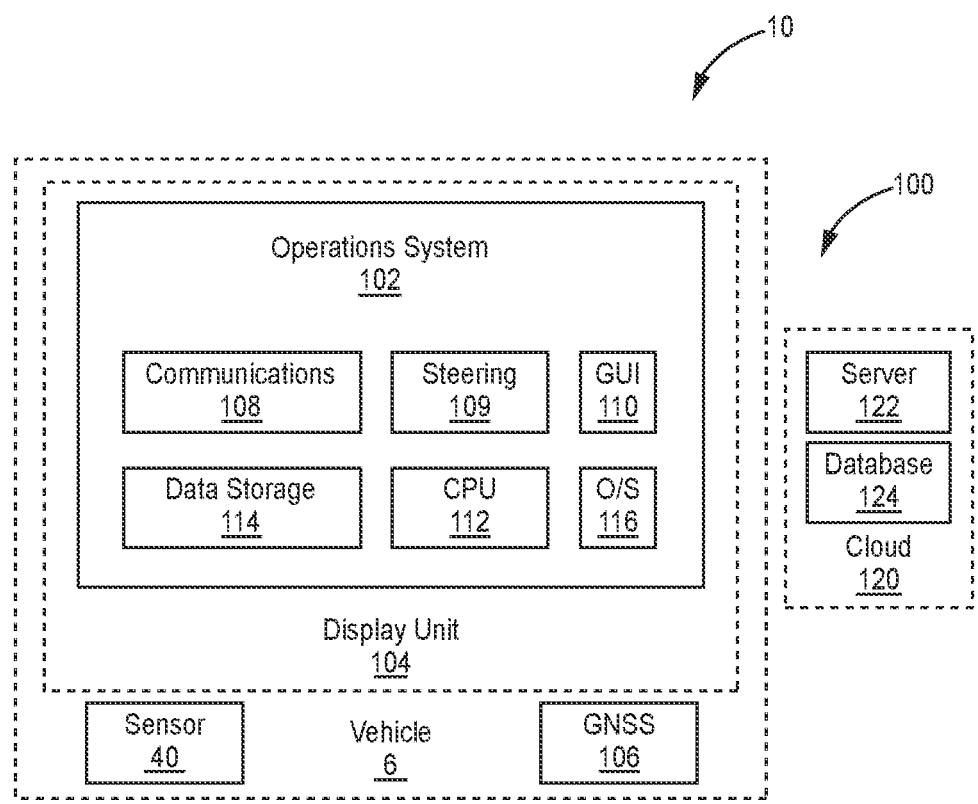
FIG. 34 is a schematic system diagram of the yield report system, according to one implementation.

FIG. 34 depicts an exemplary implementation of the yield report system 100 components that may be fitted to an agricultural vehicle 6 such as a combine harvester 6 like that shown in FIG. 4 above having a sensor 40, like the dual wand sensors 40 of FIGS. 22-23. It is understood that a variety of vehicles 6 and implements can be utilized in various implementations, and that any of the sensor systems 10 discussed above or their equivalents can be utilized in further implementations. That is, the design principles and concepts discussed herein are applicable to any of the above mentioned or referenced vehicle and sensor formats.

It is further understood that the various components shown in FIG. 34 are optional, and can be utilized or omitted in the various claimed implementations, and that certain additional components may be required to effectuate the various processes and systems described herein.

Continuing with FIG. 34, the yield report system 100 according to this implementation has an operations system 102 that is operationally integrated with the sensors 40 and several other optional components on the combine 6 or elsewhere, such as a display 104. Various displays 104 are known to those of skill in the art, including in-cab displays 104, such as an InCommand® display from Ag Leader. It is appreciated that certain of these displays 104 feature touchscreens, while others are equipped with necessary components for interaction with the various prompts and adjustments discussed herein, such as via a keyboard, buttons, or other interface.

In various implementations, the system 100 is also operationally integrated with a GNSS or GPS unit 106, such as a GPS 7500, such that the system 100 is configured to input positional data for use in defining boundaries, locating the combine 6 for yield prediction, plotting guidance, and other purposes, as would be readily appreciated from the present disclosure.

Continuing with FIG. 34, in various implementations, the operations system 102 is optionally in operational communication with a communications component 108. In certain implementations, the communications component 108 is configured for the sending and receiving of data for storage and processing, such as to the cloud 120, a remote server 122, database 124, and/or other cloud computing components readily understood in the art. Such connections by the communications component 108 can be made wirelessly via understood internet and/or cellular technologies such as Bluetooth, WiFi, LTE, 3G, 4G, or 5G connections and the like. It is understood that in certain implementations, the communications component 108 and/or cloud 120 component comprise encryption or other data privacy components such as hardware, software, and/or firmware security aspects.

As shown in FIG. 34, the operations system 102, according to certain implementations, further has one or more optional processing and computing components, such as a CPU or processor 112, data storage 114, operating system ("O/S") 116, and other computing components necessary for implementing the various technologies disclosed herein. It is appreciated that the various optional system components are in operational communication with one another via wired or wireless connections and are configured to perform the processes and execute the commands described herein. As would be understood, each of these components can be located optionally at various locations around the vehicle or elsewhere, such as in the cloud 120 and accessible by a wireless or cellular connection.

In various implementations, this connectivity means that an operator, enterprise manager, and/or other third party is able to receive notifications such as adjustment prompts and confirmation screens on their mobile devices or via another access point. In certain implementations, these individuals can review the various data generated by the system 100 and make adjustments, comments, and/or observations in real-time or near real-time, as would be readily appreciated.

In certain implementations, the operations system 102 also includes or is operationally integrated with a steering component 109, such as an automatic or assisted steering component 109, such as SteerCommand® from Ag Leader.

In certain of these implementations, the operations system 102 is housed in the display 104, and is operable by the user via, optionally, a graphical user interface ("GUI") 110, though the various components described herein can be housed elsewhere, as would be readily appreciated.

Figure 35A:
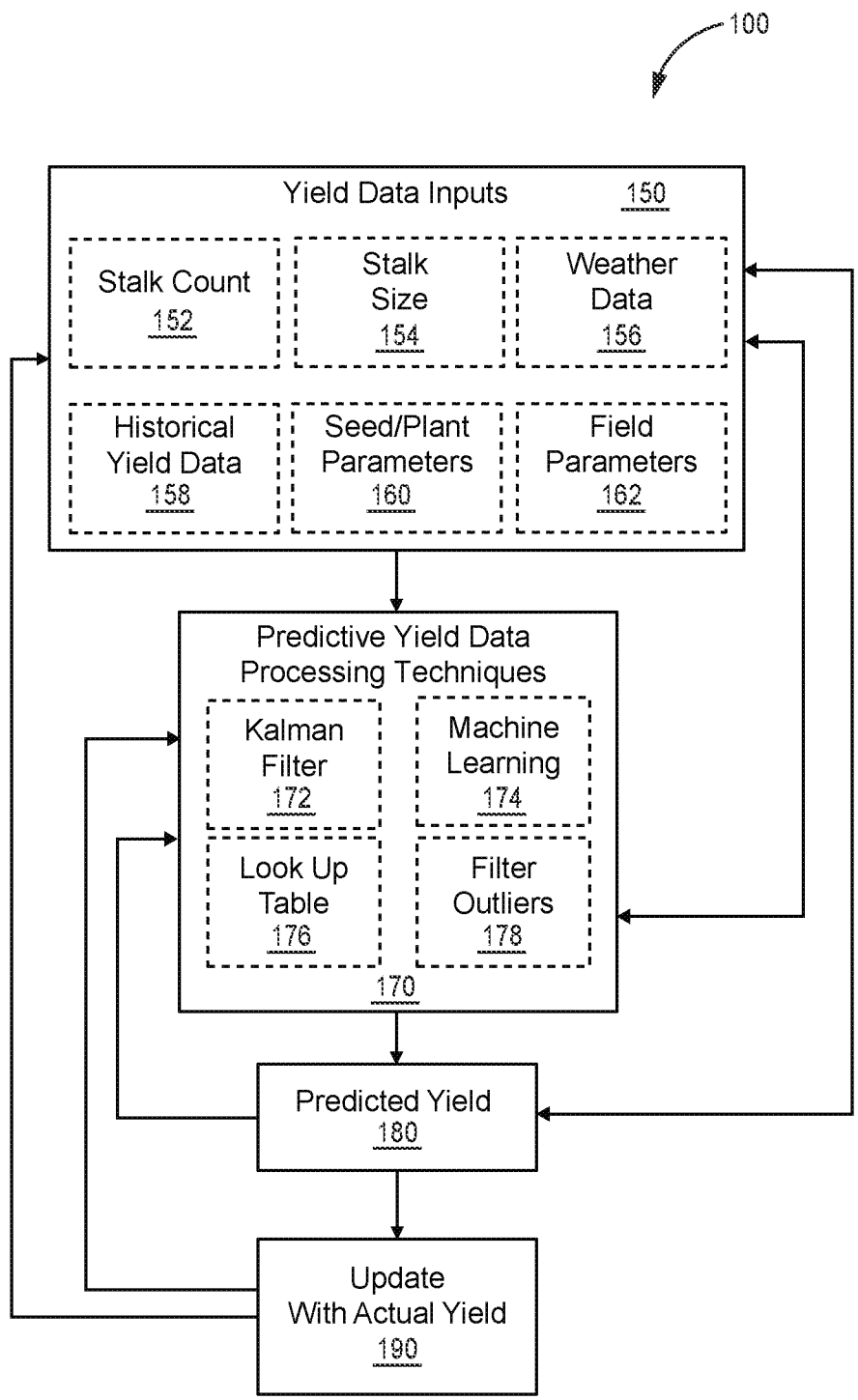
FIG. 35A is a flow diagram for the yield report system, according to one implementation.

Turning to FIG. 35A, during use the system 100 according to various implementations can utilize any of the various sensing systems 10 and/or sensor assemblies 30, 40, 50 disclosed above to obtain certain yield data inputs 150, such as stalk size and the like. In various implementations, the system 100 utilizes a rotational stalk sensor 30, 40, 50 that are constructed and arranged to measure the passage of each stalk, or other stalk characteristics specific to the individual sensor type, as has been previously described in the incorporated references. In any event, these sensor assemblies 30, 40, 50 mechanically engage or otherwise interact with passing plant stalks to detect and measure plant stalks on an individual plant and row-by-row basis, generating one or more yield data inputs 150 such as stalk count data 152 and/or stalk diameter data 154.

In various implementations, the sensor assemblies 30, 50 include one or more wands 12A, 12B, wheels, or other sensing members, as has been previously described above, and for example in U.S. Ser. Nos. 16/445,161 and 17/013,037, which have been incorporated herein.

Figure 35B:
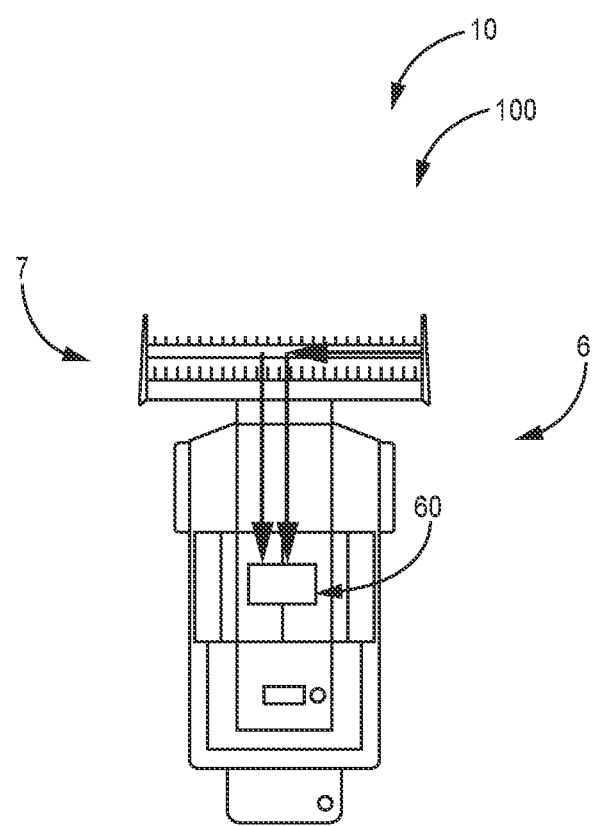
FIG. 35B is a top view of a harvester, according to one implementation.

Continuing with FIG. 35A, in various implementations, the yield data inputs 150 can include various measurable stalk, field or other traits including but are not limited to stalk count data 152, stalk size data 154 such as diameter or perimeter value data 154, weather data 156, historical yield data 158, seed or plant parameters 160, and field parameters 162 may be used by the system 100 to predict yield values in real-time or near real-time as a plant is entering a corn head 7 (as shown in FIG. 35B) prior to processing by the harvester 6 and measurement of actual yield by a yield monitor 60.

For example the system 100 may utilize stalk count data 152 and/or stalk size data 154 as yield data inputs 150 in the prediction of yield. That is, this real-time, row by row stalk count 152 or size 154 data may be used to predict yield in real-time or near real-time.

Optionally, the system 100 may also predict yields in real-time or near real-time by retrieving and utilizing historical yield data 158. Historical yield data 158 may be used along with the real-time stalk counts 152 and/or stalk sizes 154 from various sensor assemblies 30, 40, 50 and/or a stalk sensor system 10 such as those described above. In one example, in certain implementations of the system 100, the system 100 is in operational communication with a historical yield database from which historical yield data 158 may be obtained, such as is described in incorporated reference U.S. application Ser. No. 16/939,785.

Various additional, optional yield data inputs 150 may be utilized by the system 100 in predicting yield in real-time or near real-time. Weather data 156 may be used, for example, where weather data 156 indicates a drought, an extremely rainy season, a hotter than average temperature during the growing season, and other circumstances that are known to effect yields. Another optional yield data input 150 is seed or plant parameters 160, certain types of seeds or plants may be known to have different characteristics or responses to various circumstances that may be effect yield, and as such may be utilized by the system 100 in predicting yield. Further, field parameters 162 may be used as a yield data input 150 for the system 100 for use in predicting yield. Field parameters 162 may include fertilizer treatments, insecticide treatments, terrain data, soil type, rock locations, past crop history, and other data or parameters as would be appreciated by those of skill in the art. Each yield data input 150 type outlined above is optional and may or may not be utilized by the system 100 in predicting yield values, various additional inputs yield data 150 may also be used and the above listing is provided for illustrative purposes.

The system 100 may then utilize various predictive yield data processing techniques 170 to process the yield data inputs 150 to predict yield 180. Exemplary predictive yield data processing techniques 170 include the use of a Kalman filter 172 as an adaptive predictive model, various machine learning protocols or algorithms 174, look up tables 176, and various recognized processes for filtering or excluding outliers 178. Of course other predictive yield data processing techniques 170 are known and can be implemented in conjunction with the system 100, as would be appreciated.

The process of taking yield data inputs 150 and processing those yield data inputs 150 via predictive yield data processing techniques 170 may be done iteratively such that the system 100 is continuously receiving yield data inputs 150 and processing those inputs via predictive yield data processing techniques 170. Further the processed data may be fed back into the yield data inputs 150 to further inform future operations.

Figure 36A:
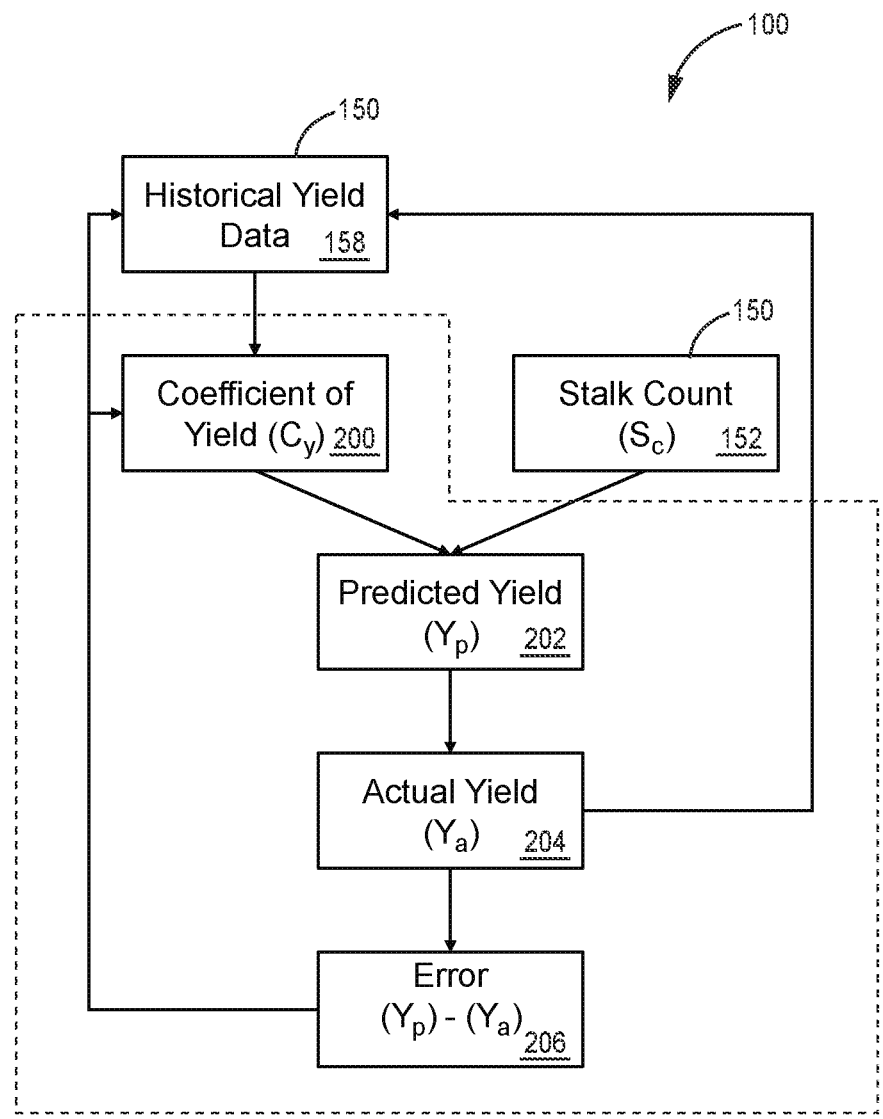
FIG. 36A is a flow diagram of a data processing step of the yield report system, according to one implementation.

In one example of a data processing technique 170 and an iterative process is shown in FIG. 36A. In this example both historical yield data 158 and stalk count data ($S_c$) 152 are used as yield data inputs 150 for the system 100. In this implementation, the historical yield data 158 may be accessed and analyzed by the system 100 to determine a coefficient of yield ($C_y$) 200 or other parameter to be used to predict or estimate yield ($Y_p$) 202 when combined with stalk count data ($S_c$) 152.

In this example, the system 100 can predict yield ($Y_p$) 202 in real-time or near real-time by taking the inputted stalk count ($S_c$) 152 and multiplying by the coefficient of yield ($C_y$) 200. Various alternative mathematic processes are possible for predicting yield ($Y_p$) from various yield data inputs 150.

As harvest continues, and as discussed above, the crop is processed by the harvester 6 and an actual yield ($Y_a$) 204 may be obtained. Actual yield ($Y_a$) 204 may be obtained on a plant-by-plant or row-by-row basis as has been disclosed previously, such as in various application incorporated herein. Once the actual yield ($Y_a$) 204 is determined the display may be updated with the actual yield ($Y_a$) value. Further the actual yield ($Y_a$) 204 may be included in historical yield data 158 or otherwise used as an input for future processing by the system 100.

The system 100 may also determine if an error is present by comparing the predicted yield ($Y_p$) to the actual yield ($Y_a$). Any error or lack of error may be included in the historical yield data 158 or otherwise used as an input for future processing by the system 100.

Figure 36B:
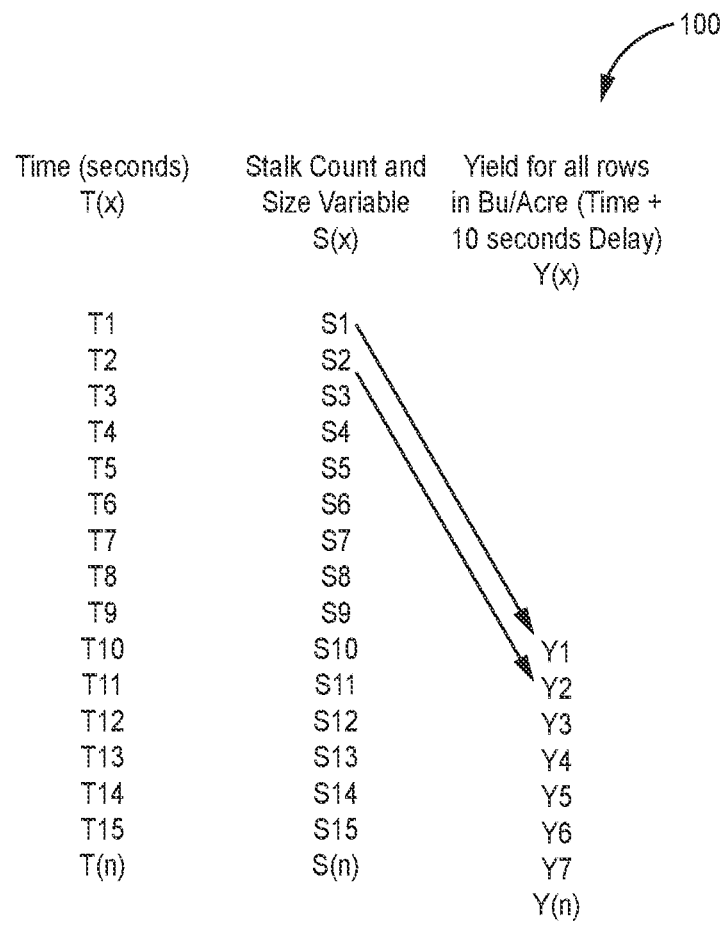
FIG. 36B is a chart showing one implementation of a data processing step of the yield report system, according to one implementation.

The system 100, in various implementations is configured to correlate the time T(x) with a stalk variable S(x), such as stalk count or stalk or stalk size with a yield value Y(x) where (x) is a measure of time such that the yield measurements are correlated with the correct actual crops harvested accounting for the time delay, as shown in FIG. 36B. The time delay between measuring a stalk and the grain from that plant reaching the yield monitor depends on which location on the corn head the plant was harvested and the delay for a harvester 6 to thresh and clean the grain, referenced previously. Plants harvested on an end of the head have a greater distance to travel than those harvested in the middle and consequently experience a longer delay. This can be accounted for when using actual yield data as feedback for any predictive algorithms.

Turning back to FIG. 35A, as a part of the predictive yield data processing techniques 170, various statistical and/or mathematical techniques may be applied to filter, weight, or eliminate outlier data points 178. The processing or filtering of outliers 178 may be done to reduce noise within the system 100 and thereby generate more accurate or precise predictions. Various techniques are known to those of skill in the art to filter outlier and include, among others, setting limits for the maximum and minimum predicted values allowed, use of a recursive or low-pass filter, and/or removing statistical outliers and replace those points with data from prior predictions or historical data.

Additional causes of variation in yield data include uneven loading of elevator chain paddles and grain flow dynamics in the auger. When subjected to a step-change in harvested grain flow at the corn head 7, shown for example in FIG. 35B, a yield sensor 60 shows the flow rate on the impact plate building up as a first-order lag with a time constant of five seconds. Implementing models of this behavior and adjusting model parameters to represent a specific installation can improve yield prediction accuracy.

Continuing with FIG. 35A, the predicted yield 180 may be displayed or otherwise communicated to an operator in real-time or near real-time such that the displayed predicted yield 180 correlates to the visual of the crop as it enters the corn head 7.

The displayed predicted yield 180 may be updated to the actual yield value 190 after the crop has been processed and an actual yield value obtained from a yield monitor. Alternatively, the actual yield 190 may be displayed alongside or with the predicted yield 180. This actual 190 and predicted yields 180 may be continuously or periodically introduced into the input data sets such that the system 100 is continuously or periodically updated with relevant data.

Figure 37:
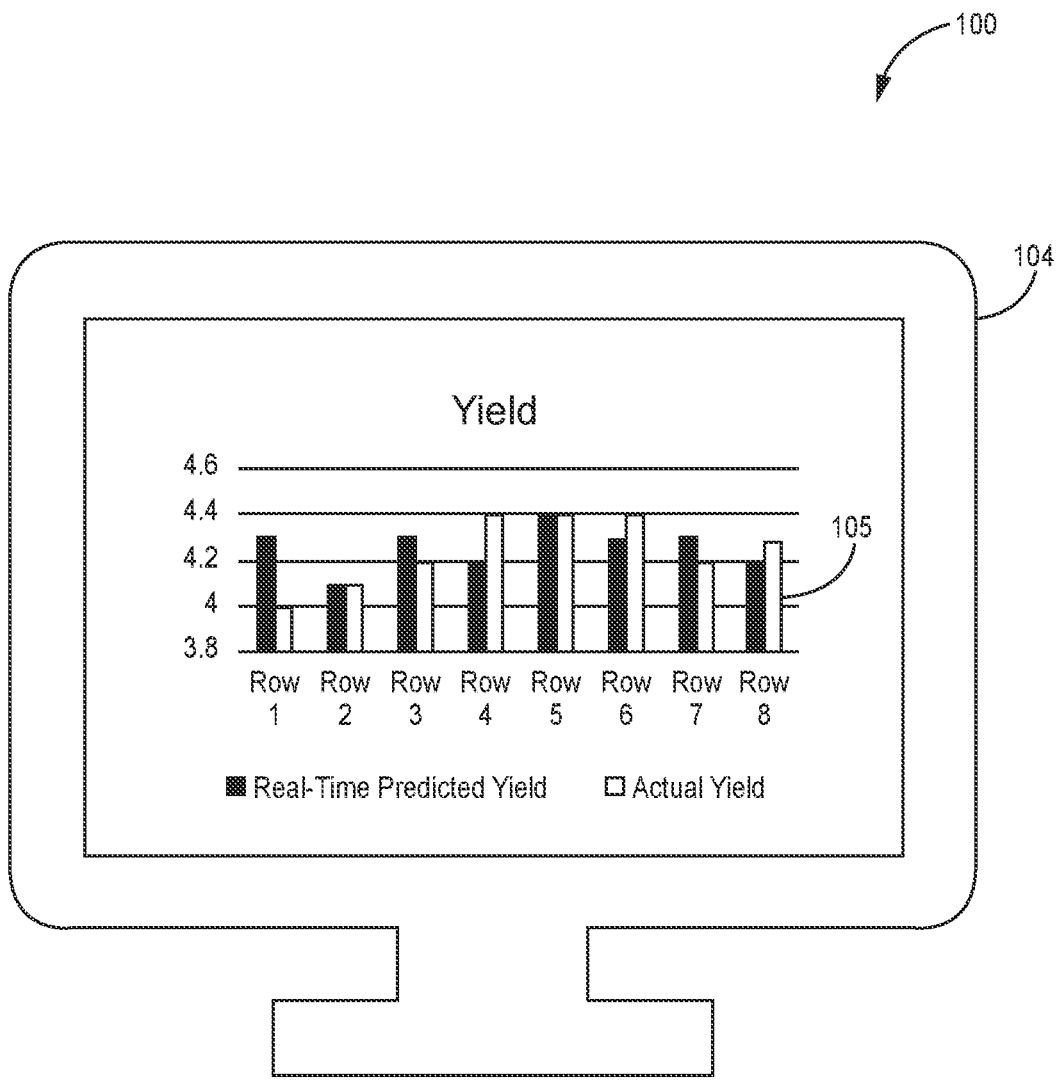
FIG. 37 is an exemplary depiction of a display.

In some implementations, the system 100 may be configured to display the yield real-time predicted yield and actual yield of each row of a corn head 7 in a bar graph or other graph format 105 on a display 104 as would be appreciated, shown for example in FIG. 37. In one example, rows having strong stalks at consistent spacing will typically show as more productive—having a higher yield strength—when compared to rows with weaker and/or fewer stalks.

In some implementations, the system 100 may display data as a function of a field average yield, displaying row-by-row information relative to the field average. In these implementations, rows having stronger and healthier stalks may have a relative yield percentage greater than 100% when compared to the average. Various alternative methods for display the data discussed herein would be appreciated by those of skill in the art These implementations allow for a user to see, in real-time or near real-time, the crops entering the combine 6 corn head 7 and the predicted yield values using the system 100 described above. In some implementations, the delayed yield information may be applied to incoming rows to predict the yield for each row as it enters the combine 6 corn head 7.

VII. Stripper Plate Control

Turning now to FIGS. 38-41, various implementations of the system 10 may including a stripper plate control system 300. The stripper plate control system 300 is configured for monitoring, adjusting, and/or emitting alarms/warning related to stripper plate 70 position. In various implementations, the space or gap between the stripper plates 70 is manually or automatically adjusted in accordance with changing, sensed conditions, including but not limited to changes in stalk size as measured by one or more sensor assemblies 30, 40, 50, such as those described above and are incorporated by reference herein. Exemplary implementations of the system 10 comprising the stripper plate control system 300 allow for on-the-go, row-by-row remote adjustment of stripper plate position in response to the feedback received by the operator during use, such as via a display 104.

The disclosed stripper plate control system 300 and associated methods and devices relate to real-time or near real-time use of collected data to provide information to an operator for adjustment of stripper plate position. While various implementations, of the disclosed stripper plate control system 300 are disclosed it would be readily understood by those of skill in the art that the stripper plate control system 300 consists of one or more components each of which is optional or may be omitted entirely.

Figure 38:
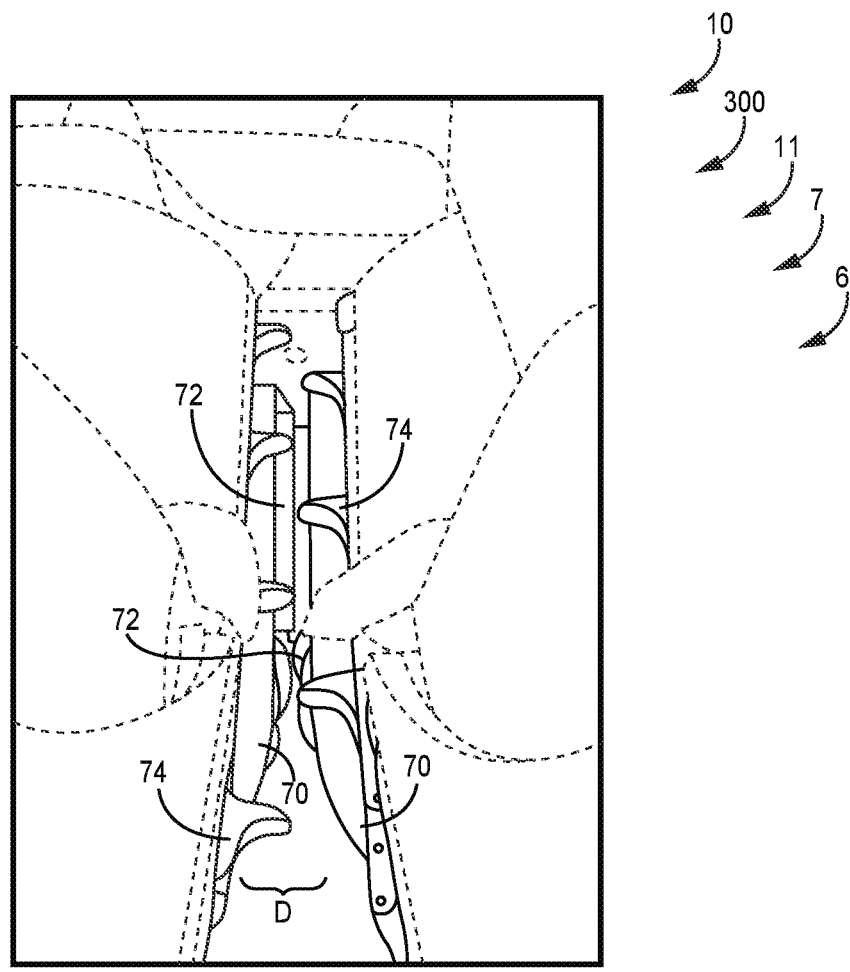
FIG. 38 is a top view of a row unit, according to one implementation.

Turning now to FIG. 38, it is appreciated by those of skill in the art that corn harvesters 6 often include stripper plates 70 set at a specified distance apart (D) from one another on the corn head 7. That is, the stripper plates 70 define a gap with a width (D). It is understood that, in order to maximize yield the stripper plate 70 gap should be set to a width (D) that allows for stalks 2 to pass through the stripper plates 70 but is not too narrow where the stalks 2 will bunch up or too wide where corn ears may shell when they come into contact with the stripper plates 70.

Various known corn heads 7 allow for manually adjusting the width (D) of the gap. These currently known systems, require an operator to estimate the size of the stalks and adjust the width (D) based on the estimated stalk size. Estimates of the stalk sizes can be inaccurate and often difficult to ascertain. These error in estimates of stalk sizes can lead to selecting an improper width (D) for the gap between the stripper plates 70, which can cause lost yields.

Continuing with FIG. 38, an exemplary row unit 11 includes two stalk rolls 72 that pull and crumple the stalk 2 down through the row unit 11 to the ground. The set of stripper plates 70 are configured to strip ears off the stalks 2 as the stalks 2 are pulled down through the gap between the stripper plates 70. The row unit 11 may additionally include gathering chains 74 (also referred to as gathering fingers) to carry the stripped ears to a cross auger that conveys to the harvester feeder hose.

Figure 39:
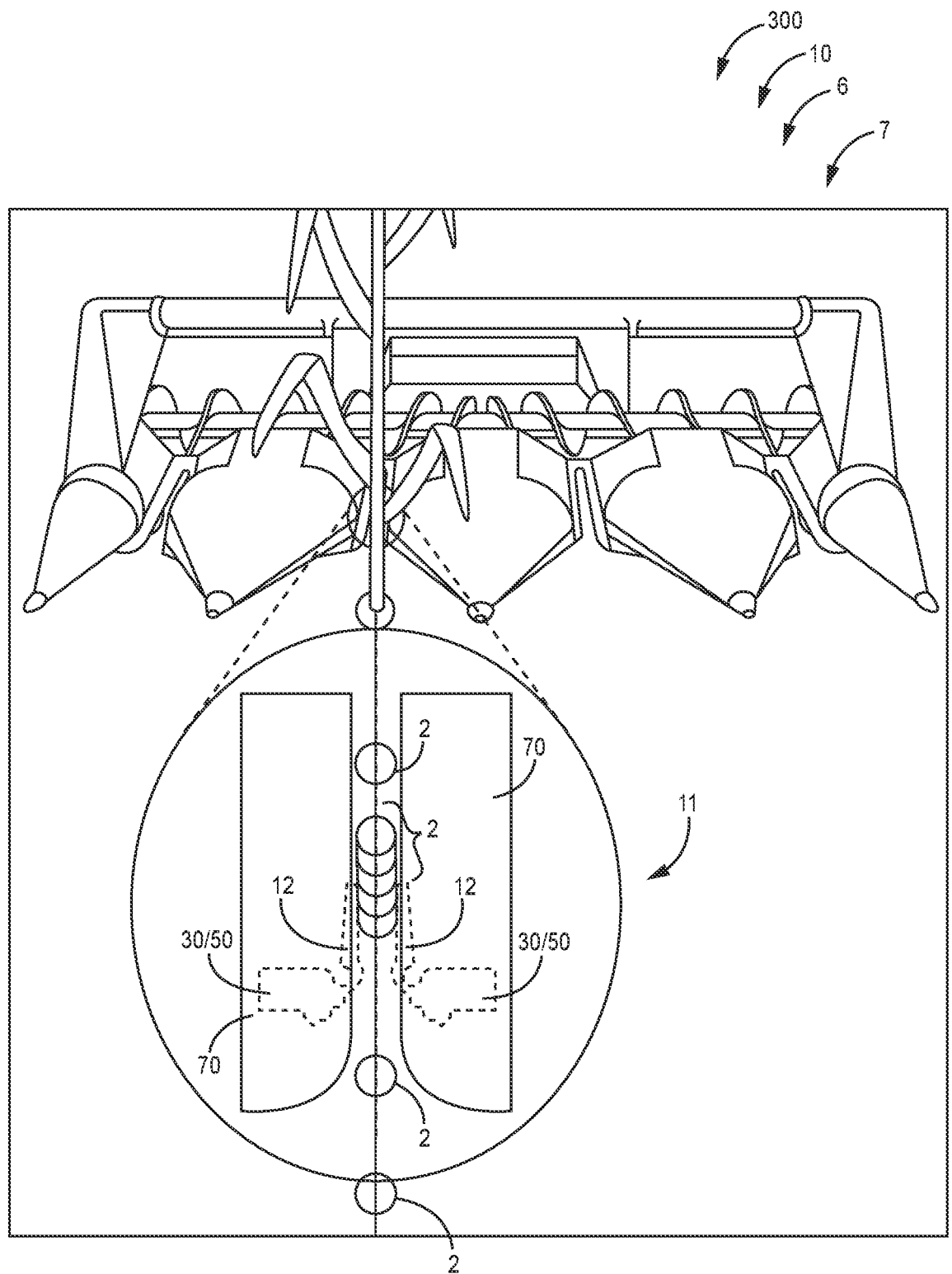
FIG. 39 is a front perspective view of a headers and an enlarged view of a row unit, according to one implementation.

In various implementations, the stripper plates 70 are adjustable relative to each other to increase or decrease the size of the gap between the stripper plates 70, in order to reduce yield loss during harvest. As would be appreciated, if the gap between the stripper plates 70 is too narrow the stalks 2 may bunch up and be urged below the stripper plates 70, causing the loss of entire ears 3, shown for example in FIG. 39. FIG. 39 depicts an implementation where stalk 2 have bunched together when passing through a sensor assembly 30, 50.

Figure 40:
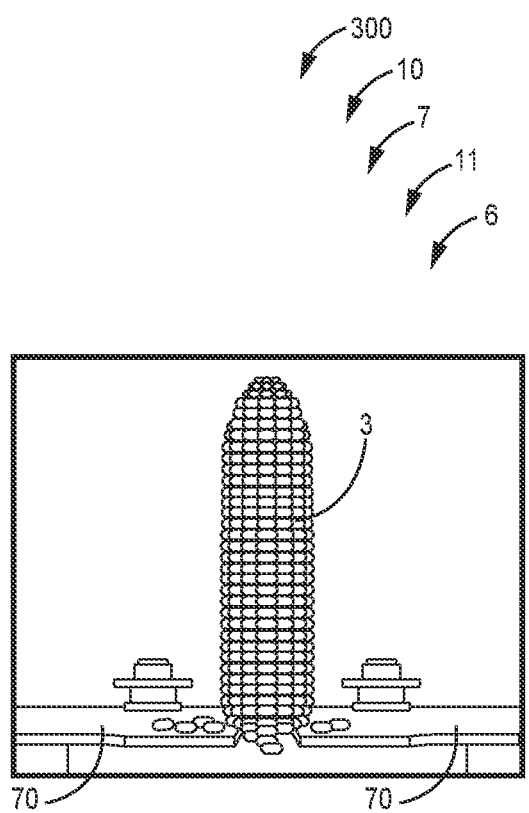
FIG. 40 is a front view of a row unit with an ear between the stripper plates, according to one implementation.

If the gap between the stripper plates 70 is too wide the butt of the ear 3 will be allowed between the stripper plates 70, as shown in FIG. 40. In these implementations, the edges of the stripper plates 70 will strike the ear 3 knocking kernels loose and scattering them on the ground thereby reducing overall yield.

Because stalk sizes can vary across a field, to maximize yield the width (D) of the gap between the stripper plates 70 must also be adjusted across a field. In known devices, an operator must estimate the size of the corn stalks 2 entering the corn head 7 and adjust the stripper plates 70 accordingly. This estimation is often inaccurate due to the speed of harvest and the distance the operator is from crop during harvest.

Figure 41:
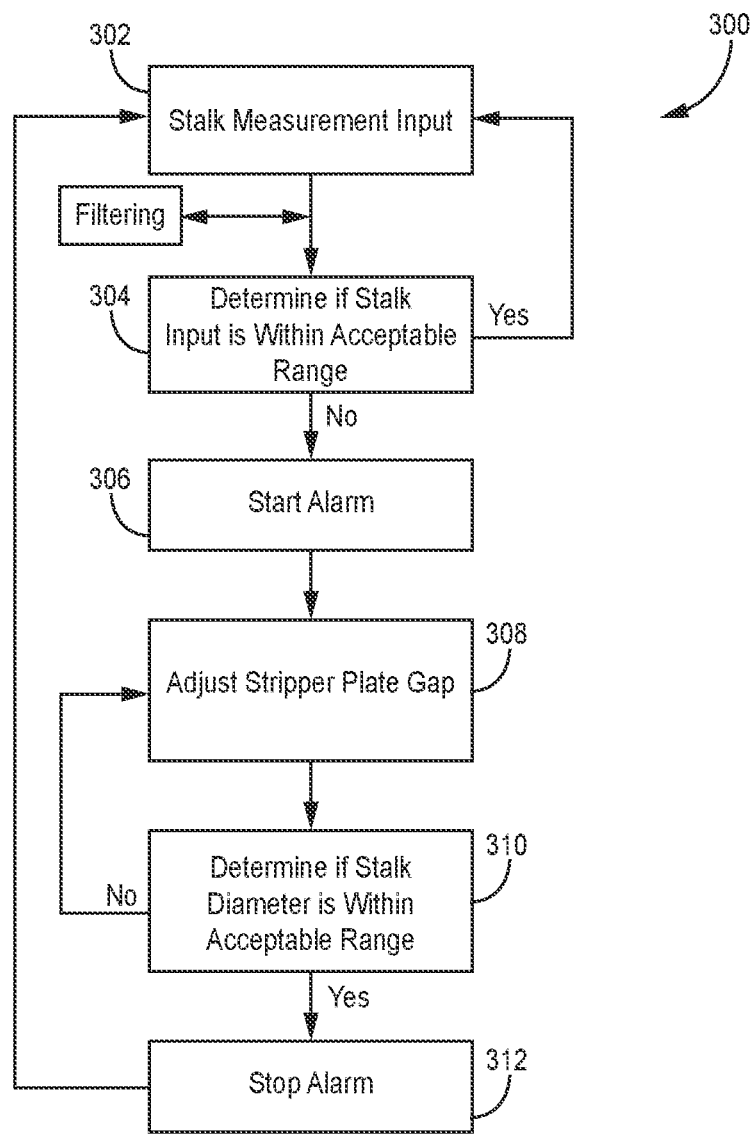
FIG. 41 is a flow diagram of the stripper plate control system, according to one implementation.

Turning to FIG. 41, the stripper plate control system 300 may include one or more steps that may be performed in any order or not at all. It would be understood that each step is optional and may or may not be performed during a given operation. In one optional step, the stripper plate control system 300 may receive stalk measurement inputs (box 302) such as from the various sensor assemblies 30, 50 described herein.

Continuing with FIG. 41, in some implementations, the system 300 may accept stalk size measurement inputs (302) on a continuous or periodic basis, such as via a wireless or wired connection from one or more sensor assemblies 30, 50. In certain implementations, the system 300 may store measurements for multiple stalks, and determine either an average or maximum stalk 2 size over a given section of a field, after a fixed time period, or after a certain number of uniquely detected stalks 2 have passed through a sensor assembly 30, 50. Of course alternatives are possible.

Figure 42:
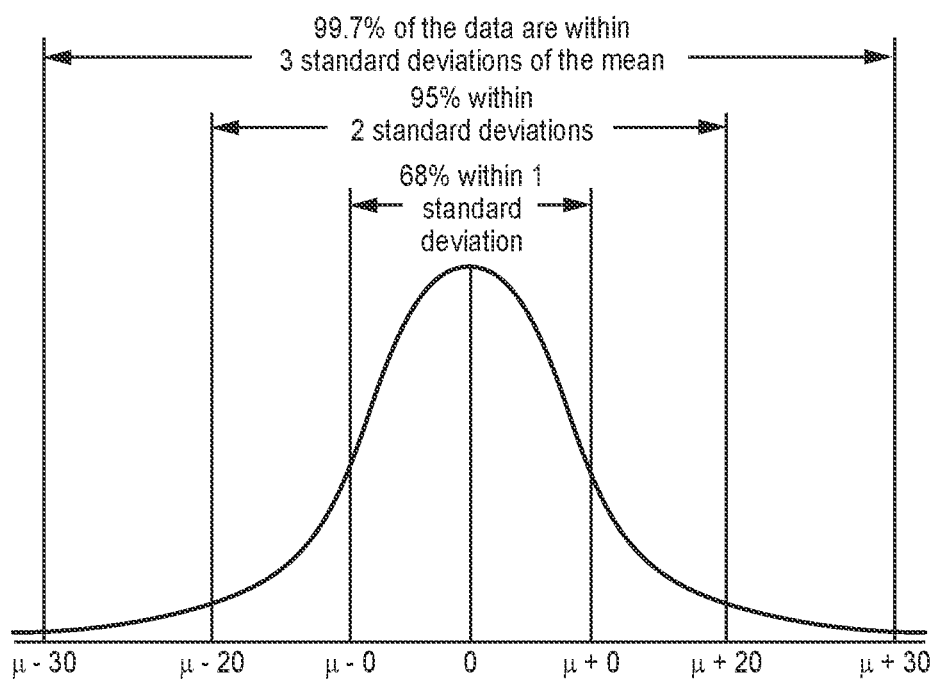
FIG. 42 is an exemplary normal distribution graph.

In some implementations, the system 300 may determine the average stalk size, such as a stalk width, and a standard deviation for the local stalk population. These statistical measures can be used in the various optional steps of the system 300 to determine the stalk size, when to trigger an alarm, and/or to control the width (D) of the gap between the stripper plates 70. In these implementations, the system 300 may be able to predict future stalk sizes. An exemplary normal distribution curve is shown in FIG. 42. The system

300 may also determine those populations that are not of a normal distribution and adjust the method of harvest and monitoring accordingly.

Turning back to FIG. 41, in various implementations, the system 300 may execute various data processing or filtering techniques for removing or otherwise weighting outlier or abnormal data points. During harvest corn stalks 2 will occasionally bunch together when passing through a row unit 11 and/or a sensor assembly 30, 50, such as shown in FIG. 39. This type of bunching may result in a longer period of stalk 2 detection, as well as in some implementations an excessively large size measurement, as would be appreciated in light of the disclosure above and those incorporated herein by reference.

Returning to FIG. 41, in various implementations of the system 300, stalk measurement inputs (302) that differ from actual ground truth may be identified, removed, or otherwise filtered. That is, outlier or incorrect measurements may be disregarded in determining stalk size. Identification may occur when the period of stalk detection is outside a threshold detection range, in these implementations a period of detection below a threshold may indicate passage of debris, leaves, or other matter that are smaller than is reasonable for a stalk 2 and a period of detection above a threshold may indicate a plugged, jammed, or row unit 11 with bunched up stalks 2 such that individual stalk 2 measurements are not possible. In another example, identification of an outlier may occur when the measured stalk size/width is a statistical outlier on when compared to a population distribution of comparable measurement. In further implementations, the system 300 may utilize machine learning to identify the condition based on the time domain measurement signal. By way of example, weeds, corn leaves, and rebounding motion from mechanical sensing members 12 can cause small measurement inputs, that are below what could reasonably be considered actual ground truth.

Continuing with FIG. 41, the system 300, in another optional step may analyze and/or otherwise determine if the stalk size or other stalk measurement input (box 302) is within an acceptable range for the current stripper plate 70 configuration (box 304). If yes, the system 300 returns to the stalk input step (box 302), which may be an iterative process. If no, the system 300 may trigger, emit, or start an alarm (box 306) indicating to an operator that the stripper plates 70 are no longer at optimal width. The alarm may be an visual or auditory alarm, or other type of alarm configured to communicate to an operation the stripper plates 70 may need to be adjusted to maximize yields.

In various implementations, the system 300 may not issue an alarm (box 306) but rather an error signal. In some implementations, the error signal may be a visual cue or other signal indicating the difference between the ideal width (D) for the stripper plate 70 gap for the most current stalk measurement input (box 302) and the current width (D) of the stripper plate 70 gap. In these and other implementations, a closed-loop control system may be provided.

In a further optional step, shown in FIG. 41, the operator may adjust the width (D) of the stripper plate 70 gap such that the width (D) is within an acceptable range (box 308). In some implementations, the adjustment of one or more of the stripper plates 70 and thereby the width (D) of the gap, may be manual or automatic. Where the control system 300 automatically adjusts the stripper plates 70, such as on a row-by-row basis, the width (D) may be adjusted in small increments until the alarm ceases, as will be discussed further below. In further implementations, the stripper plates 70 may be adjusted to a known or user entered maximum or minimum value. It is appreciated that in certain of these row-by-row implementations, the alarm can be triggered if a single row is being adjusted in the case of an audio alarm, and where the alarm is visual, it can indicate the row(s) that are out of position on the display 104, as would be readily appreciated.

Continuously or periodically, manually or automatically, the system 300 may check to determine if the stripper plates 70 have been adjusted to have a gap width (D) within an acceptable range (box 310). If the gap remains at a width (D) outside the acceptable range the alarm may continue until the stripper plates 70 are properly adjusted. In a further optional step, when the system 300 determines that the stripper plates 70 are set to a gap width (D) within the acceptable range the alarm will cease (box 312).

In various implementations, the system 300 may also detect and issue alarms when a row unit 11 is plugged, an exemplary depiction of a plugged row unit 11 is shown in FIG. 39. Plugging is caused by plant material collecting between the stripper plates 70 in such a quantity that the material jams in place. Row plugging can be detected a number of ways, described for example in U.S. application Ser. No. 16/445,161 which has been incorporated by reference herein. In one example, where a vision system is used to detect and size stalks 2 the vision system can use scene recognition or object classification methods to recognize a plugged condition. In another example, where mechanical sensing members 12 are used plugging can be detected when an improbably large stalk diameter is reported for a specified time period, such as one or two seconds.

In certain plugging conditions some of the plugged plant material may be repeatedly pushed into a sensor member 12 by passing gathering fingers 74. This phenomenon may result in a changing measured size/width even though the row unit 11 was plugged. In various implementations, plugging may still be identified by an improbably large stalk 2 size that changes with a periodicity related to the current speed of the gathering chain 74. As would be appreciated, a plugged row unit 11 can be caused when the width (D) of the gap between the stripper plates 70 is too narrow. A plugged row unit 11 can also be caused by slow head 7 speed, or other condition as would be known to those skilled in the art. If a plugged row unit 11 is detected, the system 300 may check if the head 7 speed is appropriate for the harvesting speed, and adjust the speed if needed. Additionally, the system 300 may indicate that the width (D) of the gap between the stripper plates 70 needs to be widened to clear the plug. These processes may be manual and/or automatic.

In certain implementations, the width (D) of the gap between the stripper plates 70 can be recorded and logged. In some implementations, the width (D) settings are recorded and logged with reference to the vehicle position, such as the GPS position. In these and other implementations, the system 300 may create and display maps to provide insights into crop conditions and performance.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Although the disclosure has been described with reference to implementations, persons skilled in the art will recognize that changes may be made in form and detail without departing from the spirit and scope of the disclosed apparatus, systems and methods.

What is claimed is:

1. A method of monitoring stripper plate position, comprising:
    inputting one or more stalk measurement inputs, the one or more stalk measurement inputs is from a stalk sensor, comprising:
        (a) a resilient member engaged with a first side of a row unit,
        (b) a distance sensor disposed on the row unit in proximity to the resilient member; and
        (c) a sensor target within the resilient member;
    inputting a threshold range for the one or more stalk measurement inputs; and
    determining if the one or more stalk measurement inputs are within the threshold range for the one or more stalk measurement inputs,
    wherein the threshold range is a range of values for the one or more stalk measurement inputs when the row unit is operating properly.

2. The method of claim 1, further comprising emitting an alarm when the one or more stalk measurement inputs are outside the threshold range for the one or more stalk measurement inputs.

3. The method of claim 1, further comprising adjusting a width between a pair of stripper plates on the row unit when the one or more stalk measurement inputs are outside the threshold range for the one or more stalk measurement inputs.

4. The method of claim 1, wherein the one or more stalk measurement inputs comprise one or more of stalk diameter, stalk width, stalk cross-sectional area, deflection time, and deflection distance.

5. The method of claim 1, further comprising detecting a plugged row unit via the one or more stalk measurement inputs, and further adjusting a width between a pair of stripper plates on the row unit a plugged row unit is detected.

6. The method of claim 1, further comprising logging a width between a pair of stripper plates on the row unit over time.

7. The method of claim 1, wherein the first side of the row unit is an underside of the row unit.

* * * * *